United States Patent
Sobhani et al.

(10) Patent No.: US 9,105,054 B2
(45) Date of Patent: Aug. 11, 2015

(54) METHOD AND SYSTEM FOR AUTOMATED ONLINE CALENDAR-BASED DONATIONS

(71) Applicants: S. Rob Sobhani, Potomac, MD (US); Parsa Namazi, Marina Del Rey, CA (US); Christine Angela Dolendo, Williamsburg, VA (US); Maryam Paez, Chappaqua, NY (US)

(72) Inventors: S. Rob Sobhani, Potomac, MD (US); Parsa Namazi, Marina Del Rey, CA (US); Christine Angela Dolendo, Williamsburg, VA (US); Maryam Paez, Chappaqua, NY (US)

(73) Assignee: SPARO CORPORATION, Potomac, MD (US)

( * ) Notice: Subject to any disclaimer, the term of this patent is extended or adjusted under 35 U.S.C. 154(b) by 0 days.

(21) Appl. No.: 14/067,905

(22) Filed: Oct. 30, 2013

(65) Prior Publication Data

US 2015/0006365 A1    Jan. 1, 2015

Related U.S. Application Data

(60) Provisional application No. 61/840,286, filed on Jun. 27, 2013.

(51) Int. Cl.
*G06Q 30/02* (2012.01)
*G06Q 20/06* (2012.01)
*G06Q 20/38* (2012.01)
*G06Q 20/10* (2012.01)

(52) U.S. Cl.
CPC ............ *G06Q 30/0279* (2013.01); *G06Q 20/06* (2013.01); *G06Q 20/10* (2013.01); *G06Q 20/382* (2013.01)

(58) Field of Classification Search
None
See application file for complete search history.

(56) References Cited

U.S. PATENT DOCUMENTS

| | | | |
|---|---|---|---|
| 2009/0192873 A1* | 7/2009 | Marble | 705/10 |
| 2009/0204886 A1* | 8/2009 | Xu et al. | 715/234 |

OTHER PUBLICATIONS

SocialVest (http://web.archive.org/web120111012125135Ihttps://www.socialvest .us/how-it-works, Wayback Machine—Oct. 12, 2011).*
Gofundme (https:/lweb.archive.org/web120120501044220Ihttp://www.Gofundme .com/, Wayback Machine—May 1, 2012).*
Gofundme Charity Listing (http://web.archive.org/web/20120427163651/http://www.gofundme.com/charity-donations, Wayback Machine—Apr. 27, 2012).*
Gofundme How to Fundraise (http://web.archive.org/web/20120501045742/http://www.gofundme.com/how-to-fundraise, Wayback Machine—May 1, 2012).*

* cited by examiner

*Primary Examiner* — Kimberly Berona
*Assistant Examiner* — Joseph King
(74) *Attorney, Agent, or Firm* — MAXVALUEIP LLC

(57) ABSTRACT

In one example, we describe methods and systems for automated online merchant charity donations. In one embodiment, a donation agent interacting with a merchant website can offer an online user an option to allocate at least a portion of a payment for or price of a purchase, associated with a transaction made by the user via the merchant website, to be donated by a merchant corresponding to the merchant website on behalf of the user to a charity of the user's choosing. If the online user exercises the option, the donation agent can calculate an amount of the donation to be made and store the calculated donation amount in a database. The donation agent can disburse the calculated donation amount to the charity selected by the customer. The method also works for the off-line model. The system and method describe authentication and the way the charity funding is distributed, with respect to a calendar date and a specific event.

18 Claims, 57 Drawing Sheets

| Logo 1 | Merchant Portal | Sign Out |

Welcome, XYZ Store!
Merchant ID Number: 243256

Percentage: 3%    Change

| Store Logo | Store XYZ<br>Website: www.XYZ.com<br>Address | Edit |

$205,315  revenue generated through charity network (as of 6/11/13)

Account Balance Snapshot           ( Pay Now )  ( View Invoice )

$51,250   due by 6/30/13          *Set up Auto-Payment via ACH*
                                       *See Invoice History*

View and Manage Transactions
This page allows you to see the breakdown of your transactions per transaction period, report returns and cancellations within 60 days of the transaction, and export the breakdown on to XLS.         ( View )

Report Returns
Transaction Period: [        ⇅ ]
Upload File:        ( Choose File )
Total value to credit: [ $        ]              ( Submit )

Account Manager                                        Edit
Name: ...
Position: ...
Email: ...
Tel.: ...
Address: ...
Billing Address: ...
Invoice email: ...

Change Password

Fig. 9

Merchant Portal — Profile  Sign Out
Merchant Transaction Management    XYZ Store
Merchant ID Number: 243256
Percentage: 3%

Go to: [Current Period ⇅]   The orders have been marked as returned. Undo
(Action) (+ Add Transaction)  Search [*Enter Order Number*] GO    Export

| Select | Order No. | Date | Time EST | Merchant Tx No. | Amount | Merchant Donation | Customer Donation | Charity ID | Action |
|---|---|---|---|---|---|---|---|---|---|
| ✓ | KM567WW | 6/1/13 | 14:21 | T34GH8N1 | $12.00 | $0.36 | n/a | 346567 | ↩ ✗ |
|  | ............ | ............ | ...... | ............ | ...... | ...... | ...... | ............ | Returned |
| ✓ | ............ | ............ | ...... | ............ | ...... | ...... | ...... | ............ | ↩ ✗ |
|  | ............ | ............ | ...... | ............ | ...... | ...... | ...... | ............ | ↩ ✗ |
|  |  |  |  |  |  |  |  |  | Canceled |

Next ‖ Previous

Fig. 10

| Logo 1 | Charity Portal<br>Donations & Disbursement Tracking | | | | Charity<br>Logo | Profile  Sign Out<br>ABC Alliance |
|---|---|---|---|---|---|---|

Charity ID Number: 346567

Donations and Disbursement Snapshot

Total Donations Paid to Date                                                $12,000

Last Donation Disbursement                          $250
(Period 02/01/13 to 02/31/13)                paid out on 5/14/13

Pending Donations                                   $350
                                      to be paid out on 7/14/13

[ See History of Disbursements ]

[ $250.00 ]  Paid  5/14/13
             Out

Detailed Donations Per Transaction Period

Period: [ 2/1/13 to 2/31/13 ▼ ]    Total Donations
                                   Accumulated from Period

| Merchant<br>Name | Date | Time<br>EST | Merchant<br>Donation | Customer<br>Donation | Reference<br>No. |
|---|---|---|---|---|---|
| XYZ Store | 2/1/13 | 14:21 | $0.36 | n/a | BDC67FW |
| ... | ... | ... | ... | ... | ... |

Export

Next || Previous

Fig. 12

Charity Portal
Donations & Disbursement Tracking

Logo 1 | Charity Logo | Profile  Sign Out
ABC Alliance
Charity ID Number: 346567

Donations and Disbursement Snapshot

| | |
|---|---|
| Total Donations Paid to Date | $12,000 |
| Last Donation Disbursement (Period 02/01/13 to 02/31/13) | $250 paid out on 5/14/13 |
| Pending Donations | $350 to be paid out on 7/14/13 |

See Detailed Transactions

Disbursement History

Period: [▼]   Export

| Transaction Period | Pay-Out Date | Total Donation Paid Out | Reference ID |
|---|---|---|---|
| 2/1/13 to 2/28/13 | 5/14/13 | $250 | LD21GSW |
| 1/1/13 to 1/31/13 | 4/14/13 | $180 | ..... |
| 12/1/12 to 12/31/12 | 3/14/13 | $150 | ..... |

Next || Previous

Fig. 13

Charities & Organizations

Search: *Enter Charity/Organization Name* [GO] *Zip Code* [GO]

Sort by Name || Category || Preference

LOCAL charities & organizations

| Charity 1 | Charity 2 | Charity 3 | Charity 4 |
| Charity 5 | Charity 6 | Charity 7 | Charity 8 |
| ... | ... | ... | ... |

International
National
State

[Add to Favorite Charities]

Fig. 14

| Logo | | | | | | Picture |
|---|---|---|---|---|---|---|
| Hi, Christine! ★ | About | Shops | Charities | Charity Bank | Share Contact | My Profile |
| | Search | Type in a shop or charity | GO | | | |

Total in Your Charity Piggy Bank
$2.36

Detailed Piggy Bank Activity
Go to: [ Current Month – April 2013 ▼ ]   [ Donate from Piggy Bank ]                   Next || Previous

| Date | Time EST | Source | Recipient | Donation | Accumulated Balance |
|---|---|---|---|---|---|
| 4/29/13 | 12:21 | YYX Inc. | | $0.36 | $2.36 |
| 4/21/13 | 22:50 | XYZ Store | DEF Charity | $0.20 | $2.00 |
| 4/15/13 | 08:30 | Self | AAA Foundation | $3.00 | $2.00 |
| 4/12/13 | 09:30 | .. | .. | $5.00 | $5.00 |
| .. | .. | .. | .. | .. | .. |

Fig. 17

Donate from my Piggy Bank

Current Total in Piggy Bank: $5.80

1- Enter the amount: [ $ ]

2- Select Charity:

[ Enter Charity/Organization Name ] [ GO ]

[ Zip Code ] [ GO ]

Favorite charities & organizations

| Charity 1 | Charity 2 | Charity 3 | Charity 4 |
| Charity 5 | Charity 6 | Charity 7 | Charity 8 |

- International
- National
- State
- Local

Sort by Name || Category || Preference

[ Confirm Selection ]

Don't see your favorite cause? Suggest one to us!

Fig. 18

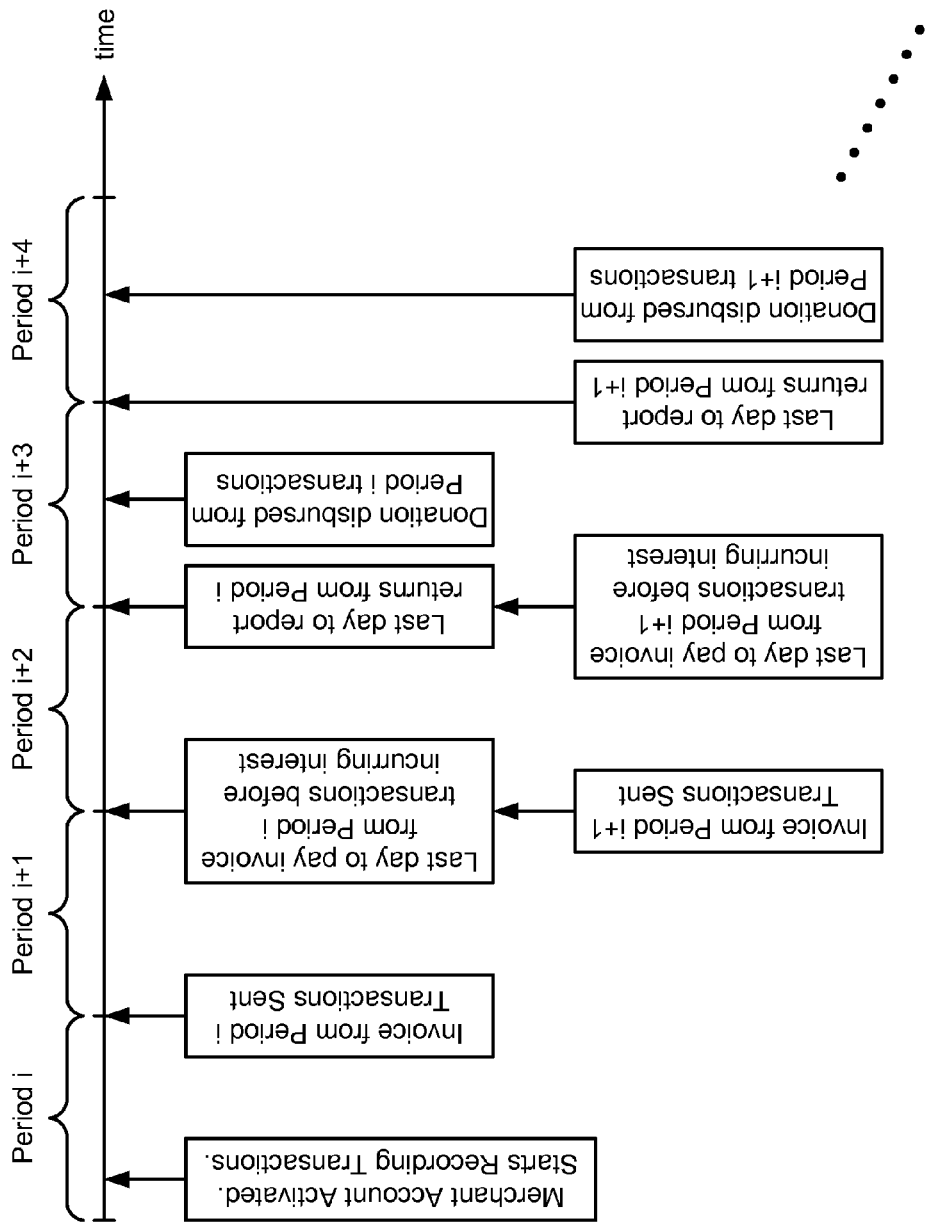

Checkout as a Returning Member     *Sign in for a faster checkout.*

Checkout as a Guest     *You may join Sparo later for a faster checkout in future*

E-mail Address:

Billing Address:

Shipping Address:

Credit Card Info:

☒ Create Sparo account for faster future checkouts
*Why?*
Choose Password:

☒ By clicking this button you agree to Sparo's User Agreement & Privacy Policy.

[ Create Account & Continue ]

Fig. 29(c)

Sparo
Purchase with a Purpose

XYZ Store Logo

You're almost done!

Once you select your charity of choice, you can review your order on *XYZ Shop* and submit payment.

Select charity: [ *Enter Charity/Organization Name* ] GO    [ *Zip Code* ] GO

LOCAL charities & organizations

International | National | State

Charity 1 | Charity 2 | Charity 3
Charity 4 | Charity 5 | Charity 6

Sort by Name || Category || Preference

I would like *XYZ Shop* to donate $4.74 of my purchase to *Charity 2* on my behalf. *What does this mean?*

I would also like to make my own donation: (Optional)   $5.00

Review Order

METHOD AND SYSTEM FOR AUTOMATED ONLINE CALENDAR-BASED DONATIONS

RELATED APPLICATIONS

This application is related to a provisional application 61/840,286, filed 27-June-2013. All the teachings of the provisional application are incorporated here by reference. The current application claims priority to the filing date of the provisional application.

BACKGROUND OF THE INVENTION

Nowadays almost anything can be bought online. In ever-increasing numbers, merchants are offering goods and services via websites. On a typical merchant website, a customer can navigate the website by entering commands via a computing device that provides a connection and an interface to the website. Using the computing device and the interface, the customer can, for example, search an inventory, select goods or services from the inventory, and add the selected items to a virtual shopping cart. When the customer has finished his or her selections, the customer can go through a check-out process to finalize a purchase of the items in the virtual shopping cart.

The check-out process can be interactive. For example, as part of the check-out process, the website can present interface displays, via the computing device, that solicit information from the customer, such as the customer's name, address, phone number, credit card information and the like. The customer, in response to prompts, dialog boxes and the like presented via the interface displays, can manipulate the computing device to provide requested information. Software responsible for the interface displays can process the information, either independently in communication with other software. Processing the information can include, for example, generating queries to solicit further information, performing error checking, performing arithmetic and logical operations on information, storing information, retrieving information in response to queries, and the like.

A company, SocialVest Ventures LLC, in Atlanta, Ga., USA, is in the charity business (www.socialvest.us). Another site is "www.IGive.com" which is in the same field. However, the inventions and embodiments described here, below, have not been addressed or presented, in any prior art.

SUMMARY OF THE INVENTION

This disclosure relates to generally to embodiments of methods and systems for automated online merchant charity donations. More specifically, according to the embodiments, a donation agent interacting with a merchant website can offer an online user an option to allocate at least a portion of a payment for or price of a purchase, associated with a transaction made by the user via the merchant website, to be donated by a merchant corresponding to the merchant website on behalf of the user to a charity or charities of the user's choosing. If the online user exercises the option, the donation agent can, in response, calculate an amount of the donation to be made and store the calculated donation amount in a database.

The donation agent can disburse the calculated donation amount to the charity or charities selected by the customer. Further, pursuant to an agreement with the merchant corresponding to the merchant website, the donation agent can bill the merchant for services. The services can include, among others, the offering to the user of the donation option via the merchant website and the calculating and storing of the donation amount. The services can further include the disbursing of the calculated donation amount to the charity or charities selected by the user. The amount billed to the merchant can be predetermined by agreement. The amount billed to the merchant can be, for example, a predetermined percentage of the payment for or price of the purchase.

The arrangement described in the foregoing can be advantageous, among other reasons, because it can encourage donation to charitable causes. For example, merchants may be motivated to seek the favorable publicity of being associated with charitable causes by way of their websites. By providing the interactive donation capability on merchant websites, thereby providing the sought-after favorable publicity, the donation agent can facilitate the linking of e-commerce to the funding of charities. The donation agent can also encourage the participation of merchants by off-loading from the merchants the tasks of calculating and disbursing the charitable donations, in exchange for a modest fee.

The term "donation agent" as used herein encompasses at least software and machines and/or articles of manufacture that store and execute the software to perform the operations described herein. A donation agent can also include at least a portion of a network, such as the Web or the Internet.

BRIEF DESCRIPTION OF THE DRAWINGS

FIG. 3 is for one embodiment, as an example, for interface for user for choices for shop by category, shop by merchant, most popular, new merchants, and the like.

FIG. 9 is for one embodiment, as an example, for interface for merchant portal, with store name, merchant ID, percentage of charge, store logo and information (which is editable).

FIG. 10 is for one embodiment, as an example, for interface for merchant portal, for merchant transaction management, with profile, store name, and unique merchant ID number, plus percentage of charge.

FIG. 12 is for one embodiment, as an example, for interface for charity portal, with donations and disbursement tracking.

FIG. 13 is for one embodiment, as an example, for interface for charity portal, with donations and disbursement tracking.

FIG. 14 is for one embodiment, as an example, for an interface for charities, at different levels, or topics, or size, or overhead.

FIG. 17 is for one embodiment, as an example, for interface for the user, for activities for piggy bank, for donation and information.

FIG. 18 is for one embodiment, as an example, for interface for the piggy bank, with suggestion to friends.

FIG. 28 is for one embodiment, as an example, for timeline for the process for deadlines and actions.

FIG. 29c shows an example of display for returning member (for pop-up, as partial display). FIG. 29d shows an example of Sparo interface.

FIG. 30 shows an example of Sparo interface, for donation, for different localities/geographical coverage or scope.

FIG. 31 shows an example of an interface for allocation of funds.

FIG. 32 shows an example of an interface for allocation of funds, from merchant, piggy bank, or consumer directly, with icons shown.

DETAILED DESCRIPTION OF THE PREFERRED EMBODIMENTS

Figure 1:
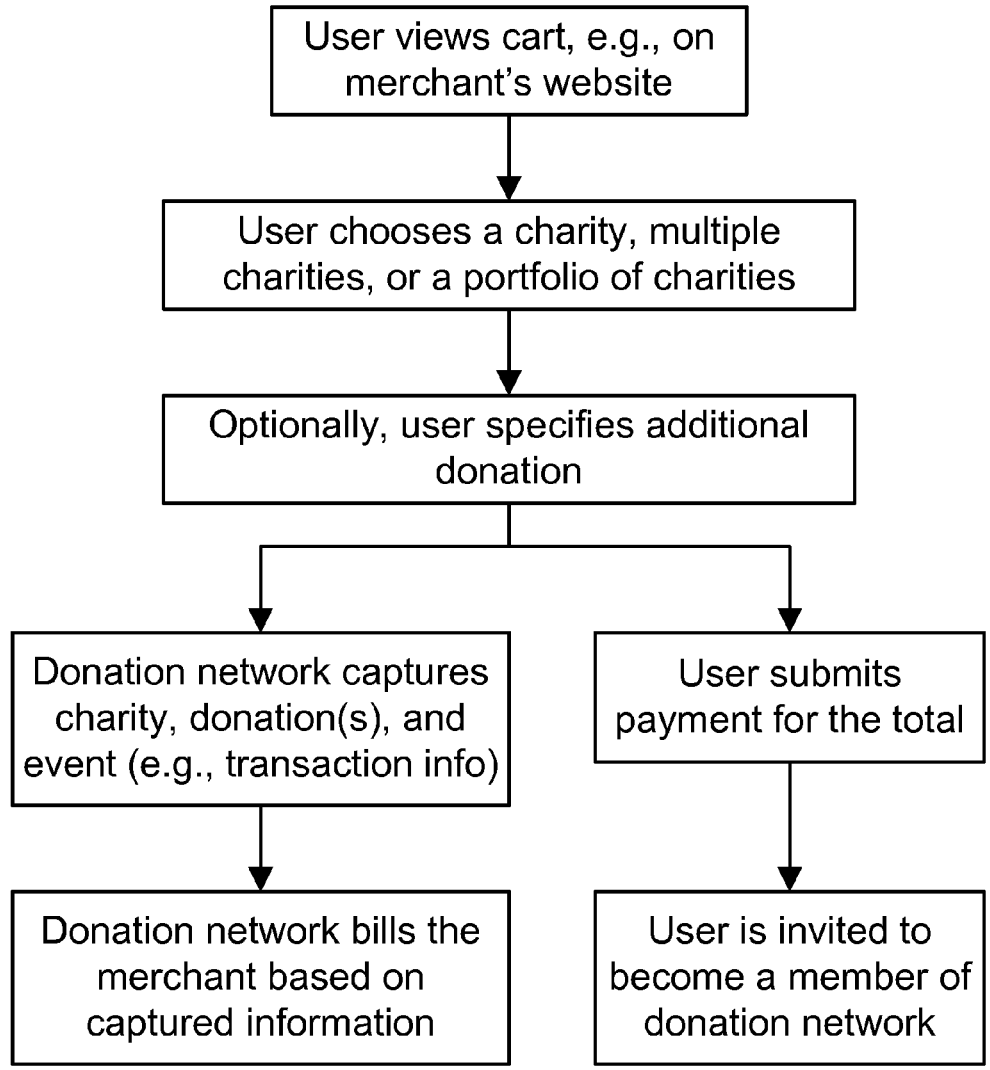
FIG. 1 is for one embodiment, as an example, for method of consumer/user choosing a charity for directing donation.

Let's start with an example:

Description of donation agent:

Embodiments of the donation agent can provide a charitable service at online checkouts that allows shoppers to purchase what they like, through sites they already trust, while supporting their favorite causes. Customers can be twofold—shoppers who currently purchase goods online and partner merchants who are enabled to make charitable donations. Shoppers who "checkout" through the donation agent are able to have a portion of their purchase donated to a charity of their choice. The merchant donates the portion of the purchase for the shopper.

I. Avenues of Charitable Donation

There are at least two avenues in which the charitable giving can be done, in this example. One avenue includes embedding of the donation agent into the website of the merchant as another option for checkout. A second avenue includes providing an independent website that acts as an agent and drives member customers to the merchants' sites that are participating in charitable programs facilitated by the donation agent. The independent website also allows members to track their donation activities and donate directly to charities without having to make a purchase.

Note that "we" or "our network" or "donation network" or "Sparo" or "our web site" or "our system" refers to the donation agent/website/network. When referring to charities in this disclosure, the reference include non-profit organizations, as well.

A user performing a transaction via a merchant website can see, in a display of the merchant website associated with the transaction, a virtual "shopping cart" containing an item or items to be purchased by the user. The user can subsequently perform operations facilitated by the merchant website to finalize the transaction. For example, the operations can include the known "checkout" process.

During the operations to finalize the transaction, operations by the donation agent can be invoked. The operations by the donation agent can include presenting, via a display, a list of selectable charities. The display can be by way of a display device associated with a computing device linked, for example via a network, to the merchant website. In response to an input indicating a choice of charity from the selectable list, the donation agent can automatically capture information associated with the transaction. The information can be captured by a "back-end" associated with the donation agent. Here, "back-end" encompasses at least software for processing the information, machines for executing the software, storage devices for storing the captured information, and portions of a network for linking the machines and the storage devices.

In particular, the donation agent can automatically calculate and store an amount of a charitable donation to be made to the selected charity based on the transaction. The amount of the charitable donation can be a variable amount, a fixed amount, an amount selected from a range of options, and the like. For example, the donation agent can calculate a predetermined percentage of a purchase price or payment associated with the transaction as the amount of the charitable donation, or based on the income level of the user, or based on the prior donations, or history, or preferences, or question/answer, or personal folder/data, or gift certificate, or proxy donation by friends or family or on a person's behalf, or anonymous. Or, it can be based on season or day of the calendar, e.g. Earth's Day, somebody's birthday, triggered by an event, Father's Day, July 4$^{th}$, Independence Day, or periodically applied, or formulated, or by an equation, or from a table or list, or from a curve or diagram, or randomly generated donation value and/or date.

After the foregoing operations, the donation agent can bill (e.g., transmit an invoice to) the merchant associated with the merchant website for services performed by the donation agent. The amount billed to the merchant can be, for example, a predetermined fraction, percentage or share of the purchase price or payment associated with the transaction, or a fixed value, or a value with a min. amount, or a value with a max. amount, or a step-wise formula, or graduated amount with steps, or linear relationship, or quadratic relationship, or a polynomial relationship, or closed-form formula, or open-form formula, or linear relationship with a cap and/or min., or rounded number, or truncated number, or from a table or list, or step function, or logarithmic function, or exponential function, or n-th power function of a variable, or a value from a range of numbers, or an integer value, or a real value, or random number, or a predetermined number, or based on a rule, based on a rule engine, based on if-then rules, based on conditions, or the like.

Further, the donation agent can disburse the amount of the charitable donation to the selected charity as part of services billed to the merchant. The billing and disbursement can be performed by the donation agent, for example, after payment pursuant to the transaction is made and verified.

The operations facilitated by the donation agent can further include presenting, via an interactive display, an option for a user to make an additional donation, beyond the amount automatically calculated as described in the foregoing. The additional donation can be from the user's personal funds, for example. The donation agent can further present an option for the user to become a member of a charitable program facilitated by the donation agent. In response to user input indicating that the user wants to exercise the option, the donation agent can enable the user to navigate to an independent website generated and supported by the donation agent, as described in more detail further on.

In non-limiting embodiments, the donation agent can include a charity application for each of known e-commerce platforms (e.g., Magento, OsCommerce . . . etc.), for example. Participating merchants can incorporate a charity application on respective websites, to be invoked during, e.g., the check-out process similar to PayPal. "Charity application" as used here encompasses at least software that is customized or customizable to various e-commerce platforms and/or websites, and executable by a computing device to perform operations described herein. The charity applications could be customized for each of several existing ecommerce platforms, for example, or could be designed from scratch where needed. The donation agent can include APIs (Application Programming Interfaces) for various charity applications that can facilitate customization.

A. Framework Development—Software Installation & Implementation.

In various non-limiting embodiments, features of the donation agent can include:

1. Shopping Cart framework and Ecommerce platform development
2. Product & Catalogue Management
3. CRM (Customer Relationship Management) System
4. CMS (Content Management System)
5. Customer Subscriptions management B. Catalogue & Product Detail Customization:

The donation agent can include at least two product types:

1. Subscription (For Clients B2B)—This is for, e.g., on-line e-commerce sites
2. Charity Management system: List of Charities and assignments to B2B Clients. Similar to Categories and Products the donation agent can include a complete section for Charities and related programs. This section can allow adding Charities, managing Charity pages and other specifications, which can be completely customizable.

C. Custom Website Template Design—Donation Agent Website.

D. Content & Product Upload to donation agent website.

Uploading content pages and website functionality including content from Charities and their Logos.

E. Social Network Tools and Implementation.

F. Application Programming Interface (API) Design.

The donation agent can include a Charity API for clients to use for custom deployment of a donation agent charity application onto their website. This can require secure authentication with encryption, placement of order and other activity in order to calculate donations. This can allow website backend and process the charities functionality and contributions.

G. Application Add-on for eCommerce Platforms—e.g., Magento

H. Application Add-on for eCommerce Platforms—e.g., OsCommerce

I. Automated Emails system

K. On-Page SEO Implementation

L. eCommerce Analytics Implementation

II. Donation Agent Application and Website:

Information That Can Be Captured:

A. From Merchant's Site: (Application)

Sufficient information to allow accounting for every transaction and provide more information on the transaction when needed.

For example, the following information:

1. Merchant Name (Assign an I.D., e.g.)
2. Order Confirmation Number/Transaction Number
3. First Name of customer
4. Last Name of customer
5. Member username, if applicable/logged in
6. Date and time of transaction
7. Amount of the purchase before taxes
8. Merchant Donation Value (e.g., calculated based on the agreed percentage)
9. Customer Donation Value (e.g., additional donation made by the customer)
10. Organization/Charity Selected B. From Registered Member: (Website)

The donation agent can solicit the following information, for example, from persons who wish to become members of the independent donation agent website:

To sign-up:

1. First Name
2. Last Name
3. E-mail
4. Password

C. Further Information to Collect for Profile: (Optional to the Member)

1. Favorite Charities
2. Favorite Merchants
3. Birthday
4. Male/Female

D. From Charity: (Submitting their Request to Sign Up to the Donation Agent Website)
1. Name of Charity
2. Brief Description (for splash page, e.g.)
3. Projects or fundraising needs (can go on splash page)
4. General Number
5. Main Address
6. Official Website
7. Contact Name
8. Contact Position in Charity
9. Contact E-mail
10. Contact Number
11. Contact Office Address
12. ACH Direct Deposit (if applicable)
13. Category of Charity E. From Merchant: (Downloading the Donation Agent Application from the Website to Embed in their Website)
1. Name of Merchant
2. Category of Merchant (Electronics, Clothing, Specialty Food, etc.)
3. Official Address
4. Official Website
5. Billing Address
6. Contact Person
7. Contact Position
8. E-mail
9. Number
10. Contact Office Address
11. Contact Person #2
12. E-mail #2
13. Number #2
14. Contact Office Address #2

Embodiments of methods and systems for automated online merchant charity donations via the donation agent described in the preceding can include the following:

Software to implement the donation agent can execute in association with a merchant website. The software can generate interface displays on a display device, for example. The interface displays can accept inputs from a user entered via a computing device connected to a network such as the Internet, for example.

For example, the user may access a merchant website via the Internet, navigate the merchant website and execute one or more transactions to culminate in one or more purchases having a total purchase price. Pursuant to the purchase(s), functionality for collecting payment of the purchase price from the user may be invoked by the merchant website. For example, the functionality can be the regular "checkout" process.

In non-limiting embodiments, the software to implement the donation agent can be invoked in connection with the checkout process. More specifically, as part of the checkout process, the software can issue an invitation to a user to have a merchant corresponding to the merchant website donate a portion of the purchase price or payment for the purchase to a selected charity or charities. The portion of the purchase price or payment to be donated by the merchant can be an agreed-on (e.g., between the merchant and the donation agent) percentage of the purchase price or payment, for example. The invitation can be in form of a pop-up box or other graphical display, for example, containing text, images and fields for accepting input. Based on an input or inputs supplied in response to the invitation, the software can perform a number of operations.

For example, the software can offer a selection from any or all of a local charity or charities, a state charity or charities, a national charity or charities, an international charity or charities, or other charity or charities. To provide a list of selectable local charities, for example, the software can solicit entry of a zip code. Based on an entered zip code, the software can, for example, search a database or databases to identify corresponding charities, and return a corresponding list for display via the interface.

For example, if a response to the invitation indicates acceptance of the invitation, the software can collect information associated with the one or more transactions executed on the merchant website. The information can include, for example, the information as shown above. The software can perform calculations based on the information, and store both the information and calculated results in a machine-readable storage device, such as a volatile memory coupled to a processor and/or a bulk, non-volatile memory such as disk storage on a server.

In particular, for example, the software can calculate and store the merchant donation value as shown above. Further, the software can facilitate disbursement of the merchant donation value to the selected charity or charities, and bill the merchant based on an agreement with the merchant.

In non-limiting embodiments, the software can offer the user an option to donate to a selected charity or charities from the user's personal funds, as shown above.

In non-limiting embodiments, software for the donation agent can be implemented in the form of a downloadable "plug-in" to a merchant website. The plug-in can be fully customizable to each individual merchant website's requirements. The plug-in could be automatically invoked during a check-out process for a merchant website, as described in the foregoing. The donation agent, however, is not limited in this respect and could be invoked at the merchant website on demand, for example, or automatically invoked by or during operations other than check-out.

The donation agent can further supply functionality to cause the merchant website to be exited in response to user input, and a different, independent website associated with the donation agent (hereafter, "independent website") to be entered. The independent website can also be otherwise accessed, that is without necessarily first entering a merchant website. For example, a user can log directly into the independent website.

In any event, the donation agent can execute security-related operations either in connection with logging into the independent website or in response to being invoked via a merchant website. In particular, if invoked via a merchant website, the donation agent can create a secure session within another secure session. More specifically, a checkout session of a merchant website is typically secure. Therefore, because the donation agent can be invoked and executed within the checkout session, performing security-related operations associated with its own donation-related session while executing within the checkout session, the donation agent can create a secure session within another secure session.

The software for implementing the donation agent can generate and support the independent website. The independent website can generate and support a plurality of interface displays. One non-limiting example of such an interface display is a login webpage. The login webpage can include input fields for accepting user input, such as login and password information of registered members of the independent website, and information as shown above, for registering new members. The login page can also include a logo of the donation agent. Some of these are shown in the Figures.

Any person or entity can be a member of the independent website and/or a participant in a charitable program(s) associated with the donation agent. For example, merchants and charities can be registered members of the independent website and/or participants in the charitable program(s). Individuals, such as customers of member merchants, can be registered members of the independent website and/or participants in the charitable program(s).

The independent website can generate and support another interface display. The webpage can include fields responsive to user input, such as a navigation field listing items selectable by, e.g., clicking with a user input device such as a mouse or touchpad, a search field to accept search terms for, e.g., searching for charities to which to donate, a field providing for selectable options to query, e.g., an amount of total donations to date and total donations for the current week, as a running sum or averages or typical data or goals or percentage of goals/amounts achieved so far, a field showing a running total of donations compared to a threshold or target donation total, a field showing selectable banners or logos of member merchants (e.g., merchants participating in the charitable program(s) and subscribing to services of the donation agent), where, e.g., clicking on a banner causes navigating to the corresponding merchant's website, a field showing selectable banners or logos of member charities (e.g., charities participating in the charitable program(s) and subscribing to services of the donation agent), where, e.g., clicking on a banner causes navigating to the corresponding charity's website, and a field showing various selectable options for navigating to or invoking other features of the independent website.

The independent website can generate and support still another interface display. The webpage can correspond to a member's personal account, and therefore, display a personal identifier such as a user's image and/or name ("Christine"). The webpage can further display information concerning the user's personal record of donations. The information can include, for example, an amount of total donations to date by the user, a weekly total of donations and a current amount in the user's personal account for charity, or "charity bank." The user's personal charity bank account (also, e.g., "piggy bank") can be funded, for example, by a user's personal donations as described previously, or by merchant donations directed by the user to the piggy bank. The charge/money can be from a credit card, debit card, credit line, cash, checking account, foreign currency, regular periodic salary, direct deposit, wire, cashier check, fund backed by the bank, government securities, regular stock, third party authorized account, from somebody's will or trust or inheritance, or other funding sources.

The webpage can also offer selectable navigation or donation options. For example, in response to clicking on the "SHOP MORE" button the donation agent software can enable the user to navigate to one or more merchant websites. In response to clicking on the "DONATE FROM PIGGY BANK" button the donation agent software can enable the user to donate part or all of the user's charity bank account to a selected charity via services of the donation agent.

The donation agent can facilitate accumulation of funds in the user's personal piggy bank over time, and then disbursement of an amount of the accumulated funds at a time of the user's choosing, or it can get the fund at some time in future, per calendar setting and user's choice, e.g. $1^{st}$ day of the month, automatic withdrawal from the checking account. In more detail, in addition to the functionality of the donation agent described previously, the donation agent can further enable a user to direct a merchant's donation, calculated or specified pursuant to a transaction via a merchant website, to the user's piggy bank. Additionally or alternatively, the donation agent can enable the user to direct a personal donation to the user's piggy bank. To this end, the donation agent can generate and support one or more interactive interfaces along lines discussed previously. Thus, the donation agent can enable donations that are substantially immediate or donations that are discretionary. The substantially immediate donations can be substantially immediate in the sense that they are automatically calculated and allocated to a charity or charities for disbursement by the donation agent after a transaction on a merchant website. The discretionary donations can be discretionary in the sense that they can accumulate over time in the user's piggy bank, and then be disbursed at a time and to a charity or charities of the user's choosing. The donation agent can facilitate safeguards to ensure that funds in the piggy bank are used for charitable purposes.

The security, biometrics, certification of approval, PKI, encryption, and password can be used for authentication and validation. The charities can be approved by IRS, government, third-party, independent agents, or rated by people. The charities' overhead and types of fund usage or transparencies are also listed for users' review, e.g., as a portal for charities or comparison table, or can be searchable for topics, emphasis, goals, location, budget, overhead percentage, and rating, by the user, from our web site, as a service to the user, for selecting the desired charities or groups of charities, which can be stored as a set for each person, as a database, for future referral and usage. This makes the experience easier and more convenient for the users.

Alternatively, in response to clicking on the "DONATE DIRECTLY TO CHARITIES" the donation agent software can enable the user to donate directly to a selected charity.

The webpage can further display at least a portion of a charity-related activity history corresponding to the user, or for her friends' or her family members', based on permission to access for the user.

The independent website can generate and support still another interface display(s) analogous to the webpages described in the foregoing, for displaying a running tally of donations targeted to some specific purpose, along with a threshold amount that, when reached, triggers an automatic award of the accumulated donations. For example, the specific purpose could be tuition assistance, and the threshold amount could be $5000.

In more detail, the donation agent can support a "live feed" or real-time display of donations targeted to the specific purpose. The live feed or real-time display can be driven by finalized and verified transactions executed via various merchant websites, for example. The real-time display could be in the form of a status bar that shows the threshold amount and the verified amount accumulated toward the threshold amount based on the most recent data available. The appearance of the real-time display, however, is in no way limited by the examples described herein.

The donation agent can perform operations to calculate the accumulated amount and compare the accumulated amount to the threshold amount. Based on the comparing, the donation agent can determine whether the accumulated amount has reached or exceeded the threshold amount. If the donation agent determines that the accumulated amount has not reached or exceeded the threshold amount, the donation agent can continue to monitor and display the verified amount accumulated toward the threshold amount based on the most recent data available.

On the other hand, if the donation agent determines that the accumulated amount has reached or exceeded the threshold amount, the donation agent can announce an award of the threshold amount to a recipient. The donation agent can randomly select the recipient, for example. The announcement of the award can take the form of a display via the live feed or real-time display, for example, but the announcement can take various alternative or additional forms, such as emails or other electronic notifications, U.S. postal service notifications, and the like.

As noted, the donation agent can randomly select an award recipient, using any of known randomization techniques, for example. Recipients can be members of the donation agent website, for example, or any other persons or organizations who register as part of an award program supported by the donation agent. In the case where the specific purpose is tuition assistance, for example, candidates for receiving the award could be students who register with the award program via, for example, the independent website. Each registered student could be assigned a number by the donation agent; a winning number could be randomly selected by the donation agent after the threshold is reached, and the donation agent could award the threshold amount to the student assigned the winning number.

After the award is made, the donation agent can reset the accumulated amount to zero, and again begin to monitor and report on the accumulated amount as it grows. The donation agent can also reset or change the threshold amount if this is desired.

As noted previously, application of an automated, randomly-assigned award with real-time reporting supported by the donation agent is not limited to the example of tuition assistance. Any charitable cause could serve as the specific purpose toward which donations are accumulated.

Figure 5:
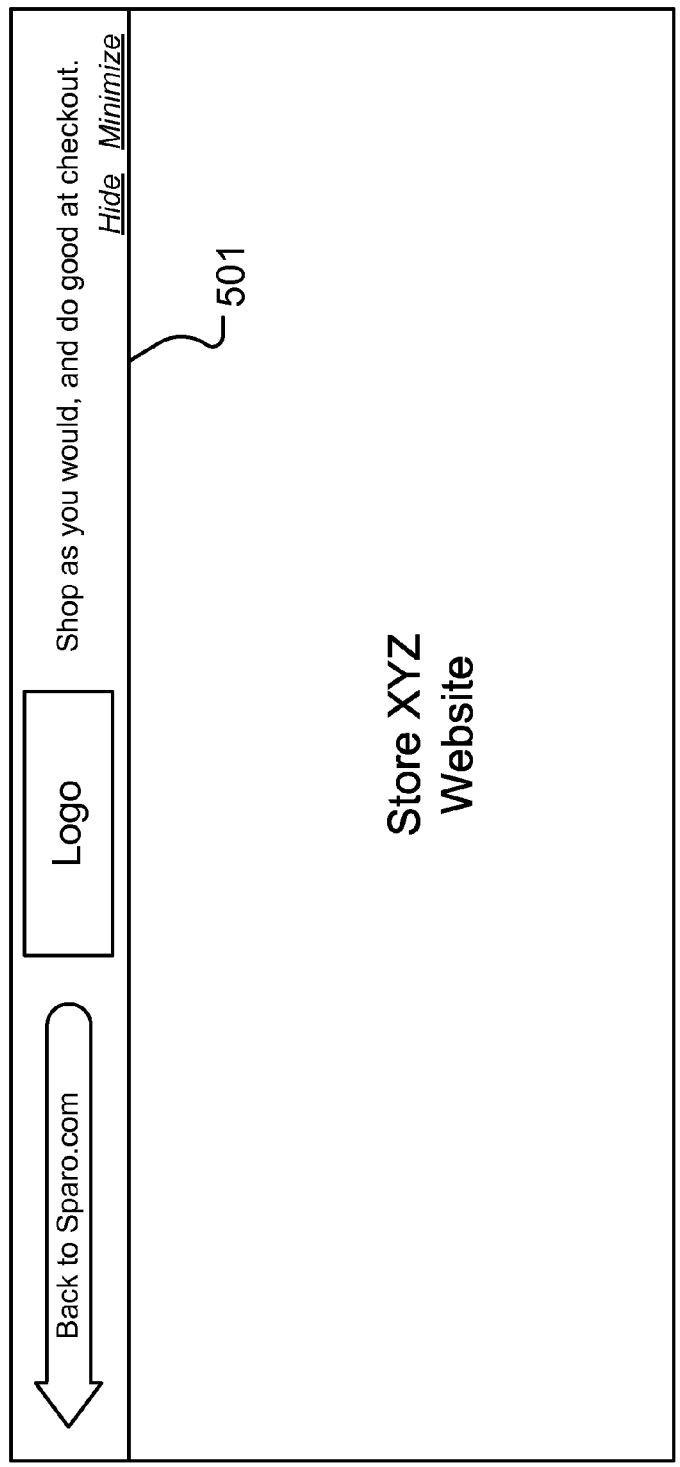
FIG. 5 is for one embodiment, as an example, for interface for user with Sparo section display.

As depicted for example in FIG. 5, the donation agent can provide an interactive input field for navigation (501). For example, the input field can be a display or portion of a display that is generated during a session within the independent website, but wherein a user has navigated to a merchant website, for example, from within the independent website session. The input field can display information for reminding a user that the user is currently interacting with a session that was entered or invoked via the independent website, and the donation agent can navigate back to the independent website in response to user input in the input field. In one embodiment, the donation agent can track user activity with the merchant website session.

In one embodiment, the cross domain scripting is addressed for example by creating script elements and setting the source to a script file from another domain, e.g., via JSON web services and dynamic script tags. One embodiment dynamically creates <script> tags on a page where the JavaScript source is executed. A <script> tag references a remote JavaScript source, and a dynamically created script tag that references a source on another domain that source outputs JSON. In one embodiment, message posting is used to communicate information. In one embodiment, an agent plug-in or extension is used (e.g., running in the browser), e.g., to examine the document object model and interact with third party server. As depicted in FIG. 5, in one embodiment, a user interface is provided on top or floating above the store website (e.g., in iFrame) with links for jumping to various websites or information sites. The scripts (e.g., using jQuery) are used to control the animated behavior for hiding, rolling, minimizing the interface and interaction with user input (e.g., mouse).

Table 1, below, tabulates various possible features of the independent website and application software of the donation agent.

| Website | Features and Functions |
|---|---|
| Basic | This refers to a simple, basic website that is information focused - includes homepage and contact page, and of course, the ability to add more pages (for things like About Us, The Team, FAQ etc) and customize the navigation bar as necessary<br>Informational video<br>There is the ability to share information through social media sites |
| Charity Portal<br>Allows new charities to sign up, and current charities to manage their account, control the information displayed on their splash page, set up payment info, and pay their invoice | Sign Up Capability for New Charities<br>Log-In Capability for Current Charities<br>Profile Management (Name, Logo, Address, Website, Phone, Fax, E-mail and Description) This information will be displayed on their own splash page in the website<br>Widget displaying total donated to organization to date (e.g., updated every month)<br>Ability to select and submit a Payment Method (Direct Deposit or Check)<br>For Class B Shareholders only: Display of Account Balance of Subscription Cost due and ability to pay that balance (either balance transfer or credit card)<br>Ability to attach files/host files that Charities can download (such as the Charity Merchant Agreement) |
| Charity Account Synchronization and Management | May be interlinked with the Charity Portal database for syncing (outlined in Website specs below)<br>When a new charity signs up on the website, gets approved and added into the program, it will upload a logo and address on their Portal which will then be reflected in the application<br>We should be able to access and manage Charity accounts - be able to pull information from charities, track donations to charities, access activity by charities |
| Merchant Sign-Up Page and Application Download<br>This refers to the businesses who want to participate and use the application | Merchants may have a page where they can sign up and select their agreed percentage<br>For simplicity purposes, merchants signing up will be assigned a Merchant ID#, but they will be able to pick their own password<br>Basic functionality should be able to capture name, merchant, website, etc, and agreement to download<br>After signing up, they will have the ability to download the application from the website to integrate the application in their site<br>For small to medium sized online businesses, e.g. using Magento and osCommerce, we can provide a step-by-step explanation of how to upload this application into their e-commerce site. |
| Merchant Portal<br>Allows current participating merchants to manage their account and pay their invoice | Log-In Capability for Current Merchants<br>Profile Management (Logo, Website, Contact Person and Category editable)<br>Account Balance management where merchant can view the balance, download a full invoice, pay the balance or set-up an autopayment<br>Ability to View Detailed Transactions in each transaction period<br>Ability to report returns (e.g., a reconciliation report done on our end, based on the returns file given to us by the merchant) |
| Merchant Account Management<br>Refers to the back-end of the Merchant Portal that is controllable and accessible to us | May be interlinked with the Merchant Portal database<br>Application is able to track and record the necessary information of the merchant's transactions occurred (Information needed to be recorded can be found in (doc))<br>Things to track: Transactions, returns, donations, charities, net revenue |

-continued

| Website | Features and Functions |
|---|---|
| Tracking purchases on merchant's site | Application can be able to organize the transactions collected and be tallied in an exportable document for invoice purposes Background: Sites like SocialVest.us and Ebates.com act as agents to merchants, and direct their members to shop at participating merchants in exchange for commission. We can track this process (from the independent website to merchant site) and bill the merchant accordingly. We can charge an additional agreed commission fee, a portion of which goes into the Member's Piggy Bank. |
| Member Portal This refers to the ability for Members to sign in and manage their account. It gives members a personalized feeling and involves them deeply in the mission. | Sign Up Capability for New Members (both manual and through social media) Log-In Capability for Current Members Profile Management and Customization (Name, Avatar, Email, Password, Birthday, Favorite Charities, Favorite Merchants) Ability to track all donation activities Include a Piggy Bank for each member (Recall: members can sign into the application and have the option to donate to their Piggy Bank to collect the donation money and give away later) Ability to donate an amount from their Piggy Bank to their charity of choice Ability to submit a suggestion for a charity Floating Donation Widget: For signed in Members to be able to see their Total Donation to Date and Total Donation in the Week displayed, e.g., in the top right |
| Tuition Charity Bank This allows members who are students to sign up for the lottery, and be awarded a tuition assistance | Ability to have Members who are students sign up for tuition assistance (using their name, college, student e-mail address) "Real-Time" Feed of Charity Bank Monetary Level (e.g., set at 5k) Once, e.g., 5k$ is reach, random generation of winner will be done, automatically, to determine who will receive the tuition assistance Send the winner the Acceptance Form link, where the point person in charge of Student Account Finances can verify that the student is in fact enrolled at their university, download and print the University Tuition Assistance Agreement, Sign and date the Agreement, Upload back into the Acceptance Form page, enter his/her contact information, and click submit. (Information may be manually verified by calling the person in charge, and then send the check to the university) |

Table 2, below, tabulates various possible features of the application software.

| Application | Breakdown of Functionality |
|---|---|
| Application Interface | The interface comes with a Title Header, a brief description and instruction, sign-in ability, zip-code categorization, and local/state/national segregation The application interface can present (upon calculation) the agreed percentage to donate by the merchant, and the calculated dollar amount of donation from this percentage. Confirmation page of the application may have the social media sharing ability |
| Member Sign-In Capability & Piggy Bank | The Piggy Bank is a virtual "bank account" for each member where they, as opposed to donating directly to a charity right away, have the ability to select this option and accumulate donations from their purchases into this Piggy Bank. Later, they can log into their profile to donate from the piggy bank to their charity of choice The application can be used by non-members, however, there should also be a sign-in capability for members to view a) their favorite charities, and b) be able to select their Piggy Bank The selections made by members can be logged and updated on their Profile After selection of their charity, the confirmation page should display their Profile Snapshot indicating how much they have donated to date and the total in their piggy bank. |
| "At the Cart" Integration of Application | This "version" of the application is located at the shopping cart of the merchant right before checkout. There will be a button at the cart, clickable by the retail customer to view the application This version has the option to include an additional donation, and when doing so, the cart will be automatically updated to include the additional donation Ability for guests to click the button to sign-in or sign-up to log their donations (will be taken to a different site) |
| "After Payment" Integration of Application | This "version" of the application is located at the confirmation page, after the payment has been made. Instead of a button, it will be, e.g., an automatic "pop-up" Because it occurs after payment, there may be no ability to give an additional donation With some changes, the two "versions" have some similarities, but appear in different areas of the merchant's website |
| Magento, OS Commerce, and API version of the application | The application can be downloadable for merchants who want to sign up and use the donation agent The application can be set up to accommodate the various "donation agreed percentages" per merchant. |

FIG. 1 is for one embodiment, as an example, for method of consumer/user choosing a charity for directing donation. The user can add more to the donation. The money comes from the store or merchant. The user is sent an invitation to join our charity network.

Figure 2:
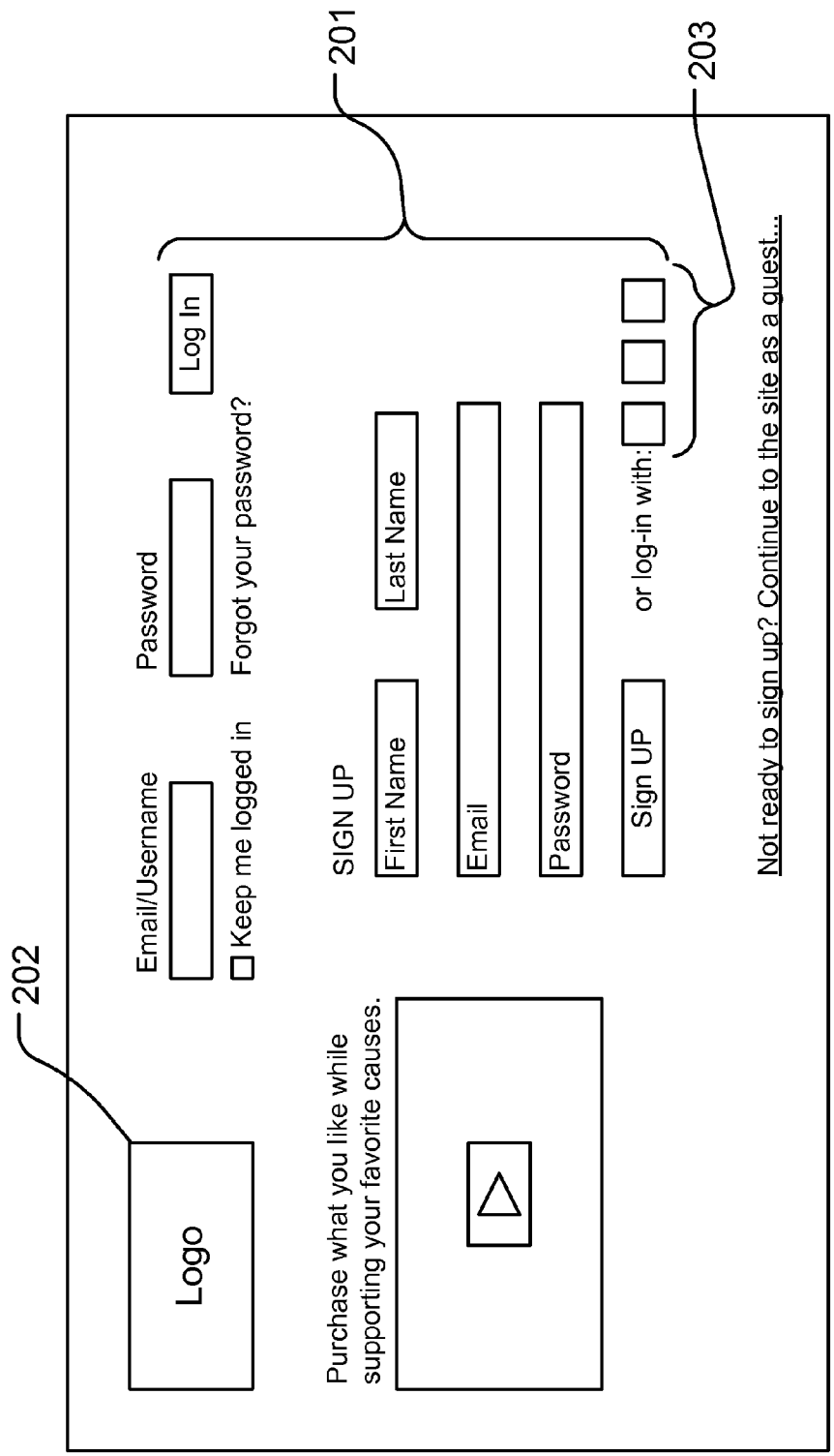
FIG. 2 is for one embodiment, as an example, for interface for user with logo display.

FIG. 2 is for one embodiment, as an example, for interface for user with logo (202) display. It shows a video for instructions and details. It has an interface for sign in and sign up (201), directly or using other social websites (e.g. FACEBOOK) (item 203), or browsing as a visitor/guest.

Figure 3:
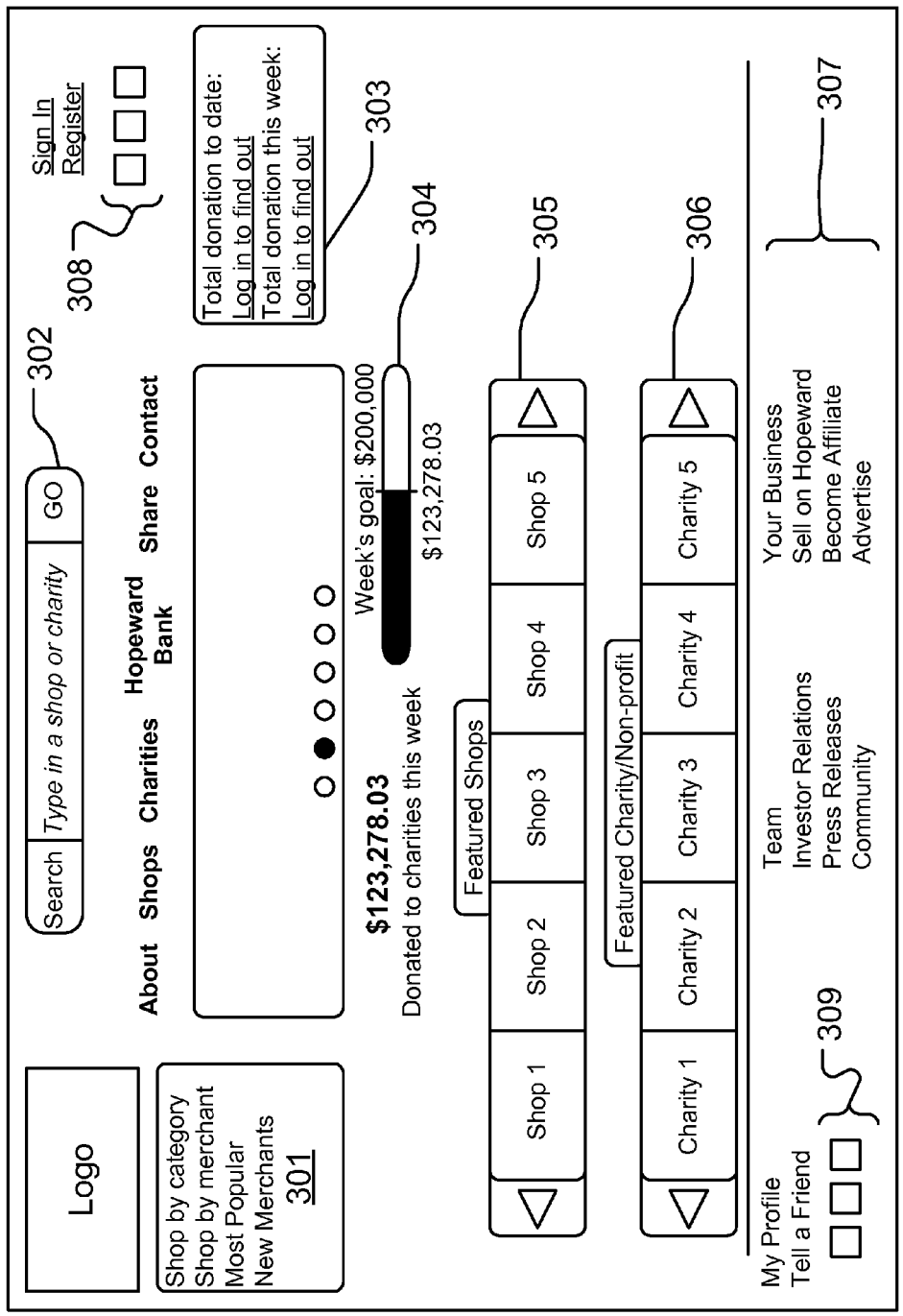

FIG. 3 is for one embodiment, as an example, for interface for user for choices for shop by category, shop by merchant, most popular, new merchants, and the like (301). It has a search box for shop and charity (302) from our databases. It has a sign in or register section, using other sites or databases (308). It has choices for menu, e.g., About, Shops, Charities, Hopeward/charity Bank, Share, and Contact. It has the total year to date or this week/month listed, for donations or purchases (303). It has weekly goal or deadline event for a specific event, with a visual indicator as how much has been achieved, in multiple forms or formats (304). It displays featured shops (305) for browsing, review, or search, and featured charities (306), with arrows to go through the list. It can access "my profile", and it can also refer this to a friend through a social site (309), so that they can make their own FAV (favorite) entities, too, in addition to the ones by the original user. It also has the informational menu and related functions (307).

Figure 4:
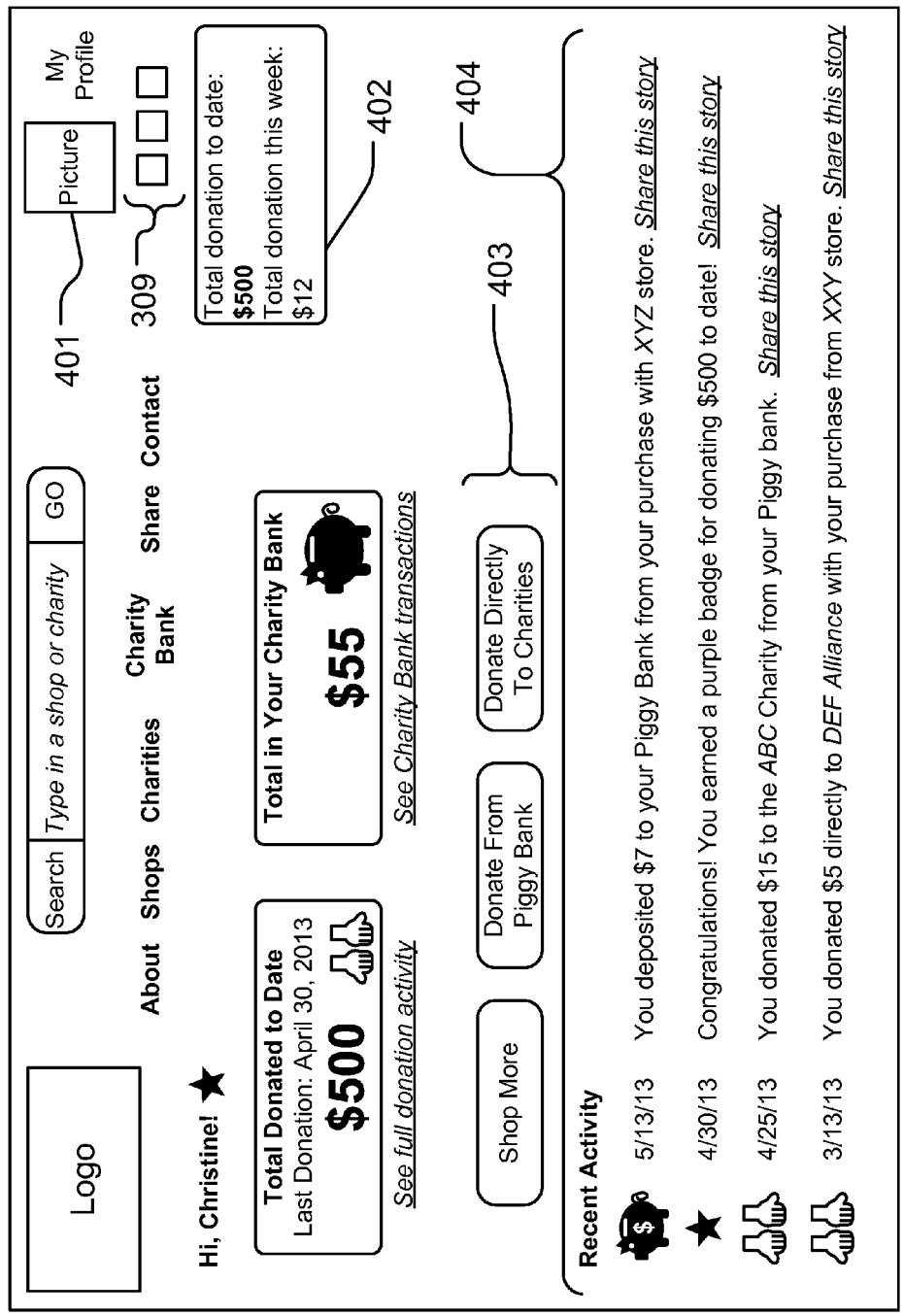
FIG. 4 is for one embodiment, as an example, for interface for user, with picture, for My Profile.

FIG. 4 is for one embodiment, as an example, for interface for user, with picture (401), for My Profile. It has in the menu options for charity bank, share, and contact. It is customized for the user, in terms of look/appearance. It shows color badges for charity achievements for different levels, e.g., for highest dollar value/amount, fastest growing, fastest growth for a newcomer, highest recent member, highest average, recent highest, max so far, max this year, max this period, most referral, best result from referral, most friends in charity, highest accumulated for friends, highest accumulated for a group, highest relative contributions (relative to income or position or age or geography or charity or cause or type or school or country or regional or class of entities), and the like. It shows the total or averages, 402, in various form and formats. It shows the recent and all transactions and donations. It shows the options such as Shop More, Donate From Piggy Bank, and Donate Directly To Charities, as an addition or separate from the merchandise purchases, for the user. It shows the recent activities and dates for donations and transactions, with symbols, and badges, with a short description, which can be sent to a friend in a social media as well, or to her email/mobile device, as text or SMS, for showing to all or friends about goodwill and good deed, to encourage others, 404.

Figure 6:
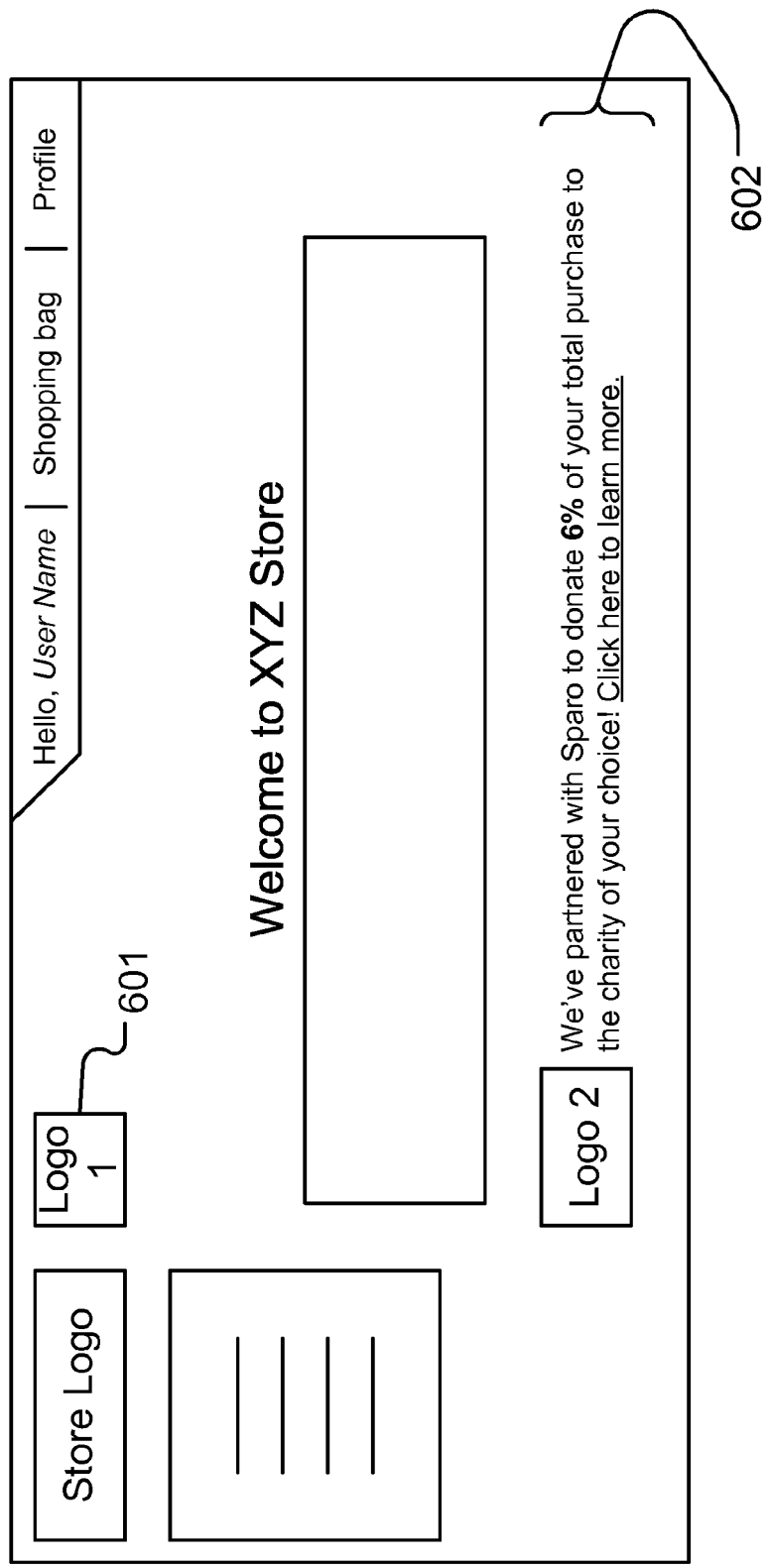
FIG. 6 is for one embodiment, as an example, for interface for user, for store, with logo, with messages about donations, percentages, and transactions.

FIG. 6 is for one embodiment, as an example, for interface for user, for store, with logo, with messages about donations, percentages, and transactions. The Sparo standalone logo, 601, invokes the popup dialog or page for donation or the website. It may be a reference to a script at Sparo, 602, dynamically generated based on the merchant's ID. The message may be tailored via the admin interface, and the percentage may be obtained from the database based on the current time/date.

In various embodiments, for example as depicted in FIG. 7a-e, the user browses and selects items/services from a merchant's website for purchase, and the merchant provides donations (e.g., as a percentage of the total purchase) to the charities selected by the customer.

Figure 7A:
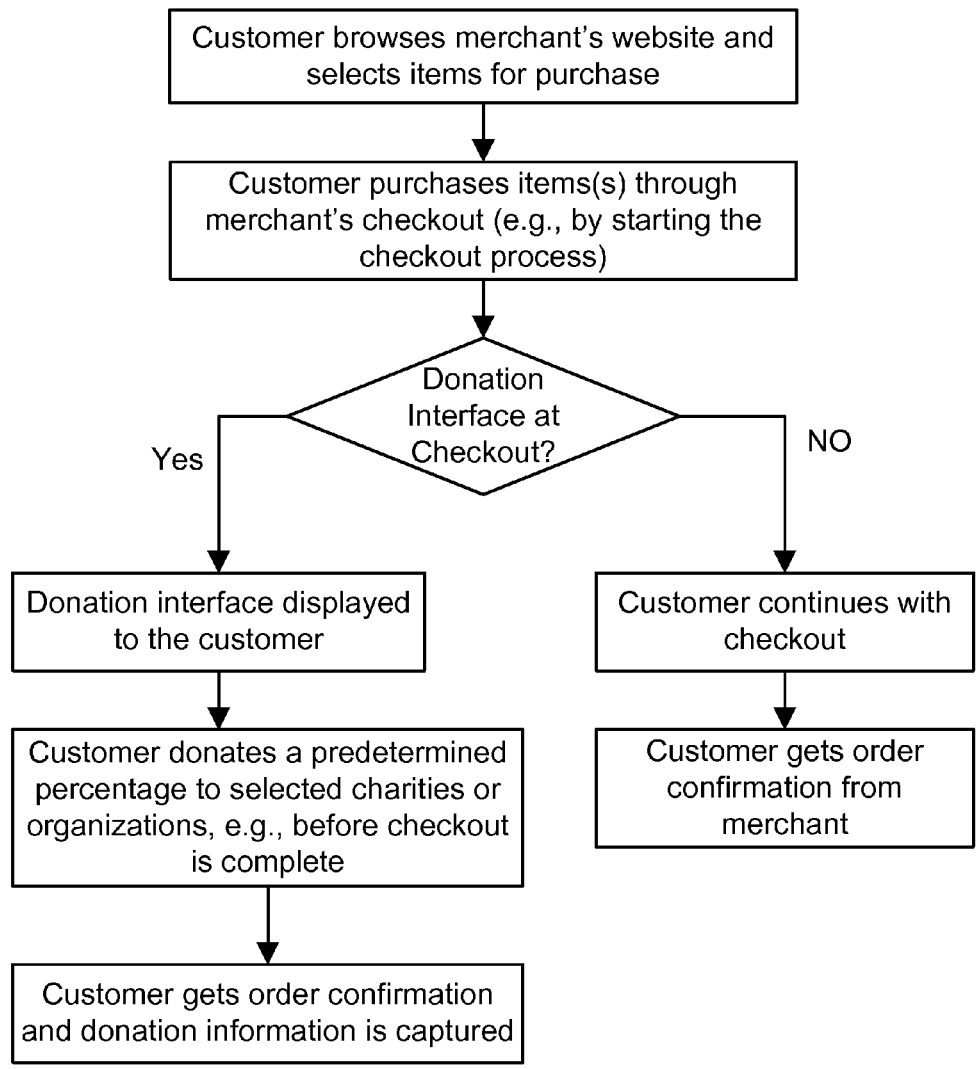
FIGS. 7a-e are for embodiments, as examples, for method for user, to browse merchant's website and make a purchase, with donations based on purchase to select charities before and after the checkout process.

An embodiment, as for example depicted in FIG. 7a, a donation user interface is presented to the user at the checkout process where the user selects one or more charities, e.g., prior to the completion of the checkout process. After the selection, the checkout is completed and the user is presented with the confirmation(s) for such a donation/transaction. In such an embodiment, a reference ID is generated by the donation agent (e.g., as a primary key to a database table) to associate with the transaction. Once the transaction is complete, the merchant's confirmation code or transaction ID is captured (e.g., via API or script/plug-in running on client's side) and associated with the reference ID generated by the donation agent. In one embodiment, the amount of the transaction used for determining the donation amount is captured and recorded by donation agent. In one embodiment, the confirmations are in form of both on-screen and email or TXT.

Figure 7B:
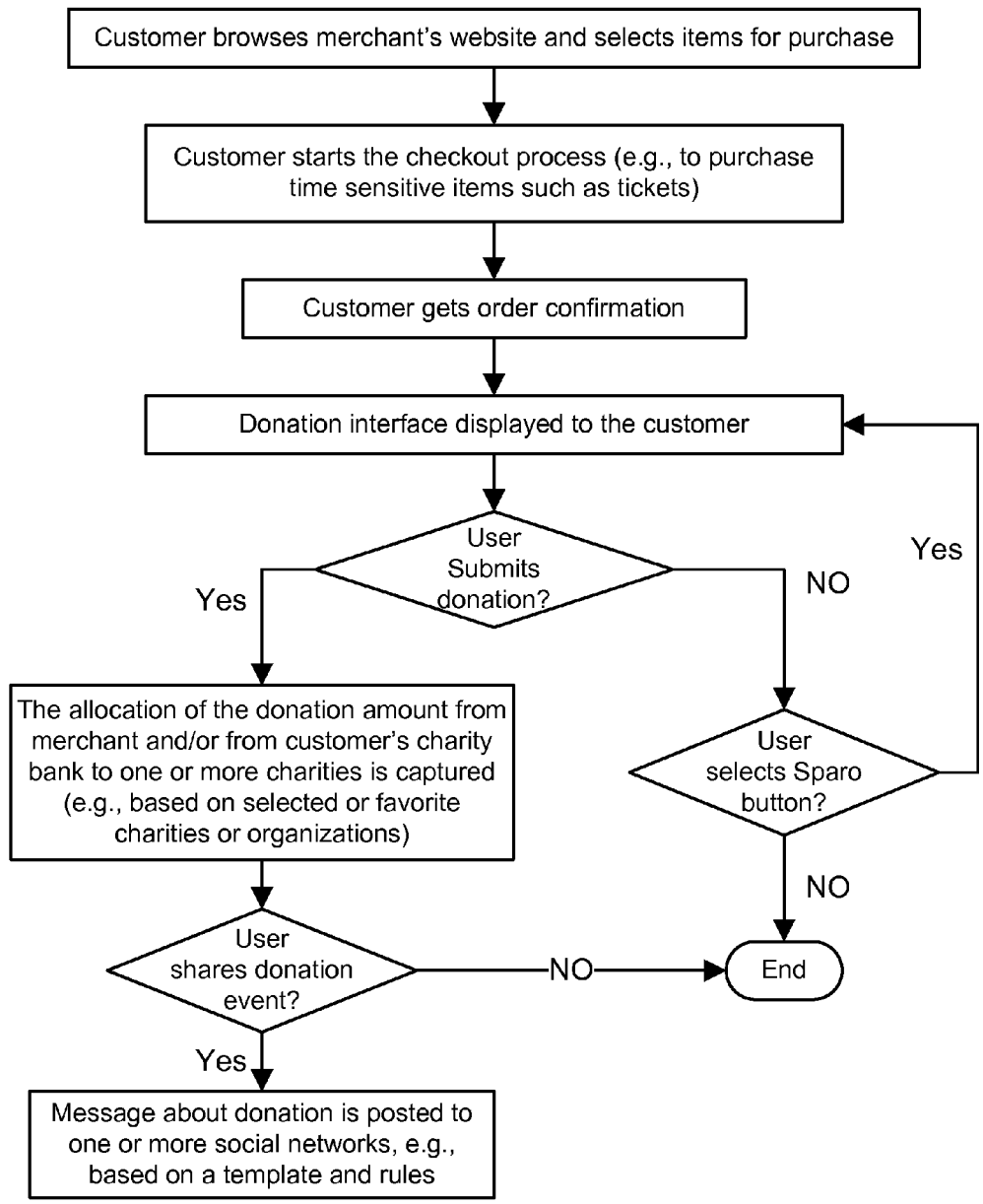
Figure 7C:
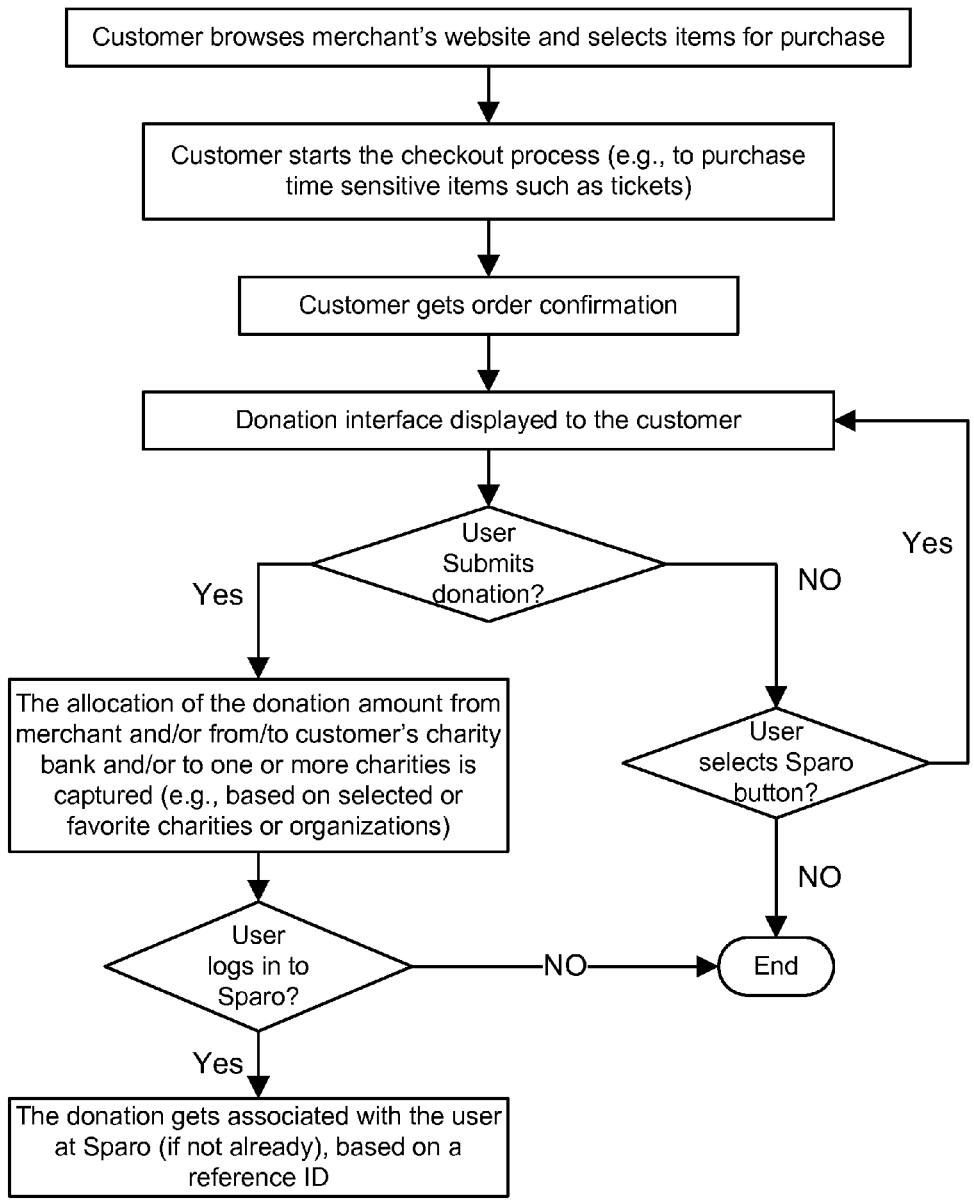

An embodiment, as for example depicted in FIG. 7b, a donation interface is displayed to the customer after the checkout confirmation, for the customer to choose charities of choice for donation. In one embodiment, the confirmation code (e.g., at checkout) and/or purchase information is captured for determining the amount of the donation based on the merchant's settings queried from the database such as the current percentage rate. In one embodiment, the browser session ID is captured and used to query the purchase information (e.g., amount and merchant's confirmation code/transaction ID) to associate with a transaction ID generated by the donation agent. In one embodiment, the customer may still invoke the donation interface (if previously dismissed it after the checkout process). In one embodiment, the user logs into donation agent (e.g., by signing in as a returning member or signing up as a member), e.g., to bring the customer's favorite charities into the interface. In one embodiment, the customer uses a social network posting feature to share the information about the donation on one or more social networks. In one embodiment, the shared message is automatically constructed based on a template with the merchant's information and rules. In one embodiment, the customer enters own comments about the donation activity in the message. In one embodiment, the customer can select the charities of choice without logging into or signing up with the donation agent and the donation is recorded and associated with a generic guest in the database. In one embodiment, as for example depicted in FIG. 7c, the donation interface is displayed after the checkout process (e.g., for merchants who work on a time-sensitive basis such as ticket sales). In one embodiment, after the customer selects the charities for donation, the donation agent captures the transaction information and associates it with a reference ID. If subsequently the customer logs into donation agent, the transaction is associated with the member by looking up the reference ID. In such an embodiment, the transaction will show up when the member logs into the donation portal.

Figure 7D:
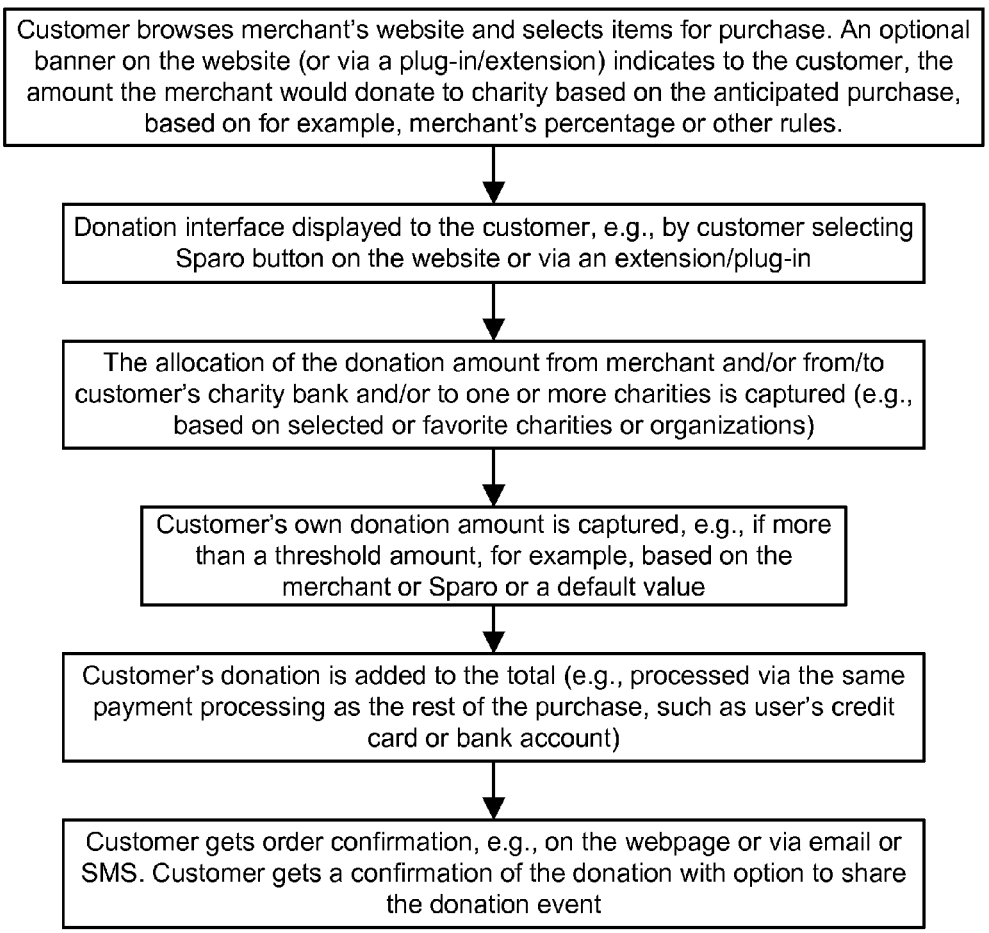

In one embodiment, for example as depicted in FIG. 7(d), customers are provided with a user interface prior to the checkout process, e.g., a "Sparo" button to participate. In one embodiment, this presents an option for merchants to have the donation agent appear more subtle as a more intention-driven feature during the checkout process, to filter in customers who purposefully want to purchase with a purpose of donating to charities. In one embodiment, a promotional banner alerts new customer to what Sparo/donation agent is. In one embodiment, donation agent codes/scripts are downloaded from the merchant's website, referenced/imported via merchant's webpage, or invoked via an extension or plug-in installed at the user's browser. In one embodiment, the merchant's application interacts with the donation agent in the backend, e.g., via an API. In one embodiment, the banner indicates based on the items in the shopping cart (e.g., total purchase amount), the amount of donation anticipated by the merchant. In one embodiment, the donation agent and merchant's application communicate via e-commerce platform (e.g., a shared platform type or predetermined APIs). In one embodiment, the buttons or banners on the webpage are generated via scripts embedded or referenced on the webpage. In one embodiment, upon customer's selecting the buttons/interface corresponding to the donation agent, the donation interface is displayed to the customer to select charities of choice. The customer may sign-in, sign-up or participate a guest with donation agent in selecting such charities. In one embodiment, the customer is provided with an interface to also personally donate to the charities of choice (for example as depicted in FIG. 29(d)). In one embodiment, a minimum (and/or maximum) threshold amount(s) (e.g., based on merchant's settings, donation agent's settings, the member's settings (if logged in), or a default values) are used to limit such personal donations from the customer. In one embodiment, personal donation from the customer is captured at the checkout as a separate donation item to be processed by the same payment process/system. In one embodiment, the donation agent captures both the personal donation and the merchant's donation associated with the transaction. In one embodiment, the customer (if logged in a member of the donation network), specifies donation to charities from the corresponding charity (piggy) bank, based on the amount available in the charity bank and the rules/limitations imposed by the merchants associated with the portions available in the charity bank associated with the member.

Figure 7E:
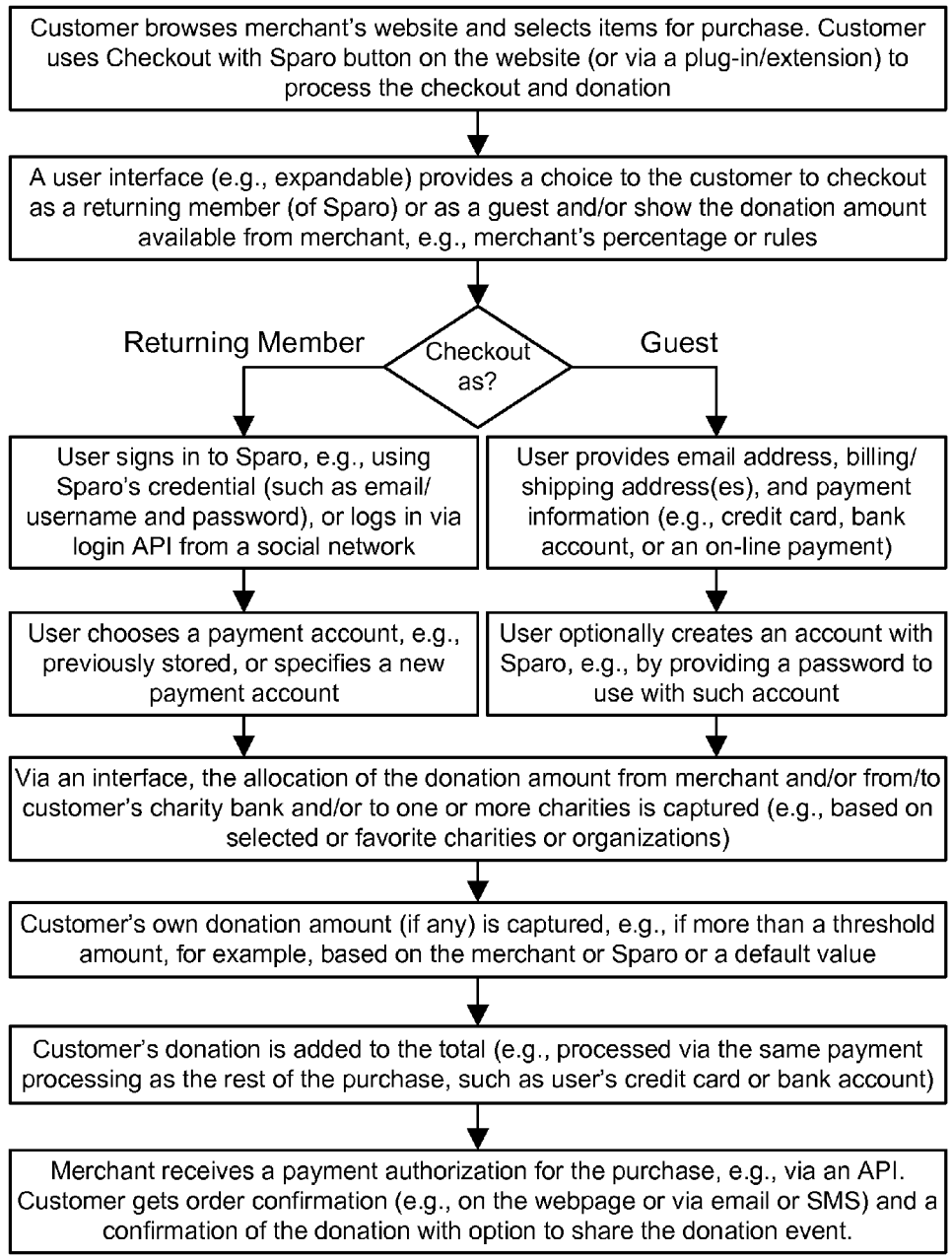

In one embodiment, as for example depicted in FIG. 7(e), the checkout process is done via donation agent (e.g., for fast checkout for returning members/customers). In one embodiment, the customer is provided with a choice to checkout as a guest or as a returning member (e.g., as depicted in FIG. 29(b)). In one embodiment, the customer proceeds as a guest (e.g., as depicted in FIG. 29(c)). In one embodiment, the customer choosing to proceed as a returning member, is provided with an interface to choose (or enter) payment information (e.g., previously stored). In one embodiment, the customer's own donation, purchase amount are processed based on the payment information/authorization, and the authorization (or confirmation ID) is returned to the merchant's server (e.g., via API) to complete the checkout at the merchant's side. In one embodiment, the donation amount and fees corresponding to the transaction is communicated to the merchant upon the completion of the checkout (e.g., as information or as part of invoicing process).

In one embodiment, a user selects default (e.g., favorite or a subset of favorite) set of charities for donations to be given. In one embodiment, the donation interface during checkout is suppressed or not presented to the user based on merchant's setting and/or user's settings (e.g., if logged in or determined based on browser's history or cookie). In one embodiment, the default charities are used as pre-selected donees without presenting the donation interface. In one embodiment, the distribution of the donation amount between the selected charities is based on their priority (e.g., high, medium, or low, as for example depicted in FIG. 37 for associated matching causes). In one embodiment, the distribution of donation amount is driven based on a stochastic process to choose a set of charities based on the corresponding priorities.

Figure 8:
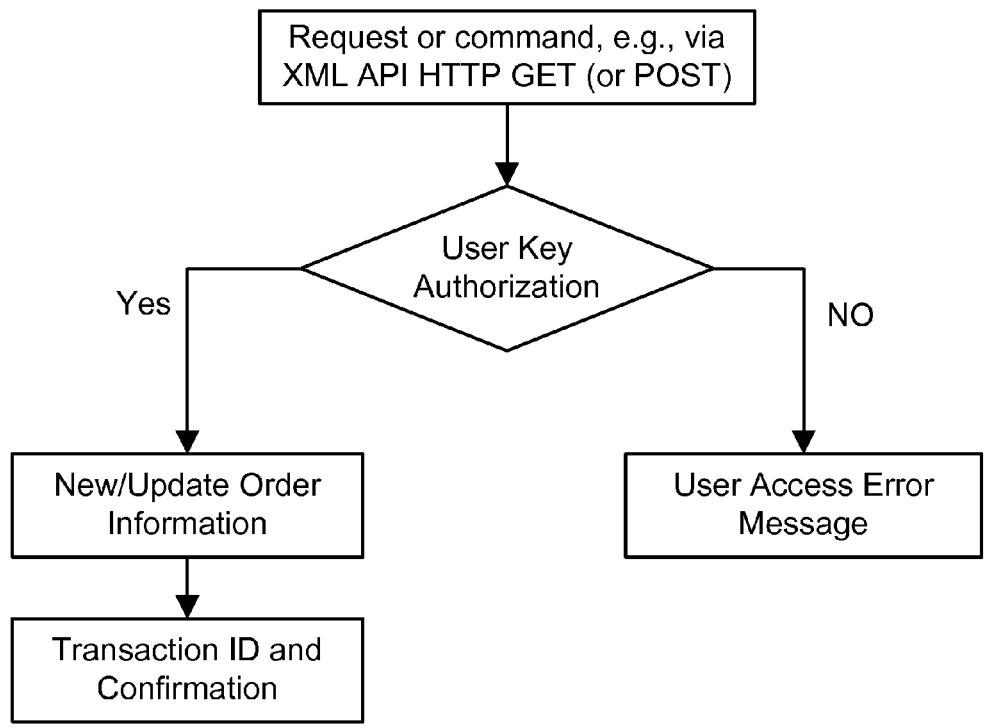
FIG. 8 is for one embodiment, as an example, for method for request or command using e.g. XML, with user key authorization.

FIG. 8 is for one embodiment, as an example, for method for request or command using e.g. XML, with user key authorization. It follows by new or update order information or user access error message.

FIG. 9 is for one embodiment, as an example, for interface for merchant portal, with store name, merchant ID, percentage of charge, store logo and information (which is editable). It shows revenue generated, account balance, payment button, invoice view, invoice history, and auto-payment methods. It lets user view and manage transactions, as well as report returns for a time period. It has the account manager section, with information field, which is editable, as well as password (which can be changed here). It displays payment confirmation, cancelled/returned confirmation, on-line/electronic invoice to merchant, invoicing history, downloadable in various formats, e.g., XLS or PDF, and ACH payment interface and processing module. It can also use XML language for this purpose.

FIG. 10 is for one embodiment, as an example, for interface for merchant portal, for merchant transaction management, with profile, store name, and unique merchant ID number, plus percentage of charge. It displays canceled or returned items. It can search the database, also export the information. The user can choose the time period. It can display the order details, which can be automatically searched or manipulated, or in one embodiment, manually searched and edited/changed. It can also have Merchant's Transaction ID and Charity network TX ID (unique), which can be matched or compared. It allows the partial returns on part of the items, which subtract from the corresponding sums so far, to keep track of net transactions. It does the functions automatically, via API. In one embodiment, the merchant can manually enter a TX, search for a charity or charities, and add transaction under Action. It can also undo the addition, cancellation, and returns. It can Add TX (transaction) by entering values on the table, or search charity (Action becomes Add transaction). In one embodiment, the Action button choices are marked as returned or marked as canceled.

Figure 11:
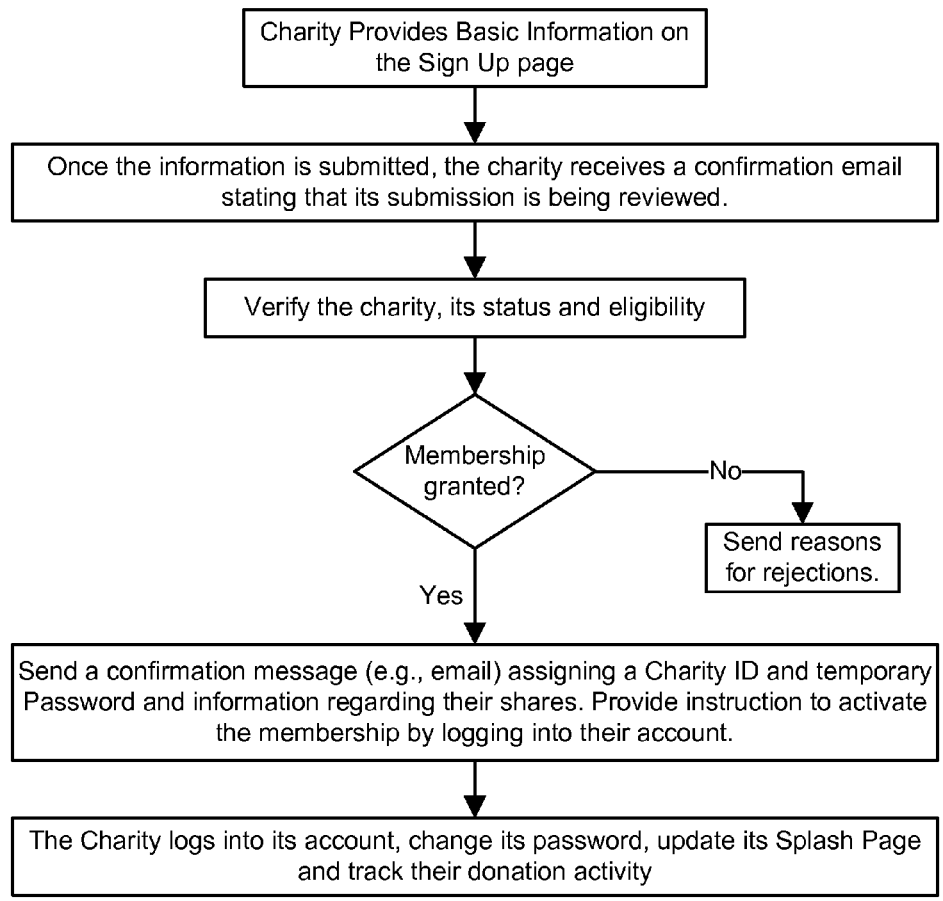
FIG. 11 is for one embodiment, as an example, for method for charity, with sign up, verification, and granting membership.

FIG. 11 is for one embodiment, as an example, for method for charity, with sign up, verification, and granting membership. It has a confirmation message for payment. It also has charity logs, with tracking the activities. It has the choices for bank account, direct deposit, using a check, or other methods of fund transfer. It has a section for Contact Information, with an option for Change of Contact. It specifies categories: Animals, Arts, Culture, Humanities, Education, Environment, Health, Human Services, International Development, and others. In one embodiment, it collects administrative fee for Class B shareholders, as charities or schools getting non-voting shares, to help the network grow, for goodwill and advertisement, and as a partner with our network.

FIG. 12 is for one embodiment, as an example, for interface for charity portal, with donations and disbursement tracking, with snapshot and history, with charity ID number, for a transaction period, with totals and accumulated values. It has a feature for exporting information. It has tables for display.

FIG. 13 is for one embodiment, as an example, for interface for charity portal, with donations and disbursement tracking, with pending donations, transactions, and details.

FIG. 14 is for one embodiment, as an example, for an interface for charities, at different levels, or topics, or size, or overhead, e.g. at international, national, state, or local scope, with favorite ones, and showing the performance or overall score, by us or third parties. These can be searched from our site. These can be filtered on criteria/conditions by our site. It can match it to the location by zip code or address or email or server location or history or other personal data or cookies or behavior/trend analysis. The preference can be based on categories and the priorities of causes and the level of matching with charities. Similar interface as above can be used for donating money to charities.

Figure 15:
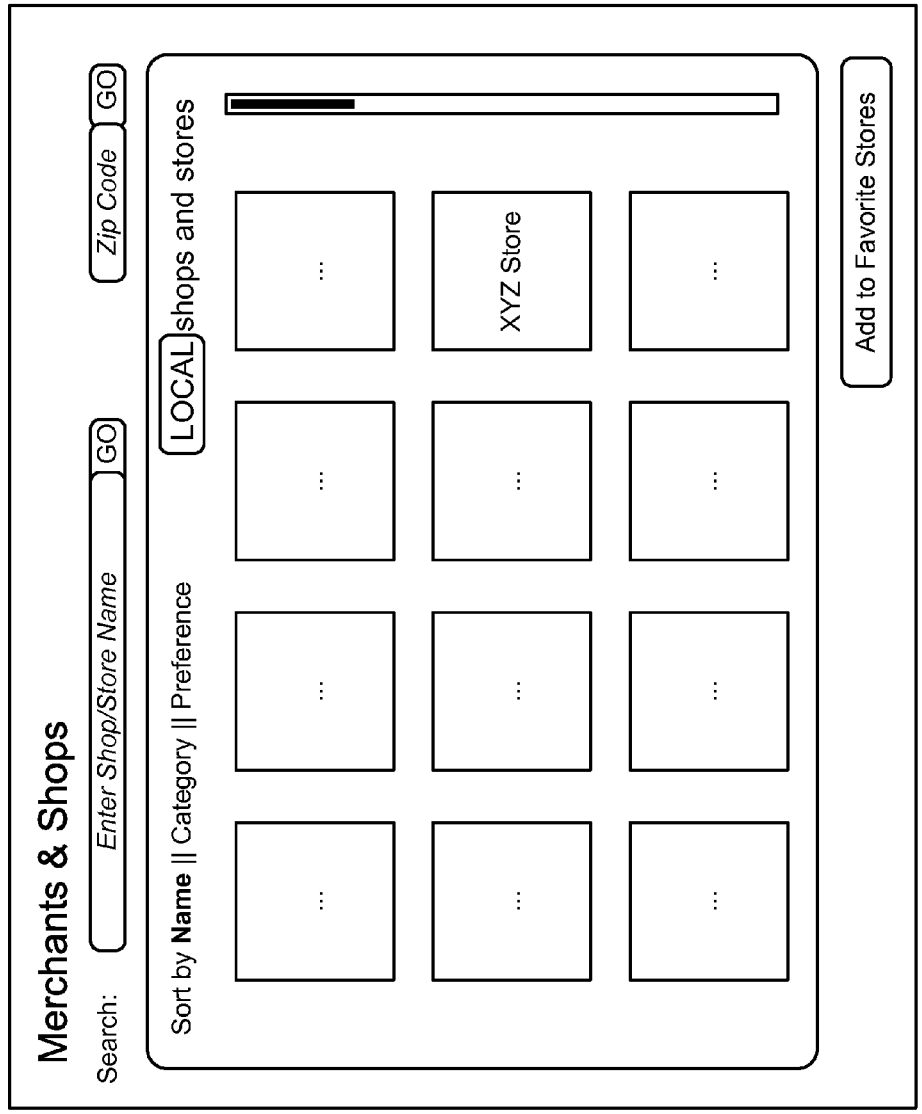
FIG. 15 is for one embodiment, as an example, for interface for merchants and shops/stores.

Here are some examples for charities/non-profits:
Animals
Animal Rights and Animal Shelters
Wildlife Conservation
Zoos and Aquariums
Arts, Culture, Humanities
Museums
Public Broadcasting
Historical Societies
Landmark Preservation
Theaters and Performing Arts
Education
Libraries
Universities and Colleges
Elementary, middle, and high Schools
Other Education Programs and Services
Environment
Parks
Environmental Protection
Preserves and Conservation
Health
Medical Research
Diseases and Disorders Education
Patient, nursing and daycare Support
Treatment and Prevention Services
Human Services
Social Services
Children's and Family Services Youth Development and clubs
Shelter and homeless Services
Food Banks
International
Humanitarian Relief
Development Services
International Peace Advocacies
Public Benefit
Civil Rights
Public Policy
Fundraising
Community Development
Religion
Religious activities
Religious advocacies FIG. 15 is for one embodiment, as an example, for interface for merchants and shops/stores, with local ones found using zip code or similar methods as mentioned elsewhere in this disclosure. It can search for the stores, or add them to the favorite list. It has a set aside program for donation amount from several merchants to sign up new members (e.g., give those members to contribute a large amount to their favorite charities, by signing up and going to those stores to shop). This also could be part of a lottery type distribution, on top of the percentage method. It can find out what the new members are interested in and recommend relevant shops. It can collect the information on demographics of buying habits. We also have periodic charity drives set aside.

Figure 16:
FIG. 16 is for one embodiment, as an example, for interface for the user, customized, with menu, logo, picture, and totals.

FIG. 16 is for one embodiment, as an example, for interface for the user, customized, with menu, logo, picture, and totals. It also has a detailed donation activity, during a time period, using a table or listing. It can also connect to My Profile for the user. FIG. 17 is for one embodiment, as an example, for interface for the user, for activities for piggy bank, for donation and information, e.g. for date, time, source, recipient, amount, and balance, with a period specified.

FIG. 18 is for one embodiment, as an example, for interface for the piggy bank, with suggestion to friends. If multiple charities are selected, then it tries to distribute the donation evenly, or use the user's preference for distribution, e.g., based on the categories. It also allows selection of categories to donate (e.g., among favorite charities or environmental ones).

Figure 19:
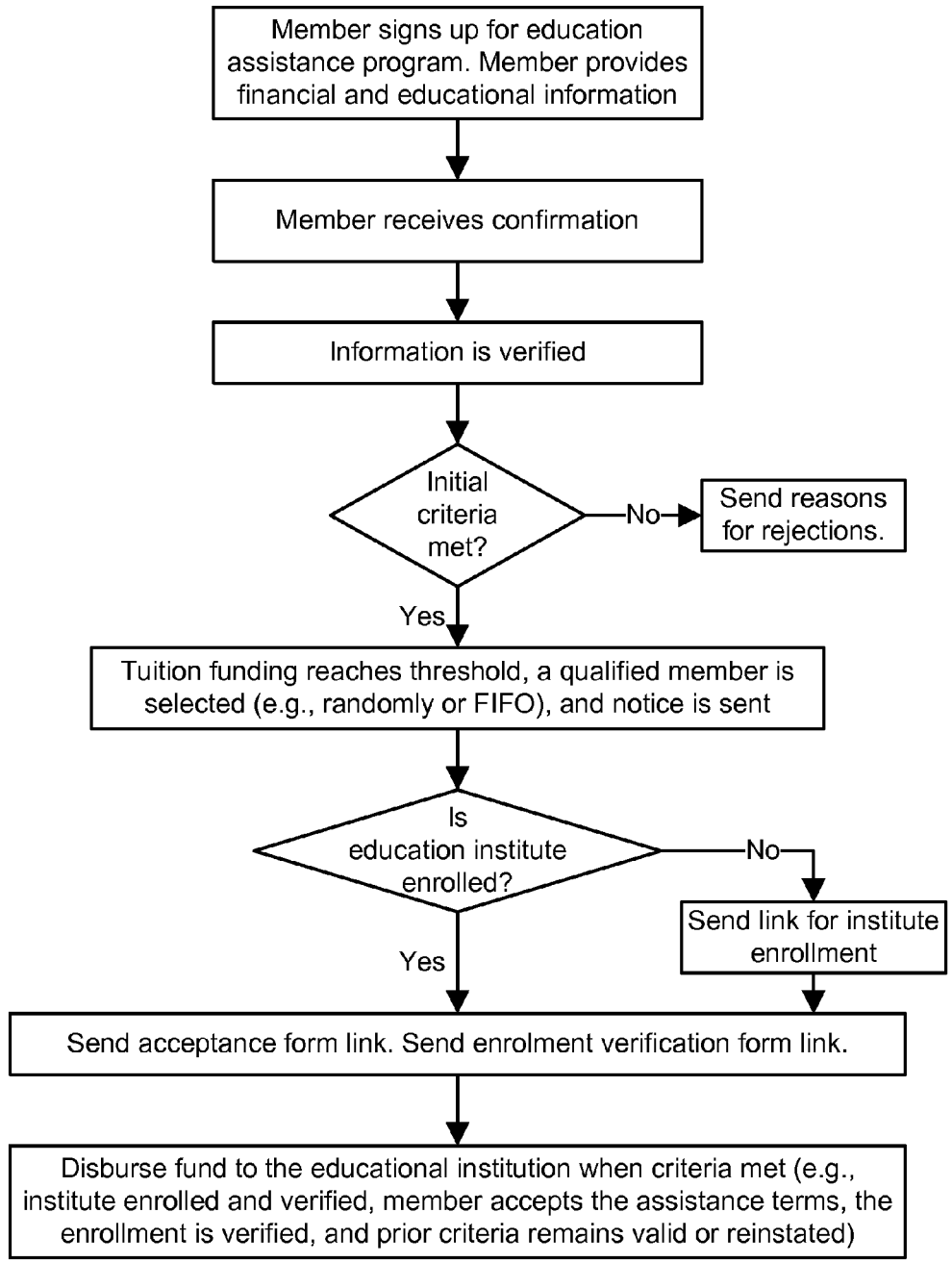
FIG. 19 is for one embodiment, as an example, for method for student scholarship, with verification step, and initial criteria.

FIG. 19 is for one embodiment, as an example, for method for student scholarship, with verification step, and initial criteria, which may include some personal information as filters. After a threshold is reached or a condition is met, and subject to verification and acceptance, the fund goes directly to the school on behalf of the student. Member, as an example, signs up for tuition assistance program, provides information including financial, and gets confirmation. The Sparo Tuition Bank has reached $5,000 and the name was randomly selected as the recipient of $5,000 in tuition assistance. The Acceptance form is used, electronically. Agreement form/with university is established. It needs to verify the authorization, by recipient at school, before sending any funds. Then, the Student Enrollment Verification form is processed. It also needs to verify the signer/identity/authority. The colleges can enroll in advance, or for the first time, when a student applies for the tuition assistance. It can also include a loan payment to the financial institution, requiring enrolling the financial institution. After the transfer/payment, the confirmation is issued.

Figure 20:
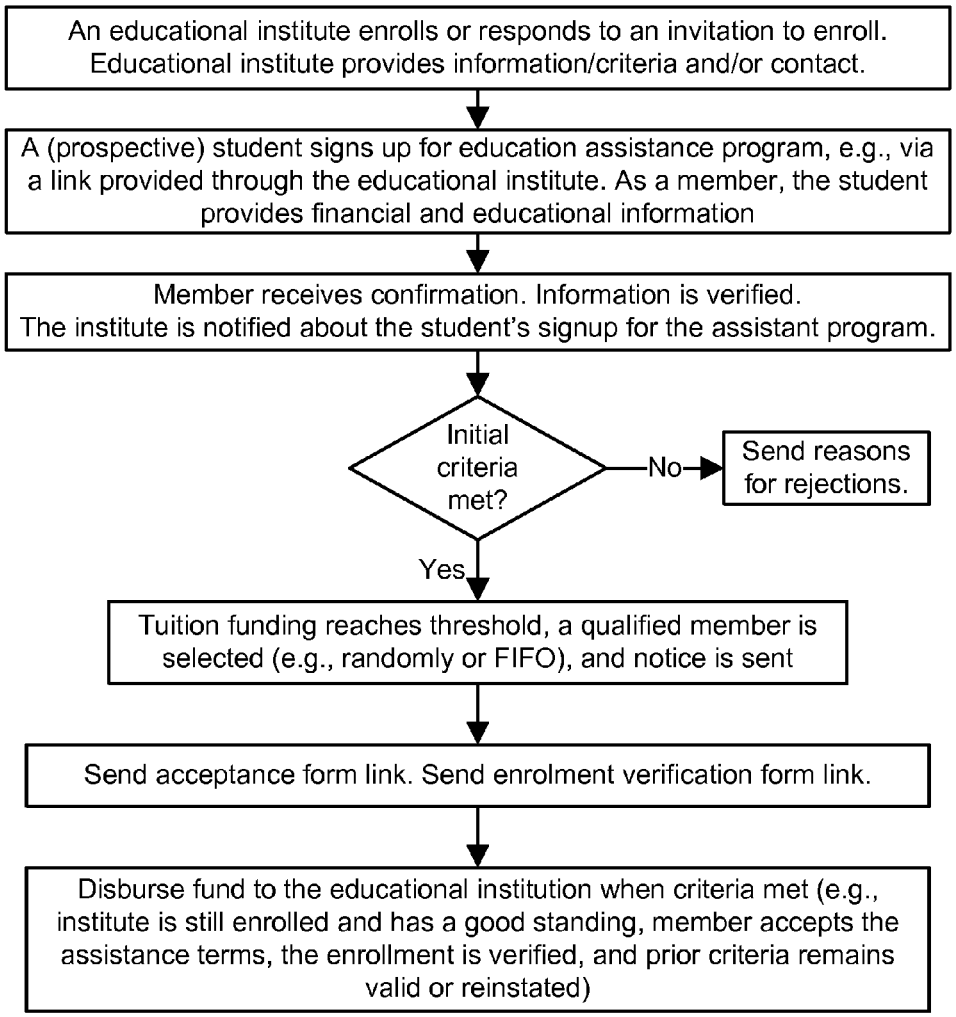
FIG. 20 is for one embodiment, as an example, for method for schools and disbursement of the funds.
Figure 21:
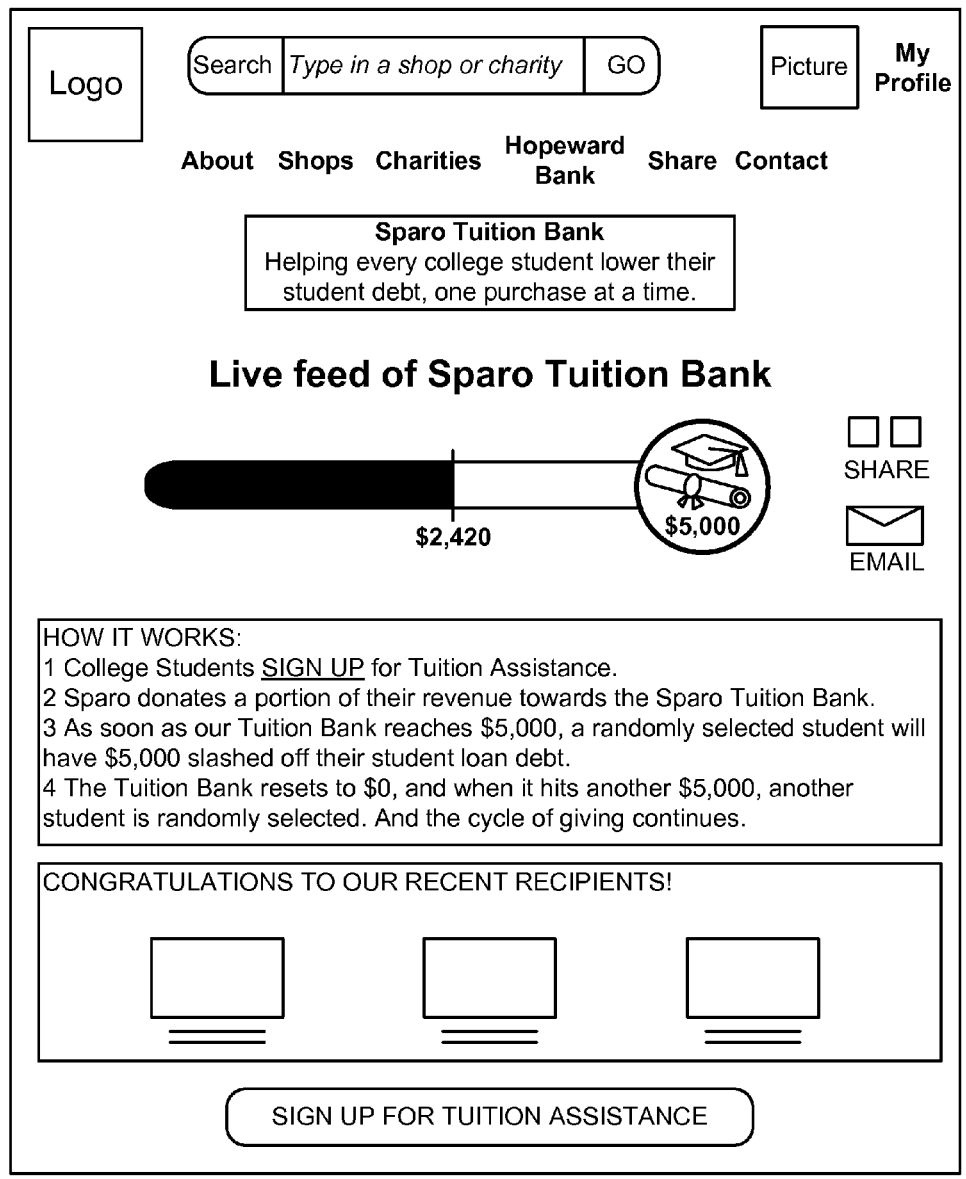
FIG. 21 is for one embodiment, as an example, for interface for our tuition bank.

FIG. 20 is for one embodiment, as an example, for method for schools and disbursement of the funds. FIG. 21 is for one embodiment, as an example, for interface for our tuition bank, with details and indicators for current and past status and performance, visually, which can be shared with friends or emailed. The threshold for release point is set e.g. at 5000 US$, or at the tuition or expenses for one semester.

Figure 22:
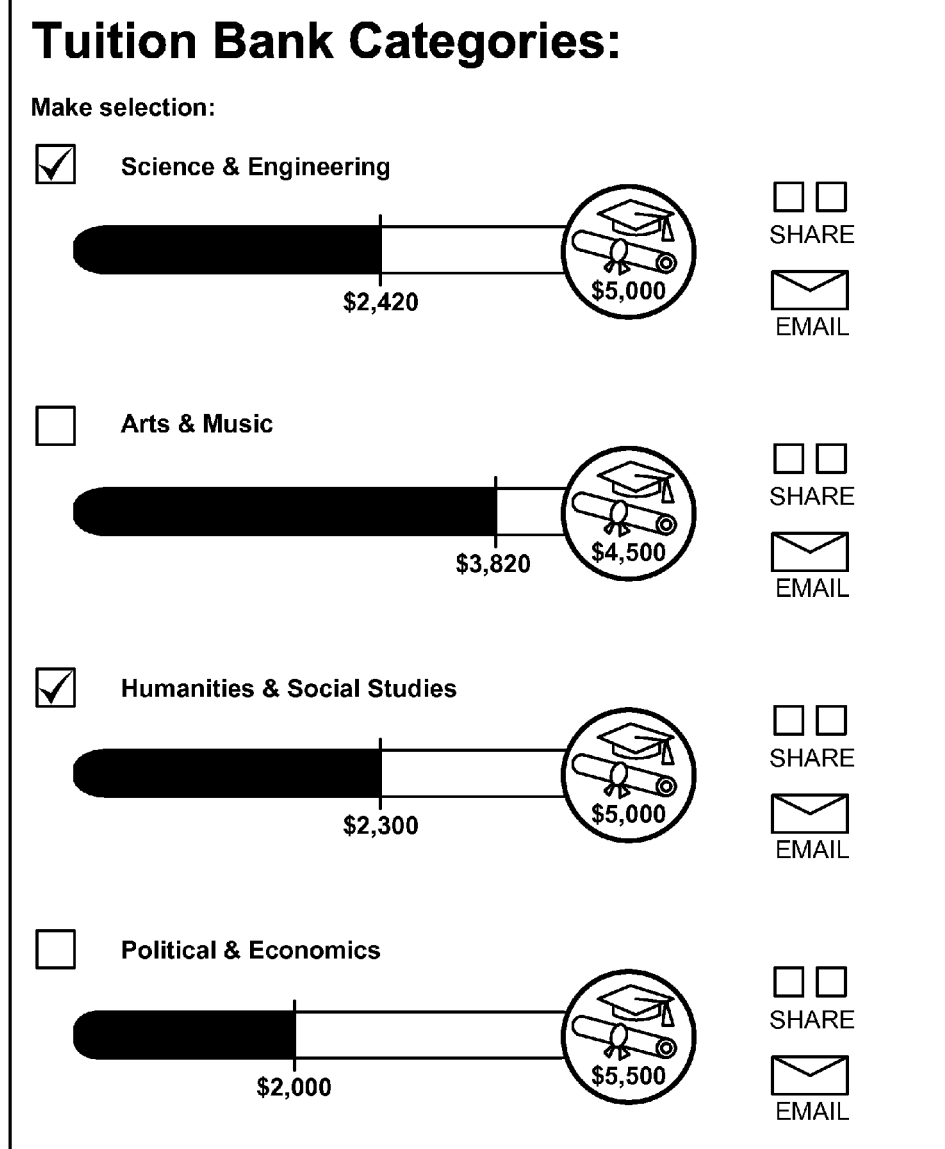
FIG. 22 is for one embodiment, as an example, for interface for tuition bank categories.
Figure 23:
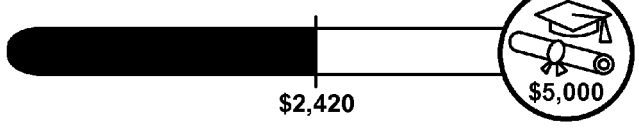
FIG. 23 is for one embodiment, as an example, for interface for tuition bank categories.

FIG. 22 is for one embodiment, as an example, for interface for tuition bank categories, with selectors, indicators, and sharing mechanisms, e.g. for engineering and music majors. FIG. 23 is for one embodiment, as an example, for interface for tuition bank categories, with selection for international, national, state, and local scopes, with roller or ruler to view them all. Geographical classification is with respect to the user's location. The criteria may be based on categories and/or institutions. The criteria may be based on the student's geography or financial need.

Figure 24:
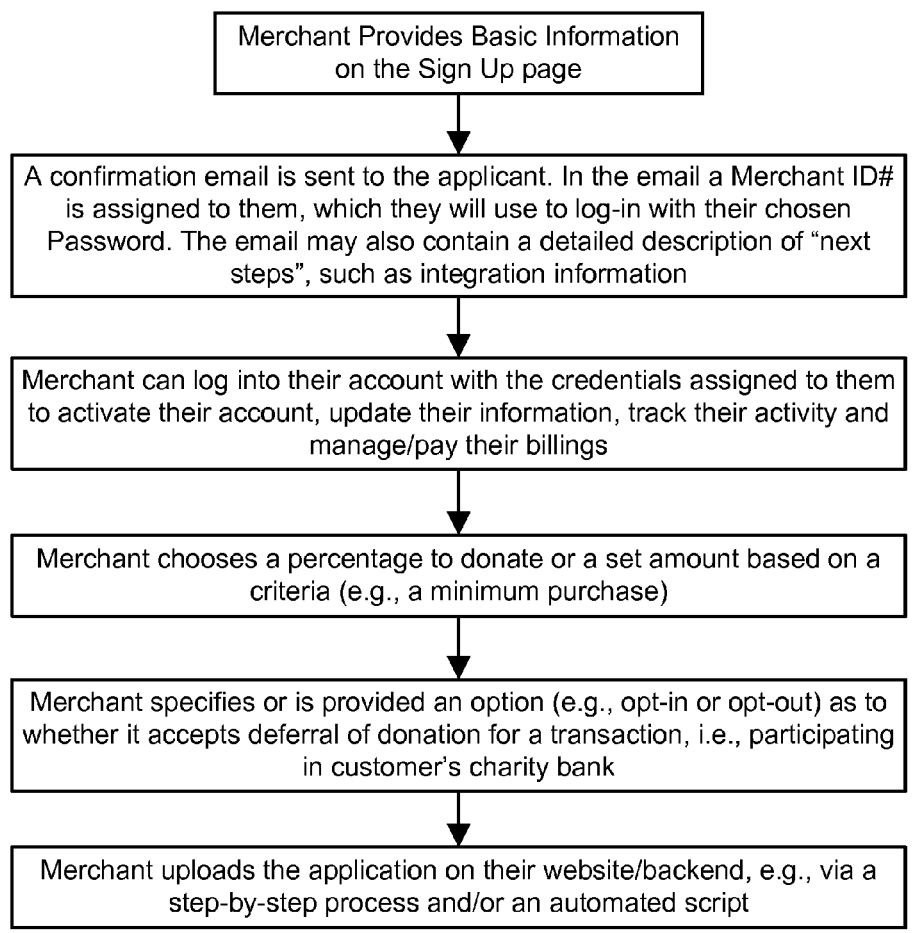
FIG. 24 is for one embodiment, as an example, for method for merchant.

FIG. 24 is for one embodiment, as an example, for method for merchant, for sign up, logging, updating, tracking, choosing a percentage, and uploading the application. There are two passwords (for one embodiment), one for IT integration, and one for financial (e.g., percentage and order). The INFO/information (for one embodiment) comprises official website, landing page, account manager info, categories of charities or restrictions, billing information, and terms and conditions. For integration platform choice, it uses pre-populated templates.

Figure 25A:
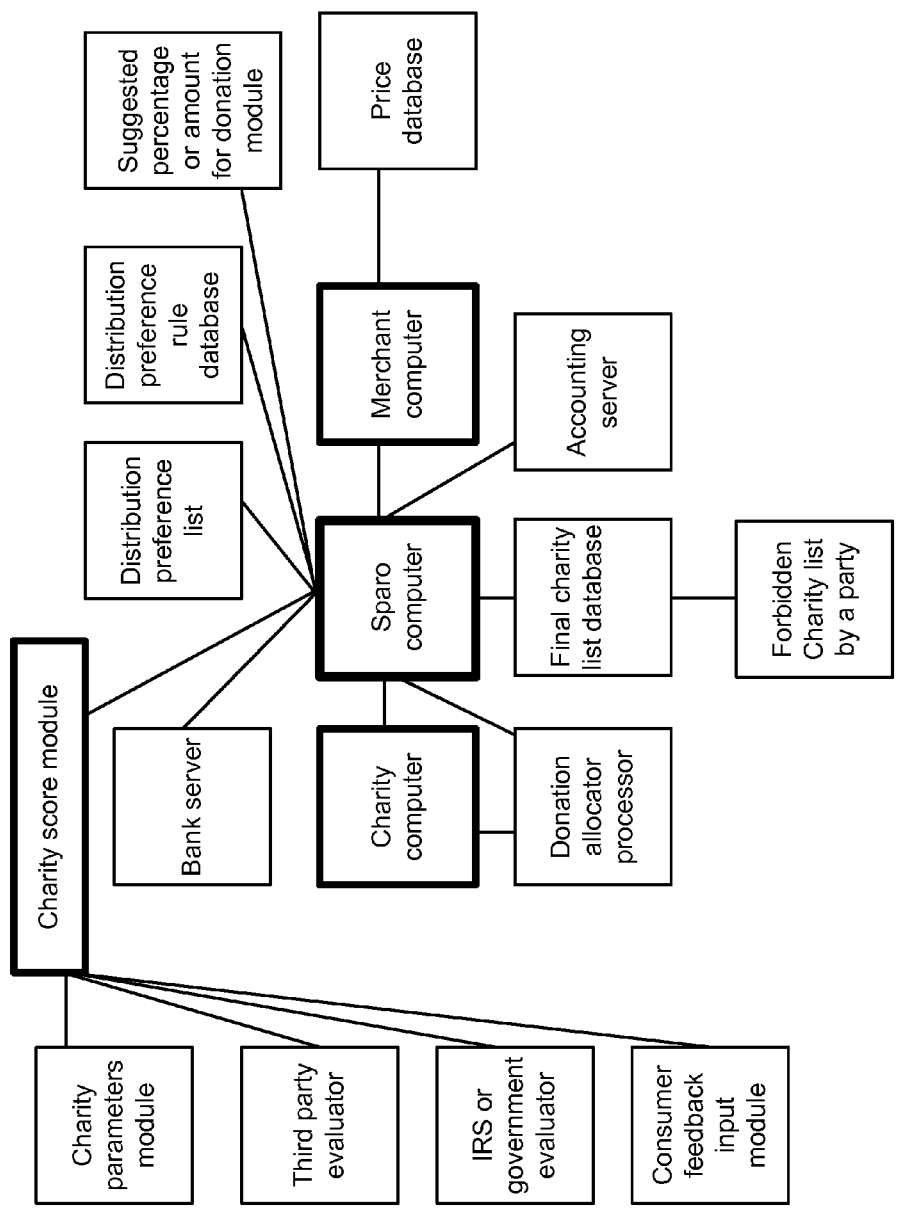
FIGS. 25a-c are for embodiments, as examples, for system for charity network.
Figure 25B:
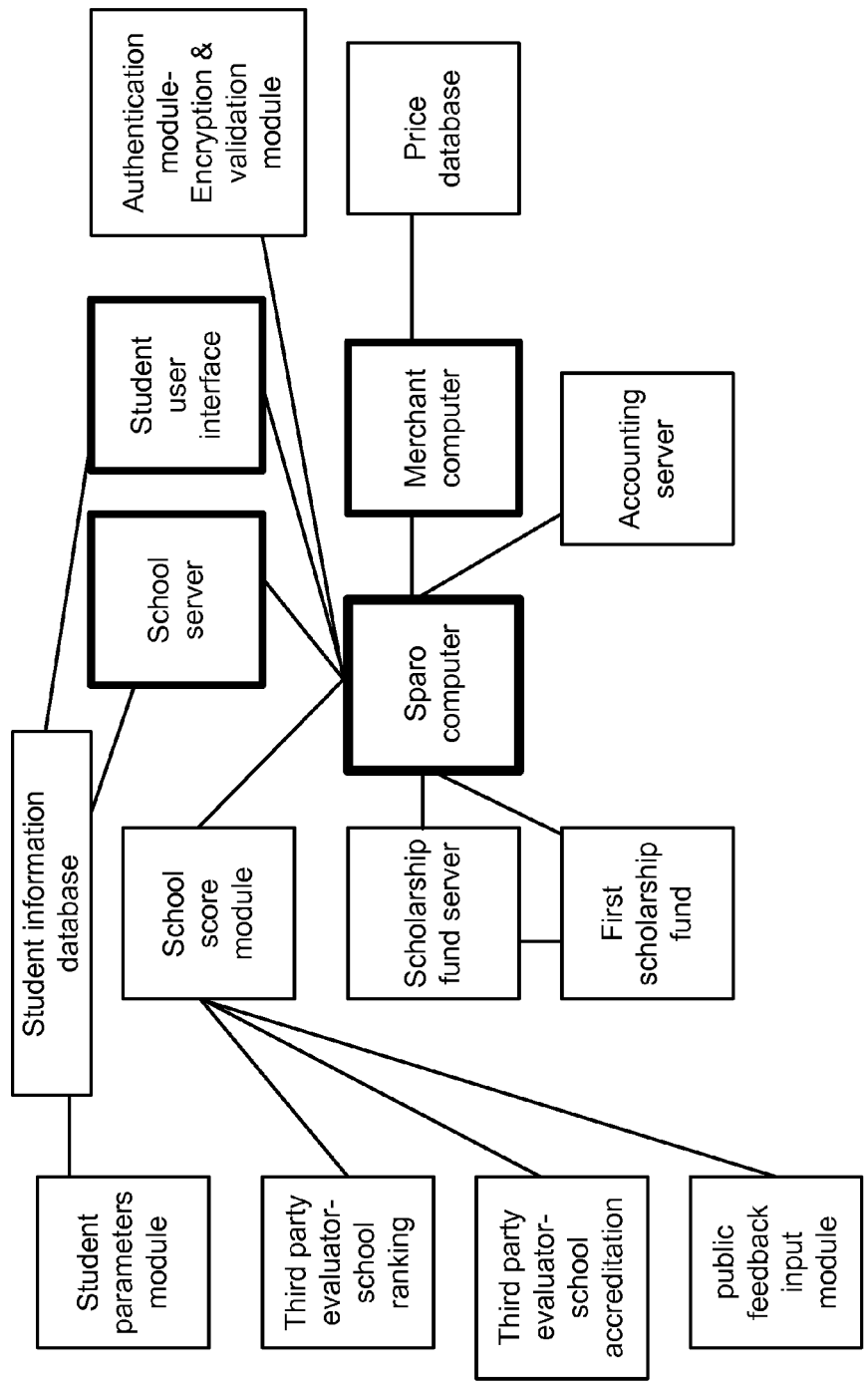
Figure 25C:
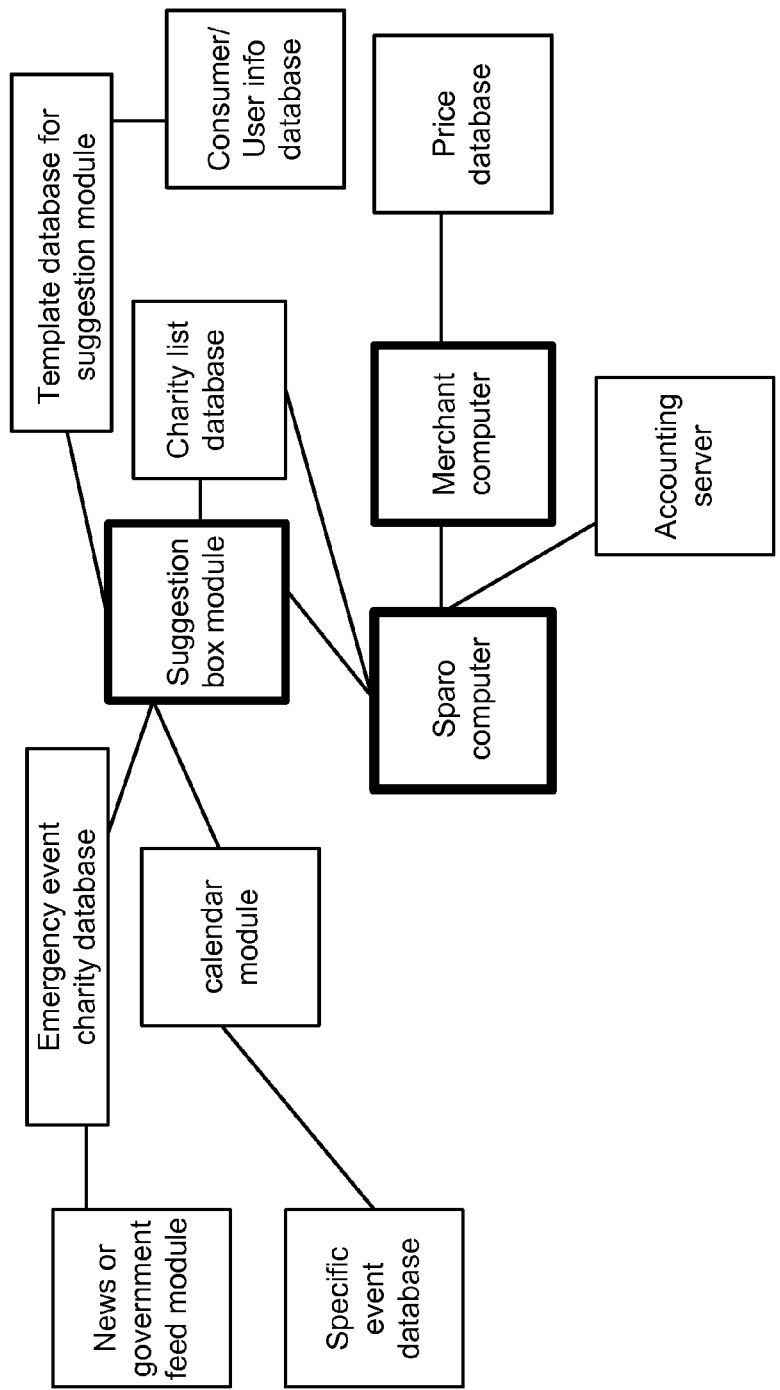
Figure 26:
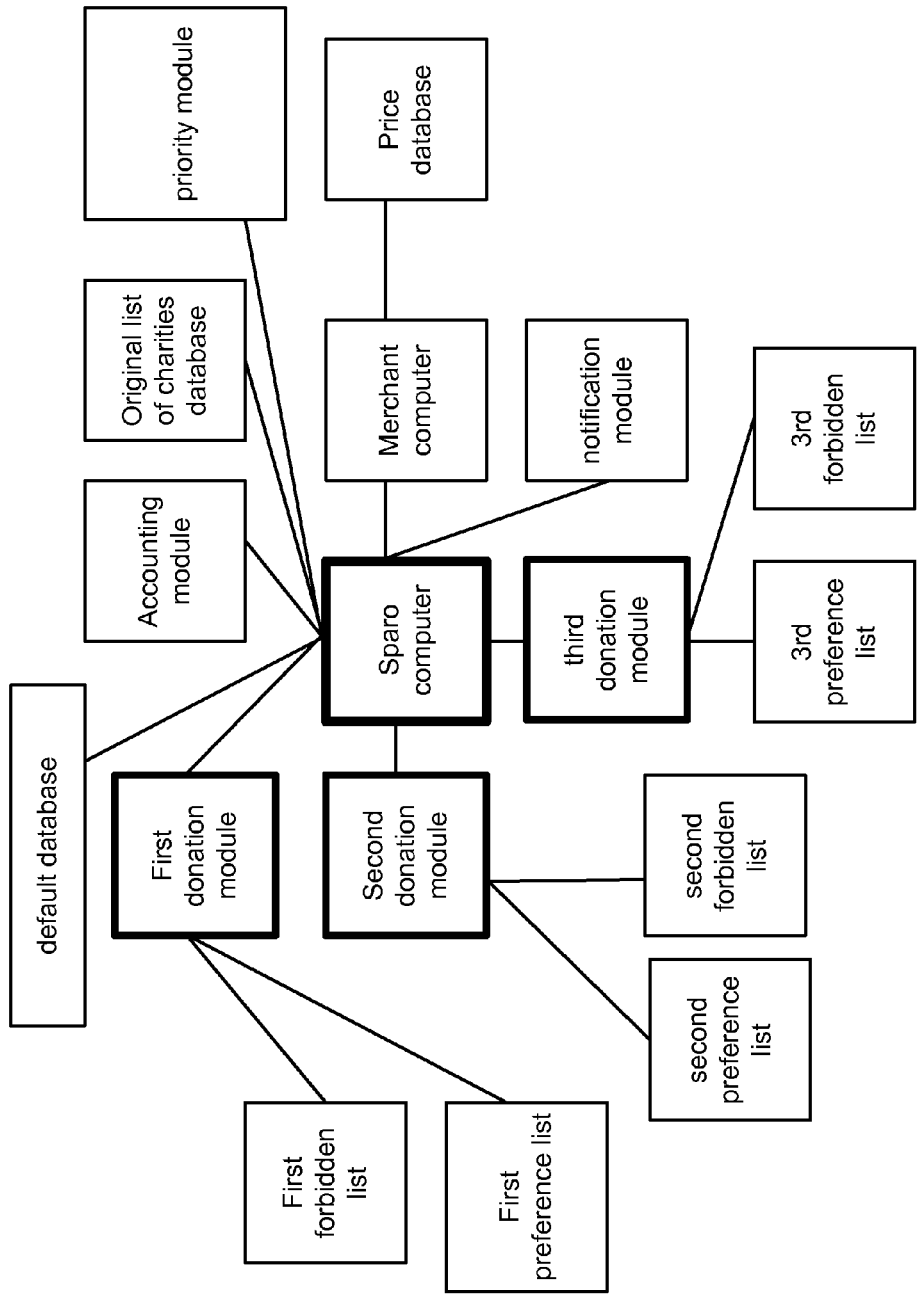
FIG. 26 is for one embodiment, as an example, for system for charity network.

FIGS. 25a-c are for embodiments, as examples, for system for charity network. FIG. 26 is for one embodiment, as an example, for system for charity network.

Figure 27:
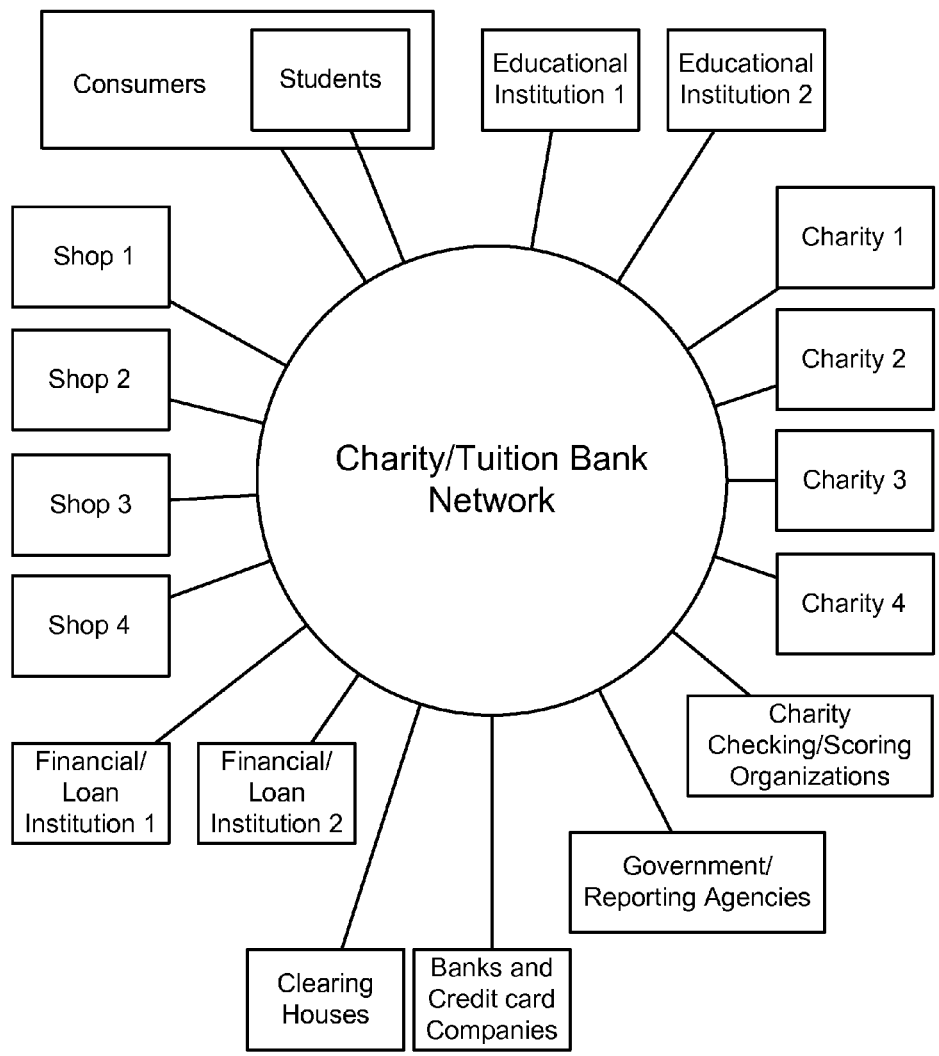
FIG. 27 is for one embodiment, as an example, for system for charity/tuition bank network.

FIG. 27 is for one embodiment, as an example, for system for charity/tuition bank network, with consumers and students, plus schools and charities, and stores. They interact with loan institutions and banks or credit card companies, as well as clearing houses for auctions or other functions as the middleman in between, or for processing the transactions on behalf of others, especially small entities, or aggregating or simplifying the process due to economy of scale for others, or having some specific functions, e.g., for checking or certifications, e.g. for IRS/taxes, as a $3^{rd}$ party or neutral entity, or as a trusted entity. This coordinates and checks with or buys reports from charity scoring organizations or school scoring entities, as well as government watch dogs/organizations, e.g. IRS or FTC, e.g. to certify some entity, or filter the bad actors, or countries/entities/people from State Dept. or DOJ forbidden lists, to avoid. For each function in this network, some middleman can exist to make life easier for many actors in that category, as a representative for that sector or subset of that industry, e.g., agents or companies that rate charities or schools or verify the tax compliance or overhead for charities.

FIG. 28 is for one embodiment, as an example, for timeline for the process for deadlines and actions, for staggered events, in parallel, as described in more details elsewhere in this disclosure. For rules, e.g., we have:
  Invoice billed every 30 Days or 1 month.
  30 Days or 1 month to pay Invoice, before incurring interest.
  60 Days or 2 months to report returns, since last invoice billed, to be reflected as credits on the next invoice. However, merchants report returns as often as they like, before this period (they can do it in bulk or report as they go).

In other words, revenue from total transactions in a given month will not be considered finalized and secured until 60 days or 2 months after the given month (or period).

Figure 29A:
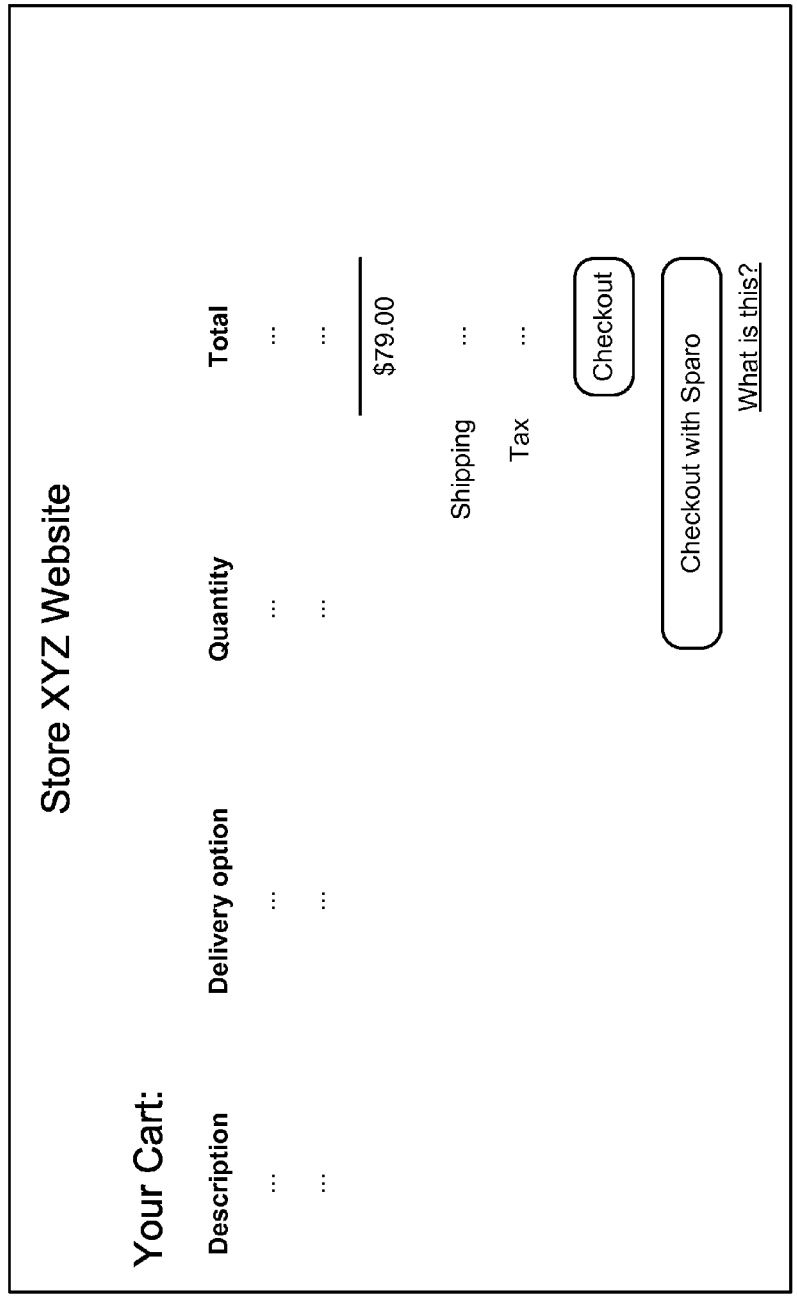
FIG. 29a shows an example of store website or display or screen.
Figure 29B:
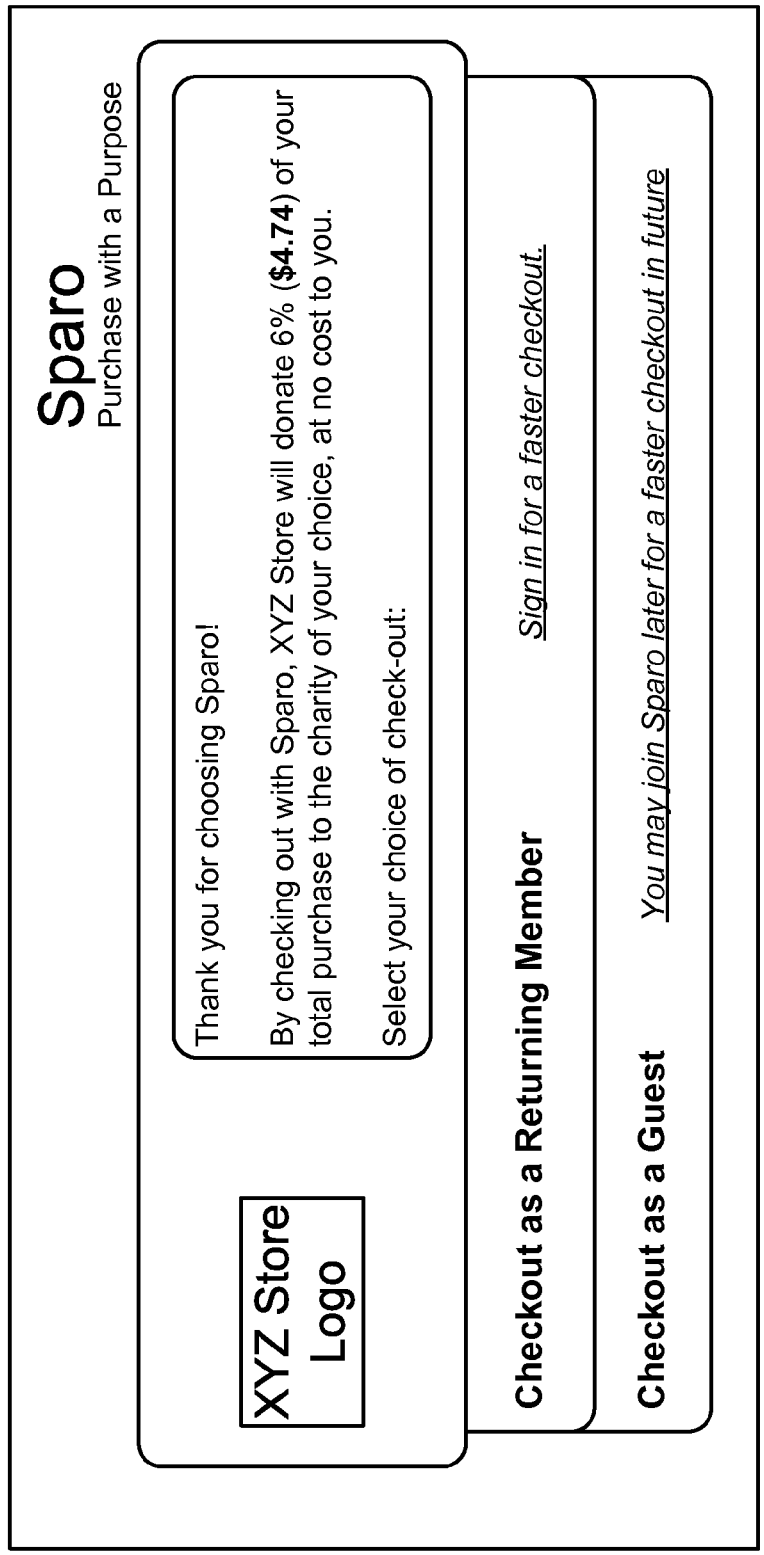
FIG. 29b shows an example of Sparo interface.
Figure 29E:
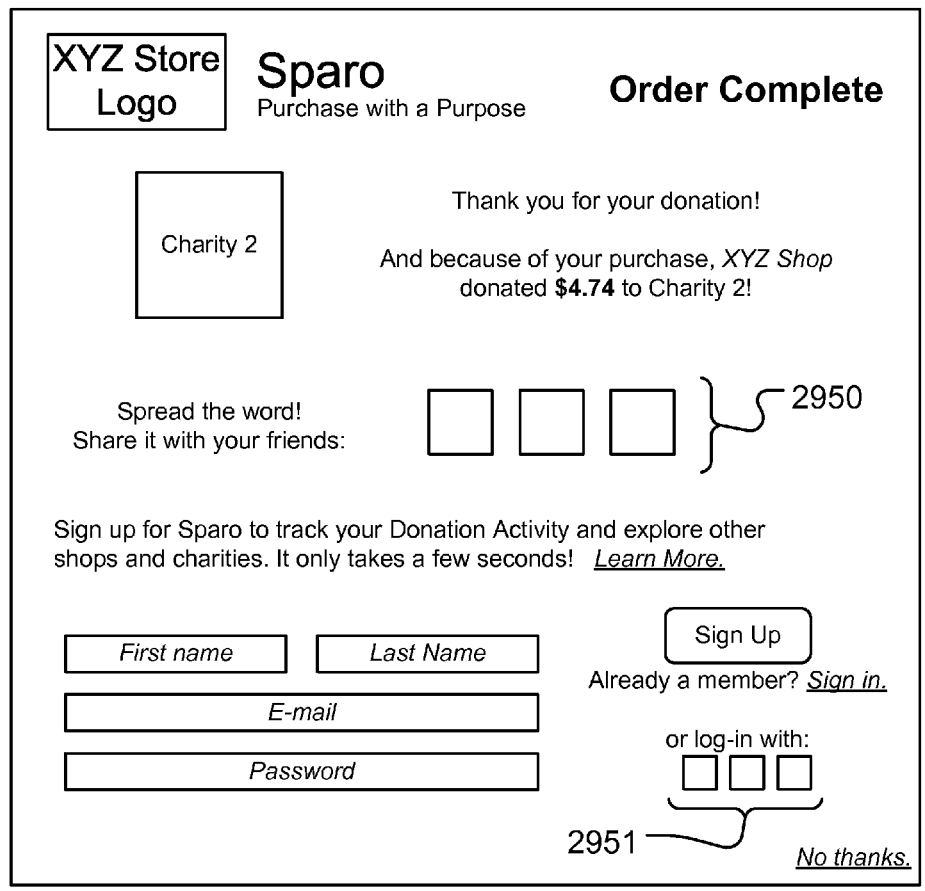
FIG. 29e shows an example of Sparo interface, for order complete.
Figure 29F:
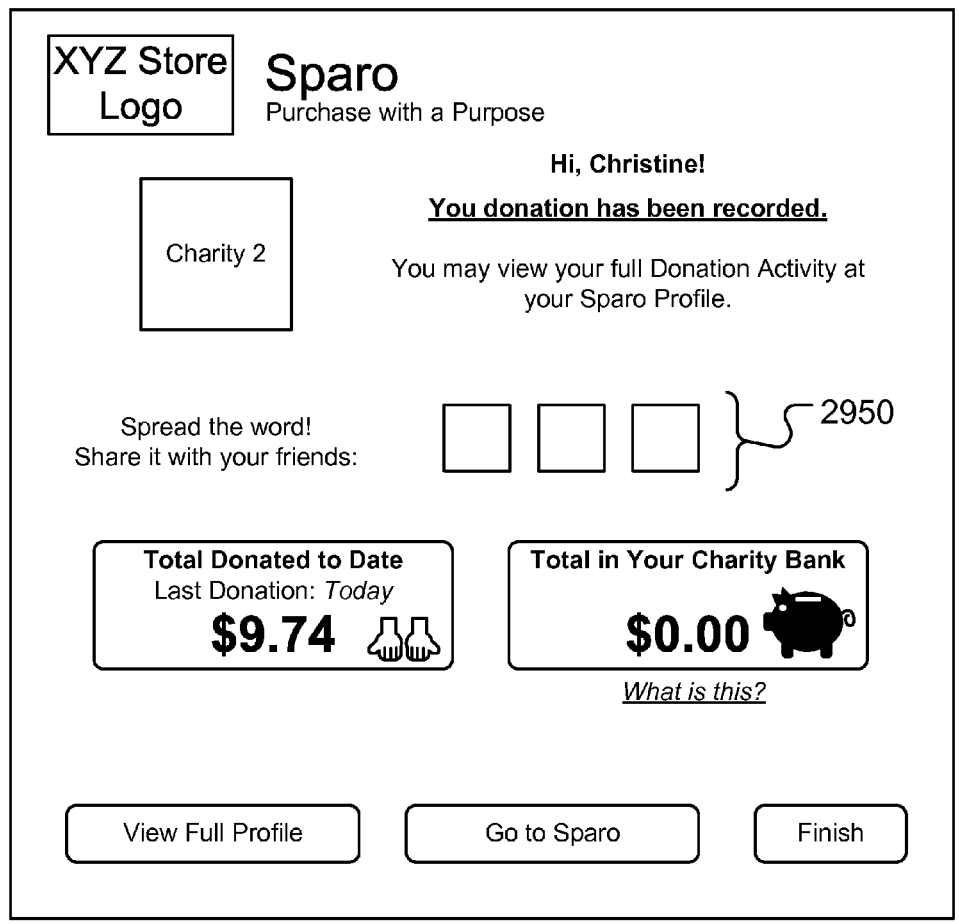
FIG. 29f shows an example of Sparo interface, for donation.
Figure 29G:
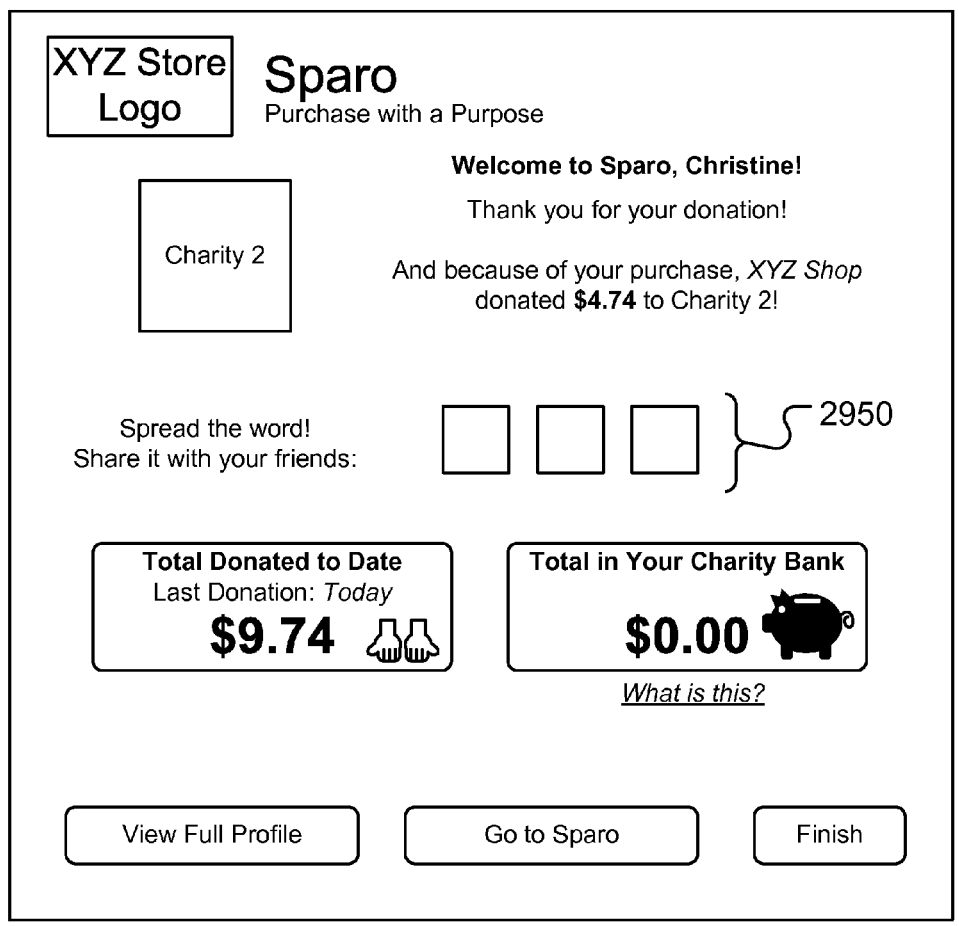
FIG. 29g shows an example of Sparo interface, for donation.

FIG. 29a shows an example of store website or display or screen. FIG. 29b shows an example of Sparo interface. For returning member, we have the credit card or payment information is on hand or it is obtained from the user. For guests, it takes the user info and payment info, and gives option to create an account (and sets the password). FIG. 29c shows an example of display for returning member (for pop-up, as partial display). FIG. 29*d* shows an example of Sparo interface. User's donation is taken from the user's credit card or payment account (e.g., if a guest). User can donate from charity bank, as well. FIG. 29*e* shows an example of Sparo interface, for order complete. FIG. 29*f* shows an example of Sparo interface, for donation. This is for members who has already submitted their donations and signed in to record this activity under their accounts. FIG. 29*g* shows an example of Sparo interface, for donation. This is what comes up when new member submitted charity selection and donated an additional amount.

Figure 30:
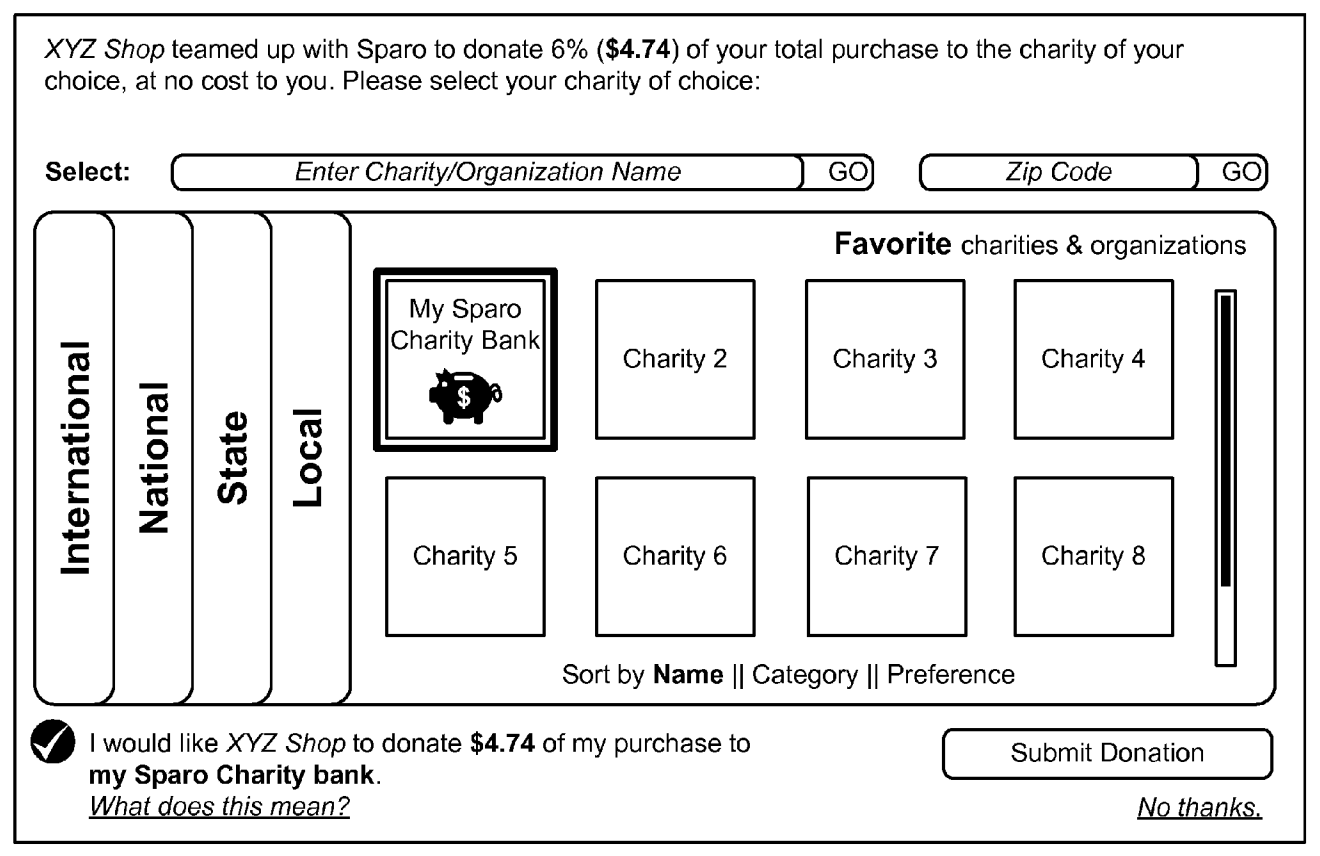

FIG. 30 shows an example of Sparo interface, for donation, for different localities/geographical coverage or scope.

Figure 31:
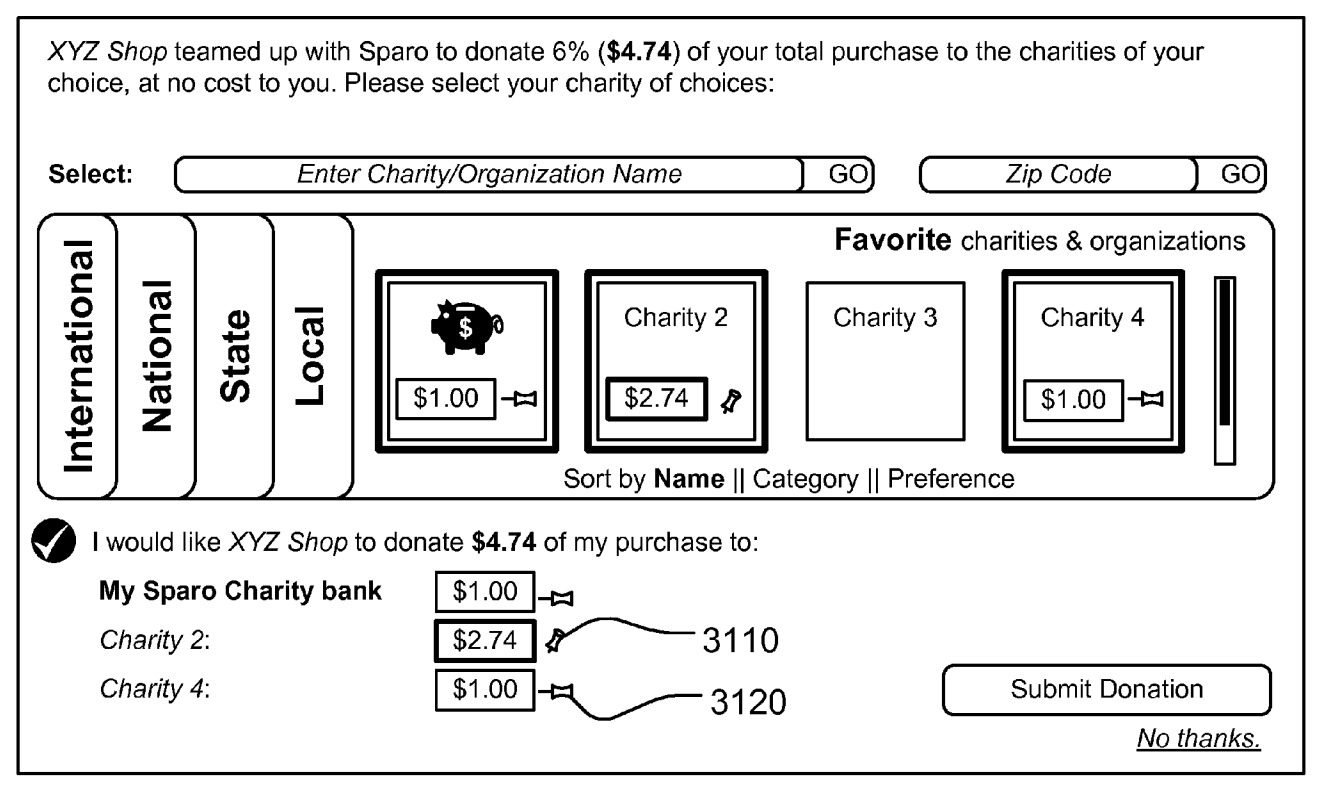

FIG. 31 shows an example of an interface for allocation of funds, visually, showing the amount, and with easy user-interface UI or GUI. It can be based on percentage or absolute values using a ruler as adjuster on screen, or as ratio. Or, it can use a pin to fix the amount, e.g. for Charity 2, fixed at $2.74, by user (3110), as pin is toggled on screen by user's click, for fixing the Charity 2 allocation, and the rest being not-fixed, as indicated by horizontal pin, as not-engaged, or as max flexibility, or as no-constraint. In this example, the rest of the fund remaining, absent any other instruction or condition or action or constraint by any party or user or system, or default set, we use the default as "distribute all remaining equally between all the rest". This can be used for schools as well. Thus, we have e.g. 1 dollar for Charity 4 (see 3120). So, one can split the donations on the user interface. When selecting a charity, the remaining amount shows up in an editable box. User can edit the amount. The constraint is enforced based on the Fix button. The unconstraint items divide the unconstraint amount between themselves (evenly) and automatically, for this example, or any other formula, if instructed before. One uses pins to indicate constraint amounts, for this example. In one embodiment, one uses the linear programming, or optimization, for allocation of funds/resources.

Figure 32:
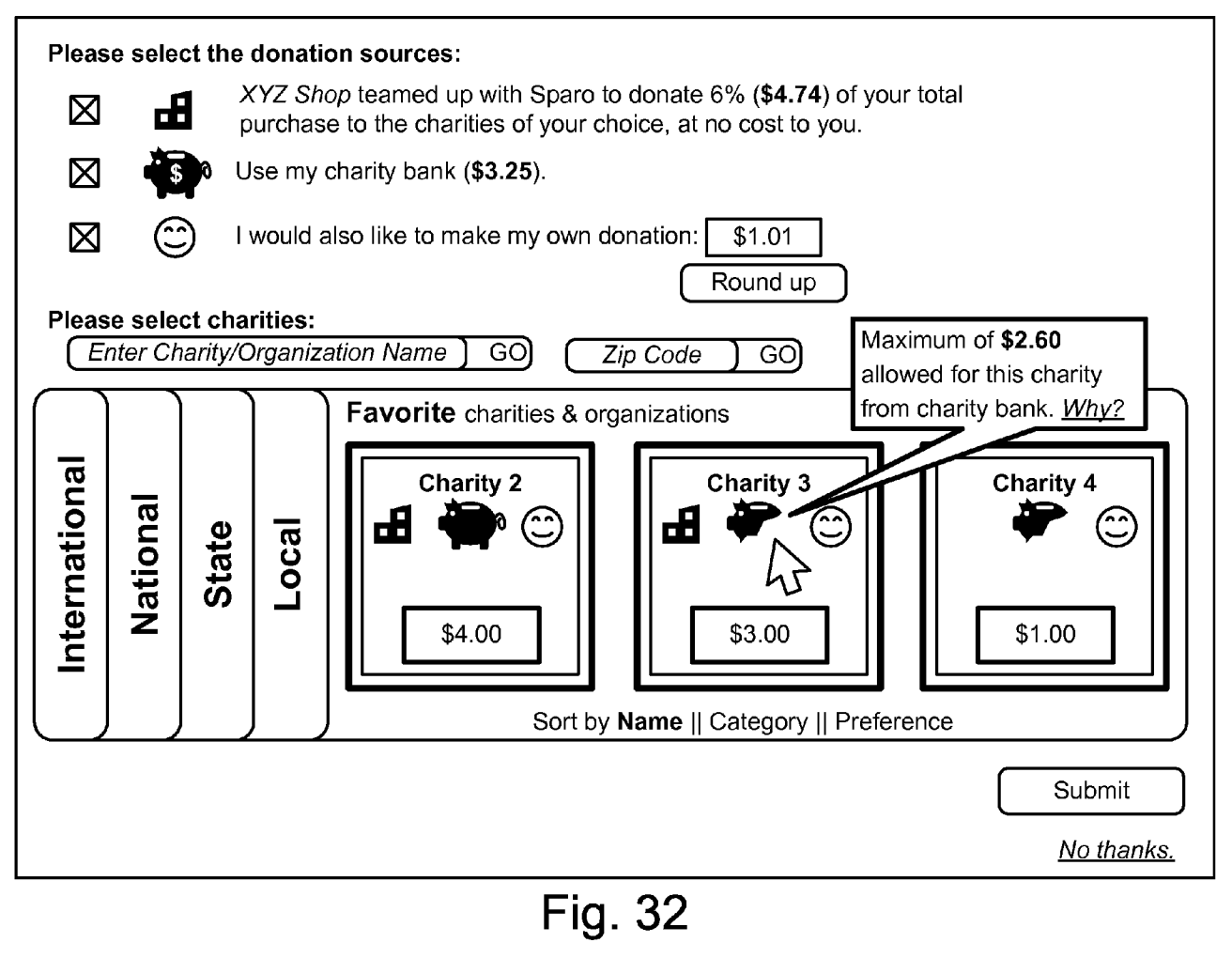

FIG. 32 shows an example of an interface for allocation of funds, from merchant, piggy bank, or consumer directly, with icons shown. The half-piggy-bank icon indicates a constraint or max imposed by a party, as also indicated on screen, with explanation, and more reasons given using the WHY button, from menu or window on screen. For example, it shows $ 2.60 for max for Charity 3, with the half-piggy-bank icon shown. For example, UI for merchants to enter their preferences for charities is shown using: sliders for priority, with checkboxes (on/off), categories of causes (and drill down to sub-causes), inclusion/exclusion lists, type-like selection, presets, and the like. For example, the order of usage is:

Use the store's donation first.
Use piggy bank next.
Use personal last.
Put unused store donation in piggy bank, if allowed by merchant.

For example, linear programming is used to determine the available solutions in linear constraint. For example, for half-piggy-bank icon situation, some (but not all) merchants contributed to the piggy bank accept contribution to the selected charity. So, that is a constraint on distribution of the funds, based on the disapproved or not-approved charity by some merchants, in this example.

Figure 33:
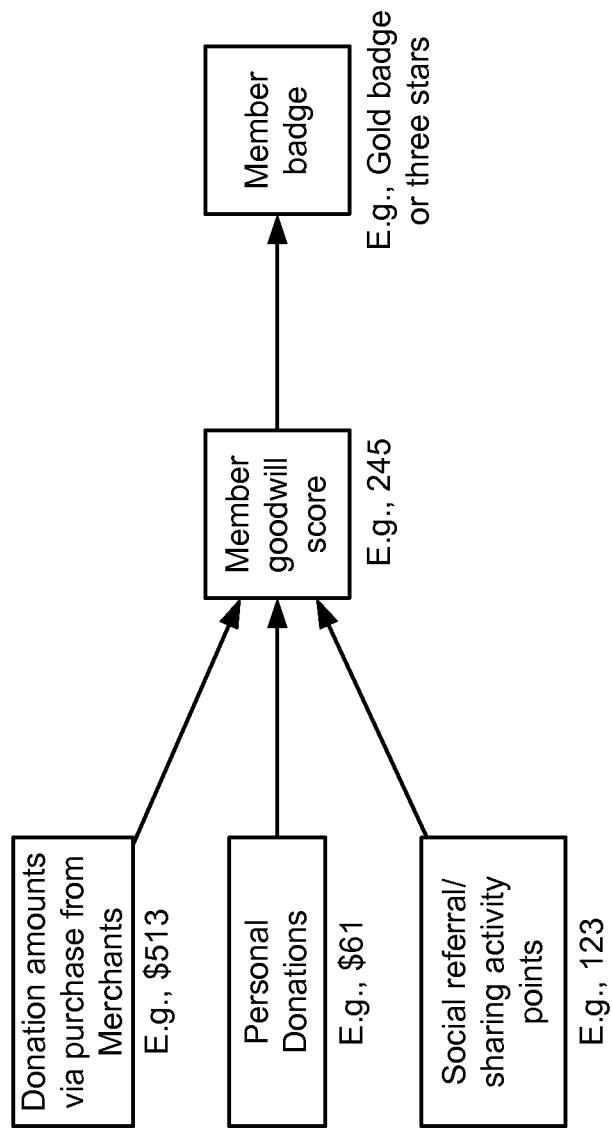
FIG. 33 shows an example of the Goodwill score, which comes from different factors.

FIG. 33 shows the Goodwill score, which comes from different factors, resulting in different levels of achievements and badges or color ribbons or stars, as an indication of success in charitable causes. Goodwill score is, e.g., based on a weighted linear combination and/or sigmoid function of the variable parameter(s). Badge or star is, e.g., based on categories/range of goodwill scores/causes. Badge icon may be, e.g., based on cause icons (such as animal, heart, or education), e.g., book, panda, and the like.

Figure 34:
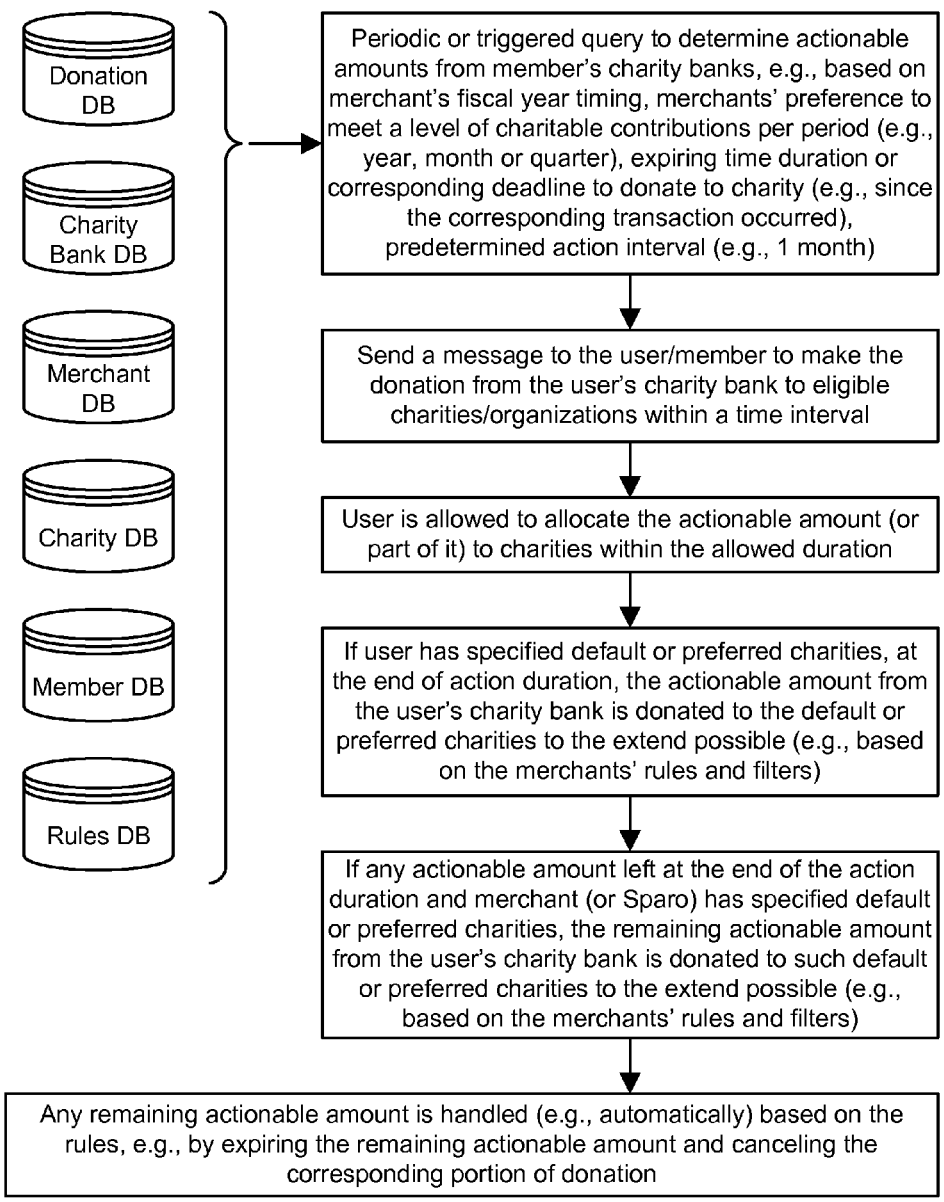
FIG. 34 shows an example of a method for usage of amount collected for charity funds, as defaults, and based on deadlines.

FIG. 34 shows an example of a method for usage of amount collected for charity funds, as defaults, and based on deadlines, so that it will not stay in limbo or unaccounted for, especially for tax purposes and proper accountings for various parties involved. The determination of actionable amount based on timing is based on the transaction date/time. The determination of the actionable amount based on the preferred donation amount per a specific period is based on allocation among users, e.g., first in terms of the donation amount from a merchant in a user's charity bank, and second based on the age of the corresponding transaction.

Figure 35:
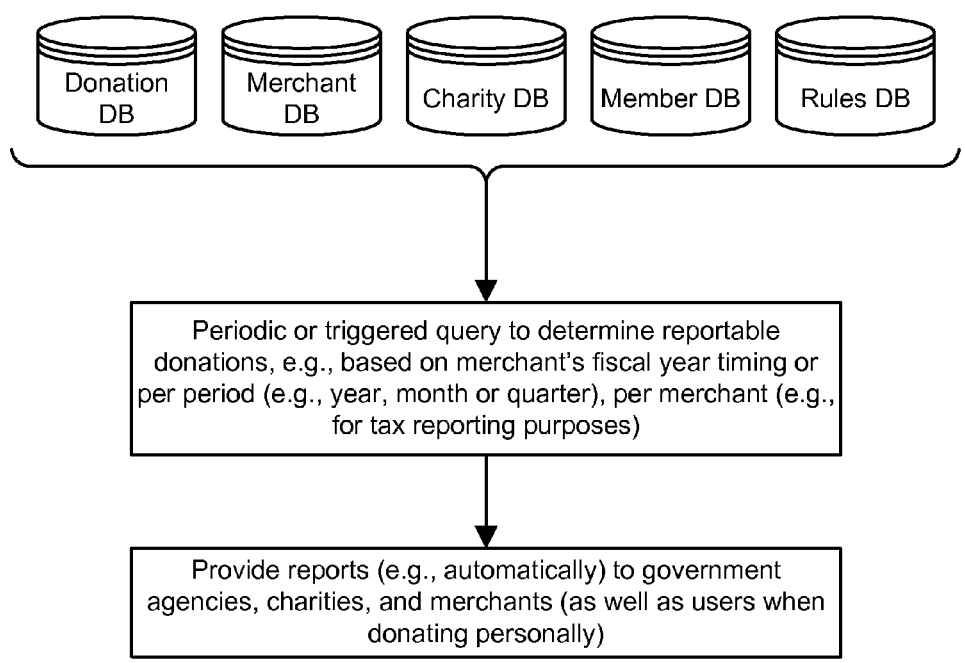
FIG. 35 shows an example of a method for reporting usage of amount collected for charity funds.
Figure 36:
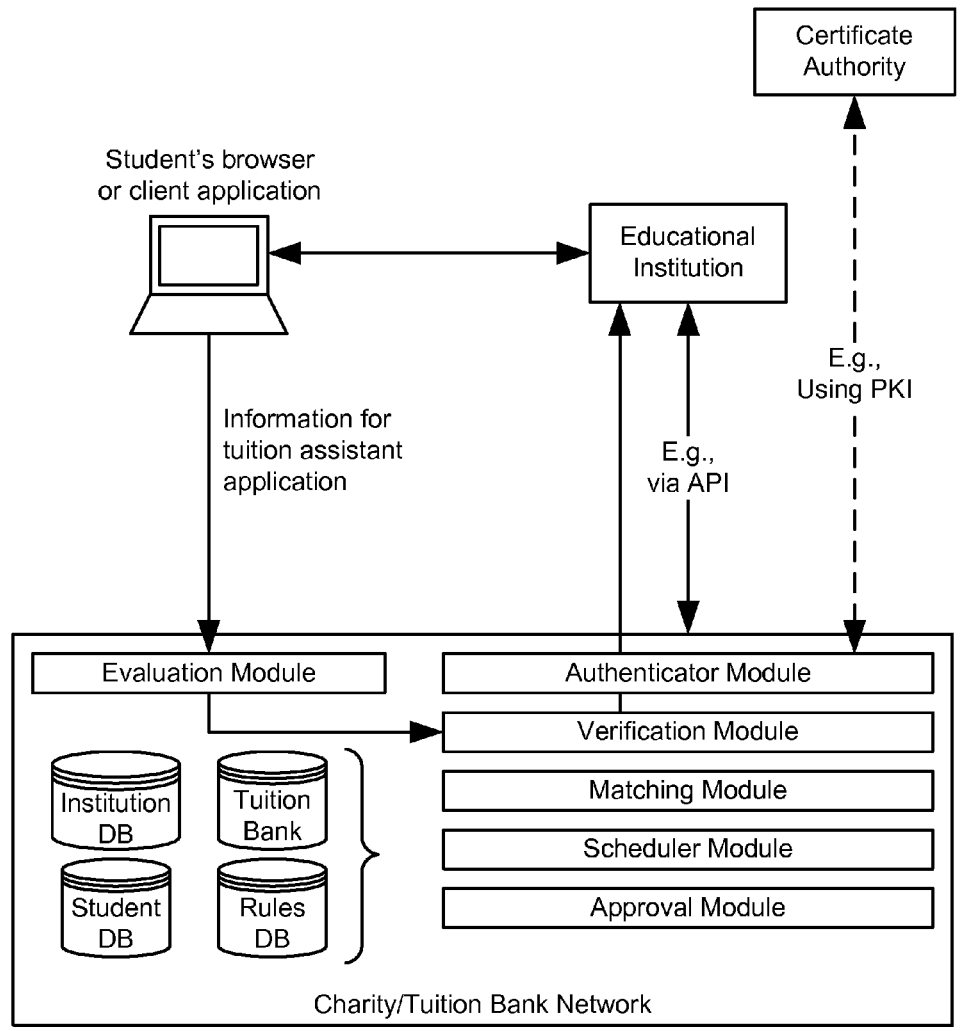
FIG. 36 shows an example of a system for student and school verification and initiation.

FIG. 35 shows an example of a method for reporting usage of amount collected for charity funds, based on deadlines, for tax purposes, IRS, or other government or third party agencies. FIG. 36 shows an example of a system for student and school verification and initiation. It has the following modules (working in this order): authentication module, verification module (interacting with evaluation module), matching module, scheduler module, and approval module. It uses the PKI, e.g. public-private key structure for transmission and authentication/signature.

Figure 37:
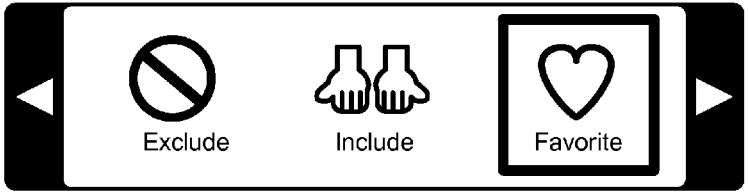
FIG. 37 shows an example of an interface for charity, non-profit, or organization selection.

FIG. 37 shows an example of an interface for charity, non-profit, or organization selection, using our search engine or filter with various menus or windows/choices. It can mark them as exclude, include, default, or favorite organization, which can roll on the top on screen as slider or ruler. It can have various locality scope, e.g. National, with respect to the user, as displayed in folder shaped manner for convenience of the user. The conditions are combinable, e.g. using OR, AND, or other logical operations, e.g., XOR. The emphasis on the category or subclass of causes or charities can be e.g. expressed as LOW, MID, and HIGH, for ranking or weight. It can be also expressed as preference e.g. as YES/NO, as binary choice, for simple filtering, rather than ranking or weight. This can be used for user, consumer, charity, school, and the like. In one embodiment, symbolic list and resulting expressions as a pseudo-code for exclusion, inclusion, favorite, and default can be generated from the menu, as shown on the top, without too much typing or programming language, for ease of use for general user base without much programming experience. In one embodiment, by default, the Default setting is Favorite, unless changed by the user. In one embodiment, we have pre-filtered lists of candidates or charities or schools, for each category or class or type, for convenience of user, which was done by Sparo beforehand. In one embodiment, we have a recommended or popular collection of charities.

Figure 38:
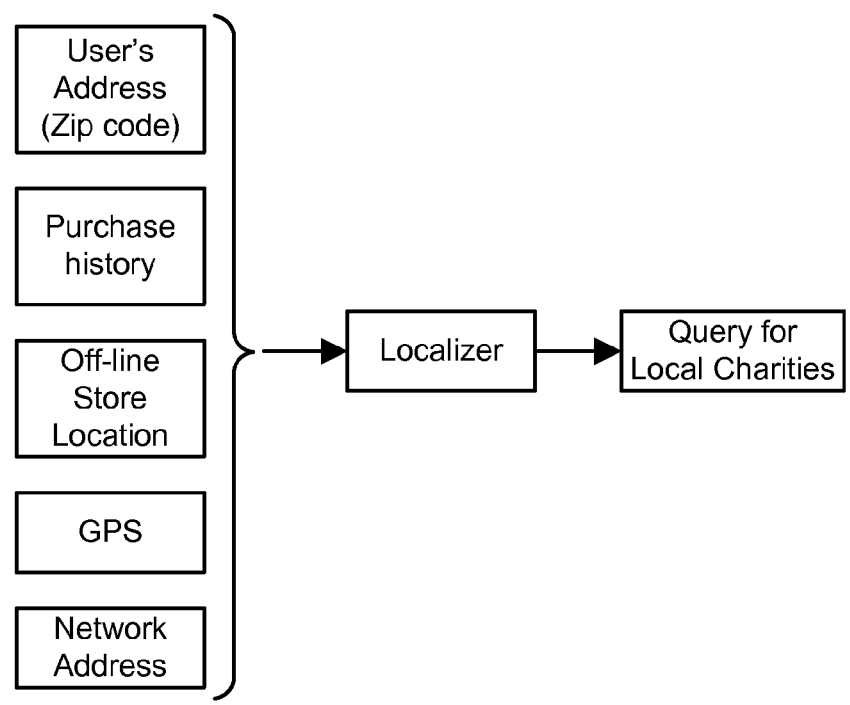
FIG. 38 shows an example of a system for finding the location of the user based on various input or parameters.

FIG. 38 shows an example of a system for finding the location of the user based on various input or parameters, some with more weight than others, to find the local charities or schools, as filter or preference, if applicable, by user. For example, personal data with a recent date has more weight than the GPS data, which may be just the temporary location of the user on vacation, but not her real residence's address or location.

Figure 40:
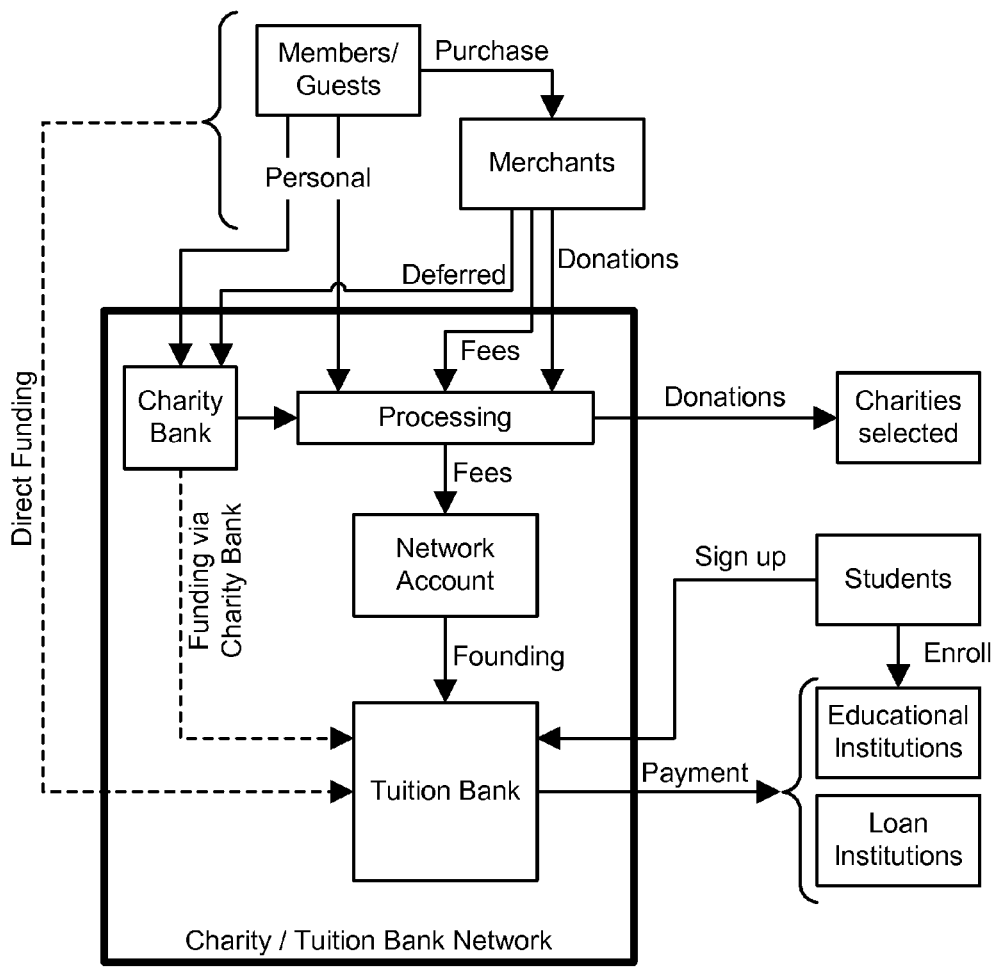
FIG. 40 shows an example of a system for our network/Sparo, with different parties involved.

FIG. 40 shows an example of a system for our network with different parties involved, for various payments or fees, including deferred payments, for Sparo, merchant, consumer or guest, charity bank, tuition bank, charity, student, and school, as well as banks, loan organizations, and tax/government agencies, plus certification/third party/neutral agencies for validation of schools, charities, or students. In one embodiment, Founding is a fraction of fees collected at the processing of donations or merchandise cost. Or, it can be a minimum or max fraction of those, up to a limit, such as using a linear equation in between the extremes/up to the limits.

Figure 41:
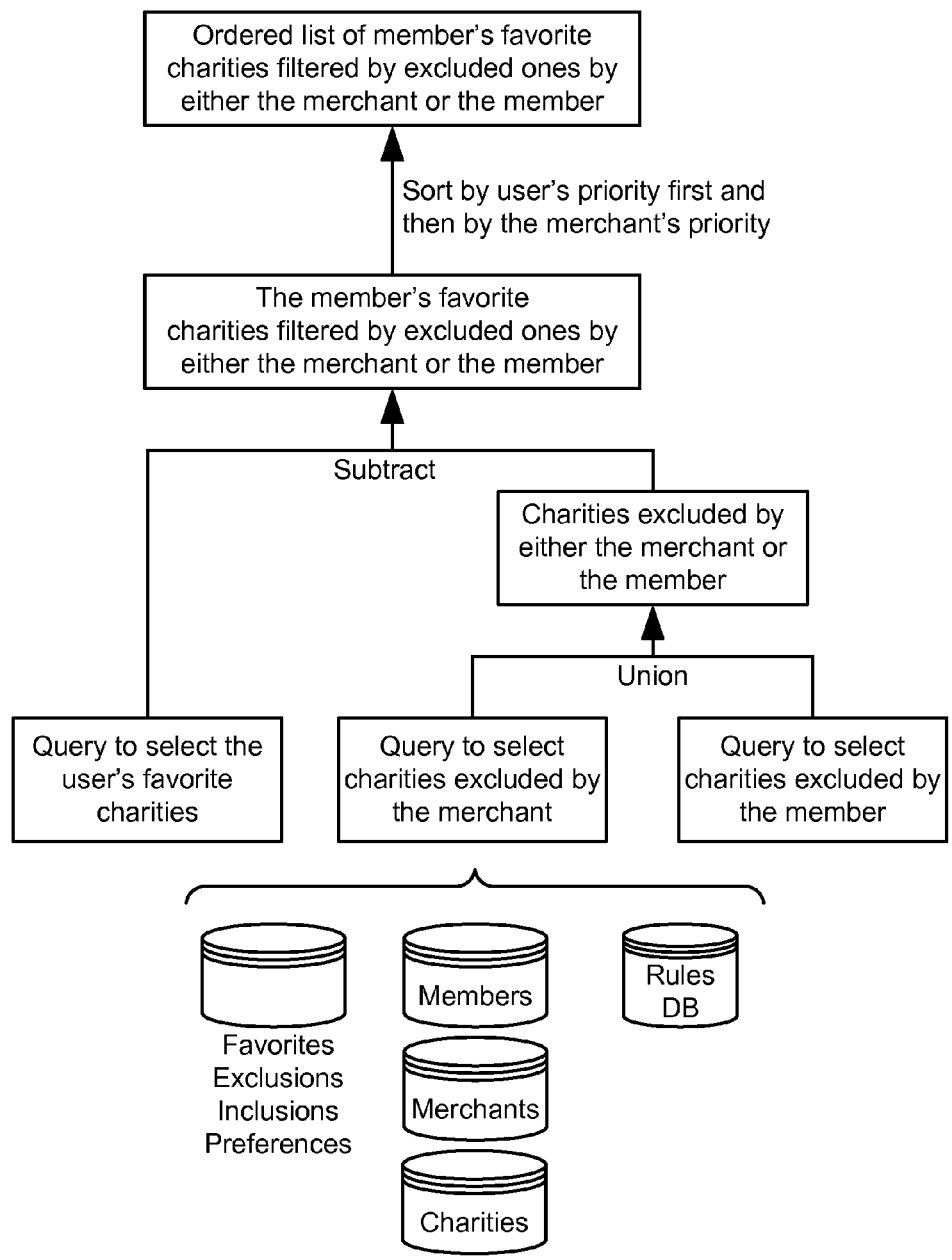
FIG. 41 shows an example of a method for exclusion of charities or inclusion of favorites, in order.
Figure 42:
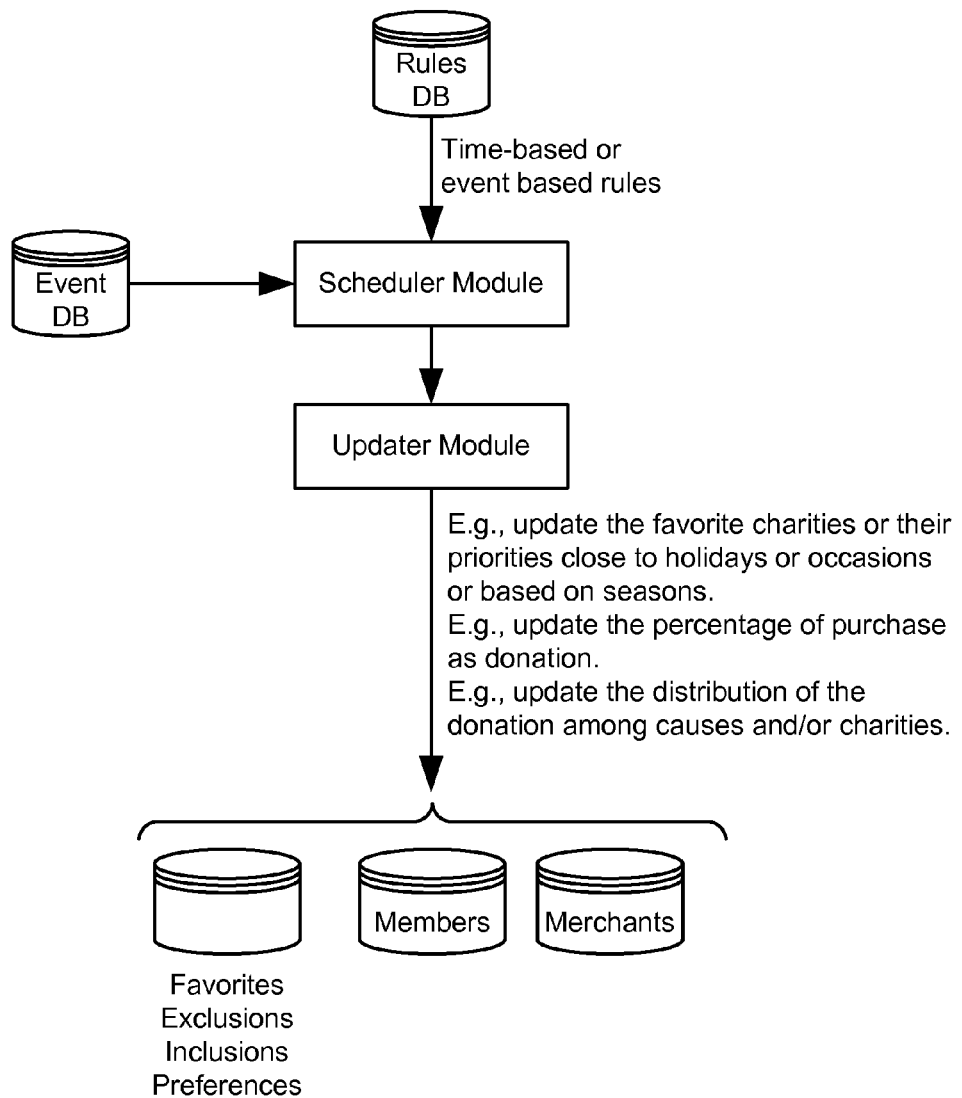
FIG. 42 shows an example of a system for scheduling or updating for distribution/allocation for charities.

FIG. 41 shows an example of a method for exclusion of charities or inclusion of favorites, in order. FIG. 42 shows an example of a system for scheduling or updating for distribution for charities. This can be time-dependent, and can be programmed in advance, e.g., as rule or condition, and be deterministic, or conditional, based on time, event, trigger, or condition. For example, during Christmas season/December month, one may want to increase her contribution to mother causes from 30 percent to 45 percent, of all funds available or accumulated so far, pre-set, without entering that percentage every time. For example, during recession, or if/whenever the stock market indicators or unemployment or a stock value is below or above some values, e.g. Dow Jones Industrial Average going below some threshold, then one may want to increase her contribution to homeless causes from 30 percent to 48 percent, as pre-programmed in her portfolio, without any further human interactions, unless later the user wants to change the settings/thresholds/conditions/trigger points again, for her portfolio, as rules database, for applying/acting automatically, based on satisfied conditions or trigger events happening.

Figure 43A:
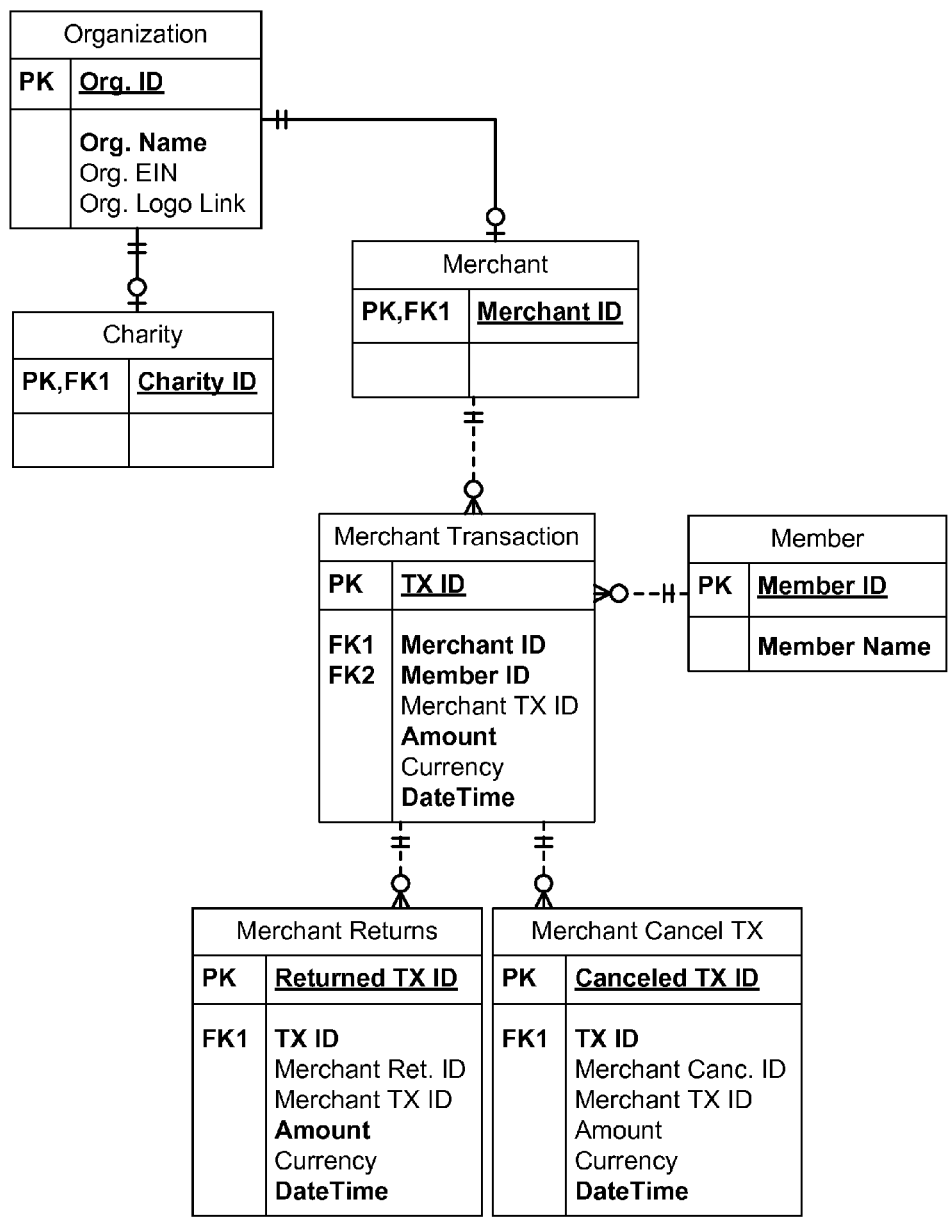
FIG. 43a shows an example of a data structure for the organization for transactions between parties.

FIG. 43a shows an example of a data structure for the organization for transactions between parties, which are connected logically together and shown visually with the indicated relationships. The merchant has an ID, and Sparo has an ID, for identification. (The symbols shown for connectors are standard in industry for the figure.) The canceled and returned transactions are captured there, each with corresponding IDs to be traceable, and with amount mentioned for the returned items, to be accountable in the NET results/net sales/summary.

Figure 43B:
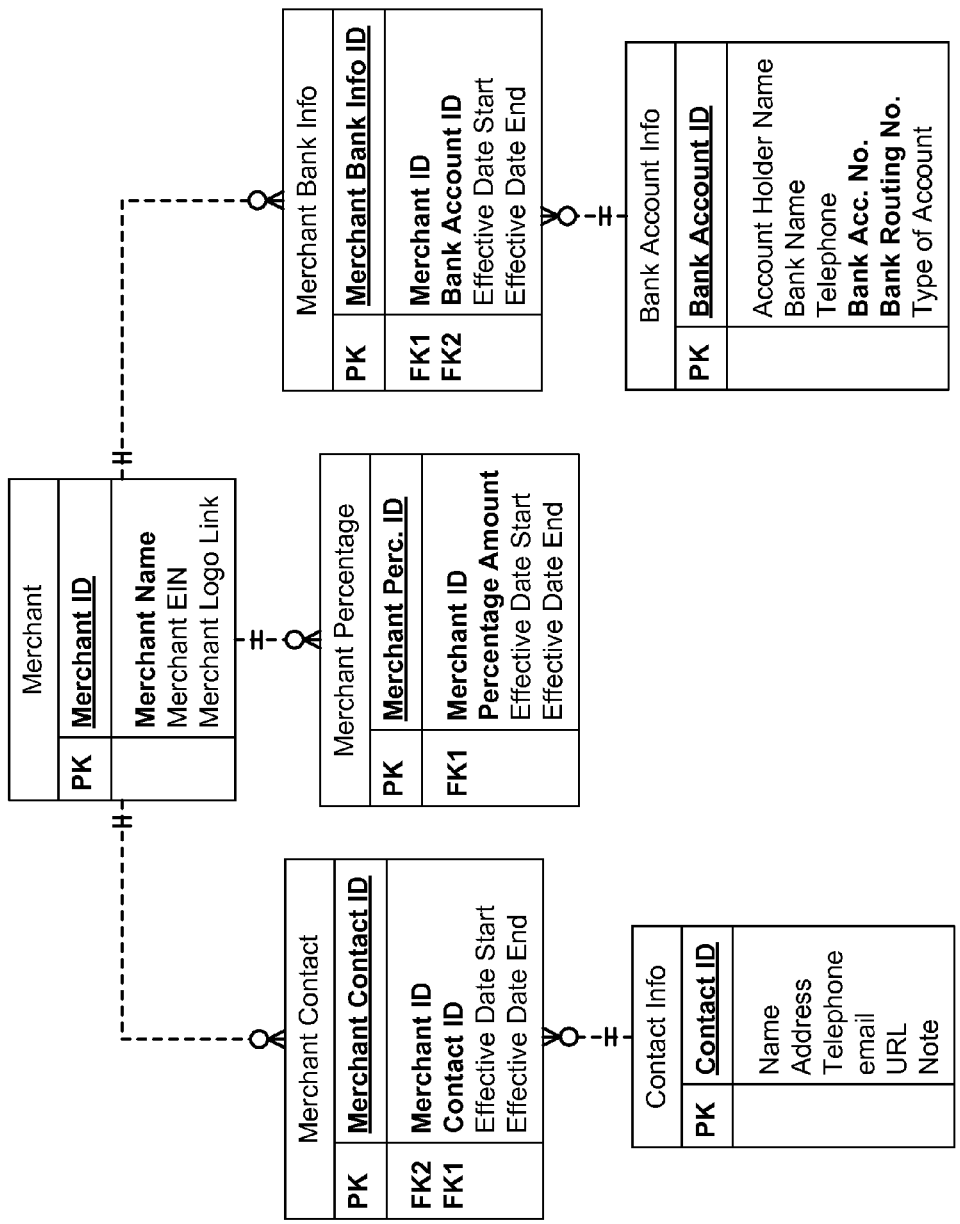
FIG. 43b shows an example of a data structure for the merchant, bank info, merchant percentage, and contact info.

FIG. 43b shows an example of a data structure for the merchant, bank info, merchant percentage, and contact info, which can be changing per expiration date or effective dates/ranges, with easy way for changing contact info, bank info, or merchant info, including the percentages set by merchant, e.g. using valid/expiration/effective dates, or for any other situations, e.g., for school donations, to update, e.g. automatically. The logical relationships between items are shown with the arrows and connectors. The IDs and identities of people are also shown.

Figure 39A:
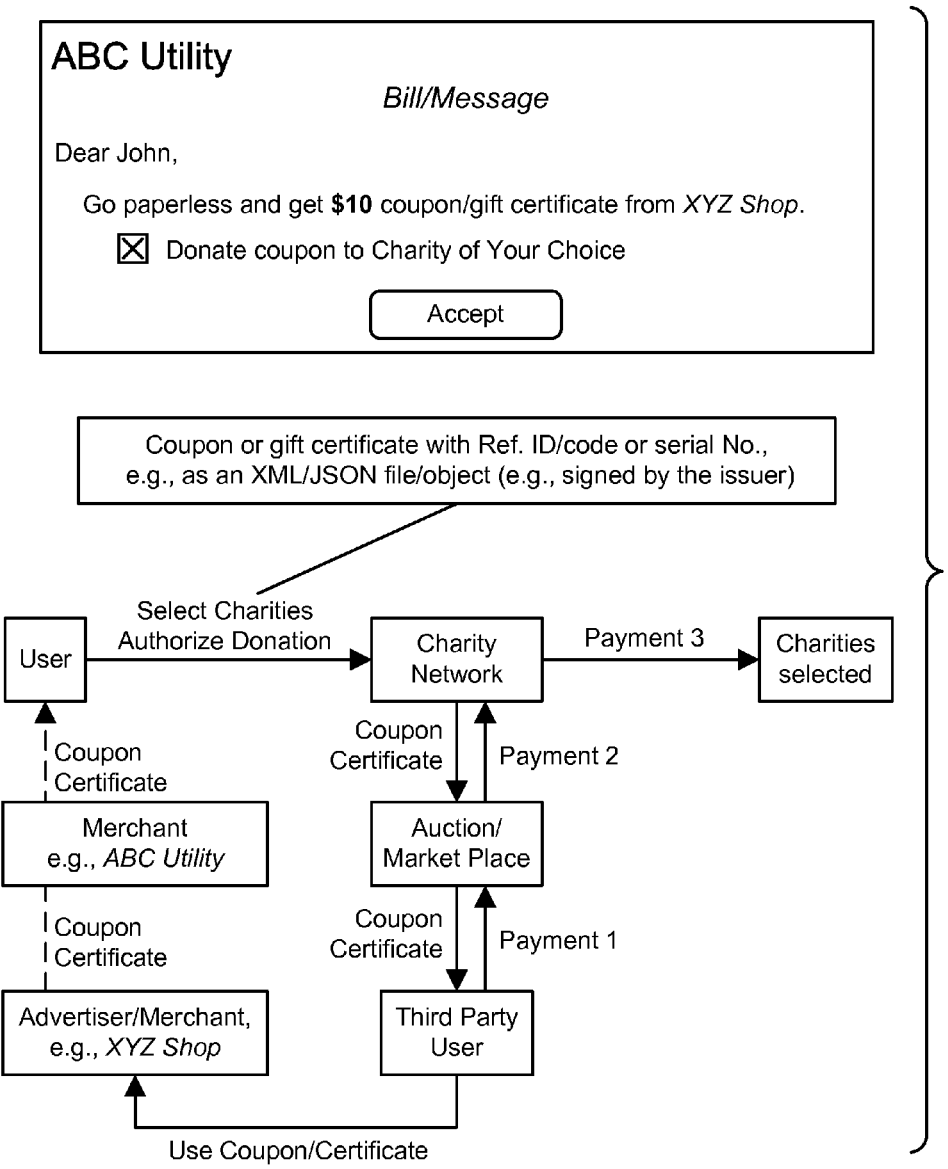
FIGS. 39a-b show the non-cash donation examples.

In one embodiment, non-cash donation is processed via donation agent. In one embodiment, as for example depicted in FIG. 39(a), an entity (e.g., ABC Utility) provides a gift certificate or coupon from a merchant (or advertiser) (e.g., XYZ Shop) to its customers for an incentive (e.g., to go paperless for billing statements). An interface is provided to the customers to donate such certificates/coupons to charity of their choice. In one embodiment, the certificate or coupon is presented by a code (e.g., identifying the specific coupon and other identifying information for the issuer of the coupon). In one embodiment, the information is packaged in an object/file (e.g., signed electronically using PKI). In one embodiment, the user selects charities of choice and authorizes the donation of the coupon or certificate for use of charities. In one embodiment, the authorization is associated with a Ref. ID by donation agent and/or merchant(s). In one embodiment, a cash value for the coupon/certificate is extracted, e.g., via a marketplace or auction to purchase by a third party to use the certificate/coupon at the issuer merchant. In one embodiment, the payment (subtracted by the fees) are provided as donation to the selected charities and captured in the member's donation (via XYZ Shop) in the member's account at the donation agent.

Figure 39B:
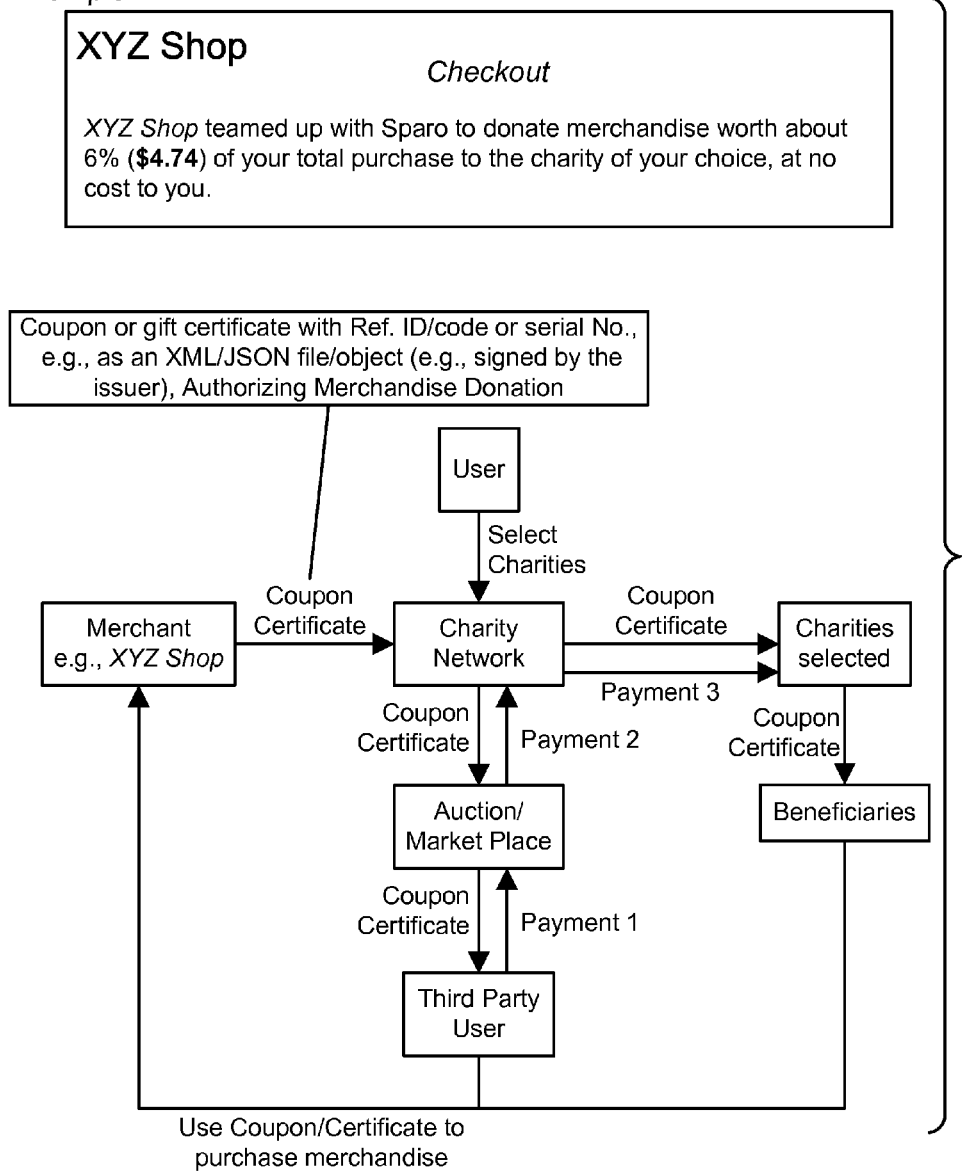

In one embodiment, as for example depicted in FIG. 39(b), a merchant can donate to a customer's charity of choice a non-cash item. For example, a clothing shop may donate clothes to a charity (e.g., Salvation Army). In one embodiment, charities and/or merchants can specify in their settings the type of non-cash donations that they may offer/accept. In one embodiment, such settings can be matched by the donation agent to allow a merchant provide its donation in a non-cash form. In one embodiment, the merchant, e.g., via the donation agent, creates a coupon or certificate reflecting the amount of donation to be redeemed by the charity as non-cash item purchase. In one embodiment, the beneficiaries of the charity redeem the donation by purchase at the merchant. In one embodiment, the donation agent accumulates such donations to a charity until a (e.g., minimum) threshold (e.g., set by the merchant) to provide the charity.

In one embodiment, we can have donation to special events, such as unexpected flood, or school as special charity, appearing as a special case in our network or system, e.g. run by Sparo (us), as a donor, as well as others contributing, e.g., people as consumers or non-members, and merchants, for goodwill. In one embodiment, the users or merchants/stores can aggregate their contributions, e.g. via group email or invitation, with acceptance box, with suggestions for amount of contributions, and the goal to reach, in a social media or friends' circle environment.

In one embodiment, we can have donation before payment for purchase. In one embodiment, we have donation after payment for purchase/transaction. In one embodiment, the user can contribute to charity from piggy bank or from, e.g., her own credit card, which either Sparo (we) or store add and process the total charges, based on those corresponding accounts/forms.

In one embodiment, we have regional classification of charities, e.g., local, state, national, and international, with a tab shown on screen, for ease of use. In one embodiment, we have subject classification of charities, e.g., homeless, medical-related, children-related, environmental-related, food-related, and the like. In one embodiment, the system gets the donation to charity from the store, and with no charge to the customer, or invoices that to the store at a later date, or does a batch process for many items at the end of the period. In one embodiment, we have a portion of the proceeds going to the other usage, e.g. student tuition or expense scholarship or grant. Then, the rest is used for our expense or overhead, as well as company's shareholders, if any.

In one embodiment, we have the list of charities prioritized, by us, users, government, based on lower overhead, based on past history, or preference of the user on categories, types, geography, country, or lower overhead percentages. In one embodiment, we have plug-ins in any web site or store, or using cookies for tracking or behavioral analysis, on an individual basis, or aggregated for all users, as average or trend analysis or statistical analysis. In one embodiment, we have APIs to partner sites or entities or developers associated with our program. In one embodiment, we have charities getting a percentage of our company as stock, for encouraging more participation and good-will.

In one embodiment, we have 3 types of the accounts: (1) merchant/stores, (2) consumer, as a customer of merchant and a member of the Sparo, and (3) charities or non-profit organizations, e.g. certified by the government, IRS, or a neutral third party. The certification for validation of charity can be in the form of PKI, or certificate with public/private keys, to make sure the money or correspondences are coming or going to the right place or account. In one embodiment, we have piggy bank for each consumer, so that they can accumulate for later for a specific charity or above a threshold amount, for grant of the money to happen. In one embodiment, we have tax break for the business (that gives to charity), as well as goodwill for customer, plus more sales through public, as an edge in the marketing.

In one embodiment, we have the customer/consumer as a member of Sparo (or charity network or portal or central or HQ), with piggy bank account and other relations built up. In one embodiment, we have the consumer as a non-member, for one-time use, or with no permanent record, with no piggy bank account. In one embodiment, we have the customer signed up with personal data, or using FACEBOOK or GOOGLE accounts, to transfer information. In one embodiment, we have the GPS location data for user or her device, for locating the user and for finding the location of the nearby charities, or using telephone number, address, zip code, history, personal information, using dialog box, or email address or server, for locating the user.

In one embodiment, we have the total transaction numbers and dollar values for a user, a charity, a store, or combination of store giving to charity, or person to charity, or store selling to a person, or any combination of the above, or average or statistics or history of the above, recorded, stored, or presented, to any or all parties, per request or query or based on the display on computer, for the account holder to visit and review or print for various purposes, e.g., for tax deduction purposes, as donations. In one embodiment, we have the user sending the gifts or donation amounts as a pride or encouragement, to friends or family, e.g. by email, text, or post on/using TWITTER or FACEBOOK, by the user or automatically generated and sent by our web site.

In one embodiment, we have various level of pride levels or scores being generated, e.g., based on numbers, points, color codes, or stars shown on the person's account or FACEBOOK or other social sites, to signify the amount a person donated or gave through stores, so far, as a way to encourage more giving. For example, we can have GOLD CLUB member or SILVER CLUB member, or level 34 donor, to show the amount or frequency or average or maximum or the last time a person donated, on computer monitor or listing, or as heroes on the web site, or as a graph or bar diagram or sliding bar, to advertise and encourage and promote for good deed.

In one embodiment, we have anonymous donor, so that there is no record of anything, if the user chooses so. In one embodiment, we have unique ID for a customer.

In one embodiment, we have multiple causes for distribution, e.g., student fellowship, single mothers, flood victims, and the like, so that they can register, and get verified by authorities or certified, so that randomly, or lottery, or based on FIFO/order of request, or based on priority of severity of situation for each case, one can get funded. The verification can be manual/by fax/telephone/email, or automatic through computers e.g. using forms on line by FEMA or other government agencies, or by social workers, or by offices qualified for such certifications and authentications, generating such certificates automatically, and transmitting to Sparo, for our processing the requests, to fund the people or groups or causes.

In one embodiment, we have updates for criteria for each cause, e.g. student scholarship threshold or approved schools or majors or family status or situation or income or need, which can be changed for future evaluations and decisions, after e.g. the new threshold takes effect, and propagates in the system. In one embodiment, we have updates for enrollments for people coming in and out of the database, e.g. people graduating from college, or entering college, to turn the eligibility flag on/off, based on the state and status for a person/student, as a student, to be eligible to receive the fund for scholarship. This will affect the approval process for the student. So, we can have an active window, for periodic check, for these types of parameters, to actively or based on student mandate, requiring the student, to certify the continuity of her status, as eligible to receive funds as a full-time student or part-time student.

In one embodiment, we have login allowed from another server, using a phantom session. In one embodiment, the system allows the Sparo logo display. In one embodiment, the system does not allow the Sparo logo display. In one embodiment, the system allows the merchant or store logo display. In one embodiment, the system allows layered tab-like display for various charities, in different locations/areas/cities, or for displaying different topics/focuses, e.g. environmental causes, mother causes, children causes, family causes, school causes, and the like. In one embodiment, the system allows overlap between different topics, e.g., some charities belonging to 2 or more topics, e.g. topics such as mother causes, children causes, family causes, and school causes.

In one embodiment, we have a message at the end, for notification, for user, for her social network account, for her friends, for her phone/texting, for her regular mail/printout, or for her tax accountant/IRS, automatically generated/sent. In one embodiment, we have the user or store or both are capable of adding more cash or merchandise to the total for charity. In one embodiment, we (our system) have merchandise or equivalent cash being donated by the store or merchant. In case of objects or merchandise donation, the charity or the third party can convert the object to cash in a middle step, or a $4^{th}$ party can get that object in an auction or sales forum, and pay the charity in cash, instead, as a single or combination transaction.

In one embodiment, we accept donations in the name of or honor of others living or deceased, or friends or family or groups, with notification sent to designated parties. In one embodiment, we have the total so far for all charities, or per charity, per store, per person, per group, per class, per category, per type, per merchandise, per school tuition, per student, or the like, for statistics, average, sum, max, min, range, standard deviation, distribution, trend, curve, time variation, mean, and the like, as number or graphic or plot or visual presentation. In one embodiment, we have a goal, dollar amount for a period, or deadline, also shown on screen, as number, bar, sliding marker, graph, pie chart, percentage, axis, glass shape with liquid in it, or the like, to signify how much we are getting closer to the goal.

In one embodiment, we have 3 choices in menu: shop, donate to charity, and put dollar in piggy bank. In different embodiments, we have different order for (1) giving money to charity, (2) signing up (or sign-in), as optional, and (3) purchasing the object, as different steps, in various orders, e.g., as: steps: (1-2-3), (1-3-2), (2-1-3), (2-3-1), (3-1-2), and (3-2-1) combinations/sequences. In one embodiment, we have ratings for consumers and ratings for stores and ratings for charities, based on performances/indexes/numbers/votes by users/frequency of transactions/number of transactions/average overhead/total/mean values/and the like. In one embodiment, we have different badges, colors, stars, heart symbols, or the like, to signify the achievements so far.

In one embodiment, we can share the story of user or randomly highlight the best donors, for good will or advertisement, on social sites or on our web site. In one embodiment, we can start a group based on the charitable causes or people, e.g. "Friends of Charity Q". In one embodiment, we can start a portal for small charities that do not have separate web sites, or otherwise, like to have another venue to process their gifts and donations. In one embodiment, we can have statistics and behavior or social or economical or mood or direction of people and society and politics evaluated or examined, versus time and context and location.

In one embodiment, we can have the tuition accumulated and paid after some threshold, or based on time period or events or randomly, or based on rules, or based on need, or based on semester/calendar, or combination of the above. The payment can be full or partial or on percentage or based on tuition or fixed or variable or based on formulas or tables or trend or the like. In one embodiment, we can have delay for payment from the stores, and we also put a margin of time for the returned merchandise, to offset the total sales for the period. In one embodiment, we can have the payment done to the charity first, and invoice the stores later. In one embodiment, we can have the reverse of the above, to have the money in hand before paying the charity, as a delay payment schedule.

In one embodiment, we can have a credit card from a bank associated with the website, so that a percentage goes to charities, with participation of a payment processor. In one embodiment, we can have student tuition divided or allocated or specified based on subclasses, e.g. based on gender, major, university, area of the country, ethnicity, age, grades, background, or the like, to focus and help a specific group or subset of population, who may need the tuition or assistance more than others. In one embodiment, we can have the badge system, based on milestones achieved for all parties, e.g. GOLD BADGE, e.g. for weekly goals.

In one embodiment, we can have cookie to track activities and patterns. In one embodiment, we can have various merchants: old relationships, lots of donations, lots of transactions, and the like. In one embodiment, we have plug-in to overtake the web page, to customize, for the look and interface. In one embodiment, we have legal agreements between parties on-line, for review and electronic signature, e.g. using PKI or biometrics or passwords. In one embodiment, we have universities sign in, or we invite them, based on a student from the school requesting for scholarship, which requires information from school, including verification of the university's identity, secure transmission certificate, PKI, name of authority, telephone number of the authorized person, methods of secured verifications for university ID, student ID/name, and enrolment/status, as well as tuition and student's balance/account status, all done automatically. In one embodiment, we have the verification of university by a person being done manually, using a computer interface or by phone or email or any communication means.

In one embodiment, we have university accounting department linking directly or communicating directly with our system, so that the fund transfer is done securely and automatically, with minimum delay. In one embodiment, we have universities as partners or shareholders in our company, for good will and advertising. In one embodiment, we display the awarded students and charities as highlights for advertising on our site or computer display or marketing material. In one embodiment, we have grad/undergrad categories, major/field, student ID/name/biometrics/password, and the like, for school interface/questionnaire. In one embodiment, we have student in queue for availability of funds or getting full amount accumulated for future payment or installments. In one embodiment, we have a number assigned to a student for random draw for lottery for award. In one embodiment, we have tuition awards based on need, verifiable by the school per semester, automatically. In one embodiment, we have one tuition bank. In one embodiment, we have multiple tuition banks In one embodiment, we have more weight for students waiting more in the queue to award, as an adjustment to award faster. In one embodiment, we have confirmation notice or email to the student, as well as using it as an ad. In one embodiment, we have charity portal with interface for sign-in, sign-up, ID number for charity, upload logo for charity, web site link, email, contact info, other info, mission of charity, with total, averages, over time performance, subclass break downs on usage and different expenditure on different causes, overhead, salaries, other expenses, marketing cost, executive salary and benefits, non-profit status, tax-deduction eligibility for donors, IRS validation of status, third party validation of status, total so far, last transaction, pending ones, last month summary, year-to-date, history, trend, sources, stores, and the like.

In one embodiment, we have piggy bank distribution being based on FIFO, proportion to total, need-based, merit-based, student GPA/score based, and the like. In one embodiment, a merchant can have a filter for a list of approved charities, as well as a filter for the consumer, so that the 2 filters can work in series, limiting the list even further, as the two are AND-ed together. In one embodiment, we have a list of approved suggested charities for users, if they need, to suggest to them, for each category, such as environmental causes. In one embodiment, the cause is related to the time of the year, in calendar, such as environmental causes for Earth Day, which we can remind the user, on screen of computer or on her device/mobile phone, with suggestions. In one embodiment, we (i.e., the system) check for the public databases for verification of charities, e.g., from "Give Well", plus their performance and parameters. In one embodiment, our internal search engine or filter can filter the charities, e.g. for charities with their overhead less than a threshold, which can be filtered and listed in order of lowest to highest overhead, for the user/consumer. Other parameters can be used for limiting the search result for the charities, such as topic or geographical areas. In one embodiment, the system uses a rules-engine for that purpose, with If-Then rules for decision making In one embodiment, the system has a suggestion box for adding charities, or verify charities, by us. In one embodiment, the system approves the merchants, versus a bad-actor list, to filter porn sites or similar sites, generated by us or third party, to avoid known bad actors as much as possible. In one embodiment, the system has templates for small entities to sign in, so that they do not need their own IT work for interface. However, for bigger entities, for customization, the system allows variety or customized look for each entity, with SDK and API offered to them. In one embodiment, the system automatically tracks the returns and subtracts them from the running sum, so that there is no cheating or unfair transaction recorded against any entity/store/merchant.

In one embodiment, the system processes in batch form for all transactions, or does it one-by-one as they come. In one embodiment, the merchant has a key or password that changes in time, for security purpose. In one embodiment, the system lets the user uses the personal or group login or information from other social web sites, or transfer the information for new account. In one embodiment, the system lets the merchant or user add more cash to the original donation, e.g., suggesting as rounded number added, or total being a rounded number, e.g. an integer value. In one embodiment, the system lets the user suggest merchandise, store, charity, or cause to friends, with invitation or links or interface provided, or the information about the charity or store attached or linked.

In one embodiment, the system lets the user chooses the charity contribution after the cart or purchase. In one embodiment, the system lets the user chooses the charity contribution before the cart or purchase. In one embodiment, the system lets the user can come and browse as guest. In one embodiment, the system lets the user know on screen, or notify later by email or text or the like, about the transactions and the contributions and all of their details, for example, as confirmation or receipt, or for IRS directly, or for accountant directly, as certificate.

In one embodiment, the system shows the invoice timeline for merchants as a table, versus time, in 2D, for staggered events happening, for collection and disbursement of the funds, and when to invoice or collect or remind the store to pay, as markers in the timeline, for the table of events and accounts. See FIG. 28 for an example, showing different actions and deadlines for different periods of time, as scheduled in a staggered manner, displayed in the format of FIG. 28, or using a rule engine to make that automatically executed by computer.

In one embodiment, the system has selection of countries and currencies or exchange rates, with some designated countries or charities in the forbidden lists, to avoid, for various safety and legal reasons. In one embodiment, the system has various languages and translations, with localization. In one embodiment, the system has grace period for payments, with contract online for different parties, approved with electronic signature and verification, e.g. PKI. In one embodiment, the system has multiple groups, e.g. merchants, charities, consumers, friends, schools with scholarships, and students applying for scholarships, all registering and involved in this process, benefiting from the transactions described here. In one embodiment, the system has a newsletter for users of all type, or targeted for specific interests. In one embodiment, the system has opt-in/out for the newsletters. In one embodiment, the system has a poll/survey for the parties.

In one embodiment, the system has a content management system. In one embodiment, the system shows how many percent of donors donate H percent of the sales, for various H values. In one embodiment, the system includes customer name, ID, email ID, charity ID, donations from customer, date, status (paid or pending), and the like. In one embodiment, the system suggests some value for the donations based on the income or history or sales price or pattern or average of people or income bracket or position at work or location in country or season or economy or stock index or inflation or past year tax bracket or salary.

In one embodiment, the system collects information about parties, e.g., verifies the charity, to filter the bad ones, e.g. through GuideStar, publication 78 of IRS, IRS Business Master File, automatic exemption/revocation list, internal revenue bulletin for individual revocations, reason for non-profit status, eligibility to receive tax deductable contributions, IRS good standing, and as not-listed by office of foreign assets control (OFAC), as specially designated national (SND), e.g. engaging in support of terrorism, or as being under sanction. Thus, the bad actors are filtered, periodically or based on events, leaving the rest as eligible party. In one embodiment, the system always checks against the designated lists or databases, before any transaction.

In one embodiment, the system checks the performance parameters of the charities on the known $3^{rd}$ party sites, as independent evaluation, getting the numbers and use our own formula to come up with Merit Score for each charity, e.g. for a higher score, we have one factor being the lowest overhead, or lowest salary, or lowest expenses, or more coverage, or more impact factor, or best match with the user, or best feedback, or longest time in business, or the like. It also depends on disbursement amount, fundraising budget and effort, and feedback/complaint/resolution. It can get score using an API from a database or another source/application. In one embodiment, the system shows the ranking based on score, match, relevance, category, geography, and/or preference/causes.

In one embodiment, the system shows the most popular charities or preferred in each category. In one embodiment, the system divides the funds equally or based on weighted average or weighted or cycle between or based on formula or time table or category or randomly within a category or class, per person, per class of people, per student, per group, per charity, or for all/total, e.g. 30 percent going to environmental causes or a specific one, or the first 3000 US$ going to environmental causes or a specific one, and the next 2000 US$ to charity number 2, and so on. In one embodiment, the fee for tuition bank is coming from our/Sparo's profit or income, as a percentage or fixed value. In one embodiment, the fee for tuition bank is coming directly from the merchant/store, as a separate item, or as a total sum/bundle.

In one embodiment, the system allows the donation of professional services, service packages, merchandise, or objects, as non-cash items donated, which can be auctioned or matched to or bought by third parties, and the proceedings used in the charities as cash later. For example, there may be an offer for coupon or restaurant voucher or upgrade on the seat on airplane or free mileage for doing an action by the user, which can be donated, based on an exchange of donations through our web site, or liquidation of such offers to cash or cash equivalent, in our "donation-exchange platform" described here.

In one embodiment, the system uses an ID for each charity which changes constantly, as an index for our own internal table, to match with the name of charity, so that the hackers cannot hijack the name of charity and use that for their financial benefit, because the ID number expires soon and with no notice, and becomes ineffective, and also indicating a hacker activity or fraud, if detected, with invalid or expired number later on.

In one embodiment, the system lets the user access merchants through our web site. In one embodiment, the system lets the user get to an agent through a merchant/store. The agent provides cash market for the coupon or offer for a fee or percentage of the deal. In one embodiment, the system uses an agent at the backend of the merchant, with interface done by merchant, and API to backend. In one embodiment, the merchant provides the UI or GUI, depending on user's profile and purchase history.

In one embodiment, the system uses a plug-in at users' side. In one embodiment, the system uses codes at the merchant side. In one embodiment, the system uses a signature or ID to refer to a merchant website. In one embodiment, the system uses a social networking for boosting the participation. In one embodiment, the system uses a return merchandise authorization time margin within our invoice delay time period, or fund release, to make sure nobody can cheat the system.

In one embodiment, the system uses a merchant approved list or forbidden list or blocked list or priority list for charities, from which it gets filtered, and the same mechanism can be applied to consumers/users, as well. For example, after 5000 US$ is given to charity 1 in category 1, then the rest or next 2000 US$ or a percentage goes to charity 2, and so on, based on priority listing. The filters for filtering for each party can be in series (ANDed together or "multiplied" together, as the INTERSECTION) or in parallel (ORed together or "added" together, as the UNION), in mathematical form or set theory format.

In one embodiment, the system uses tabs for display for stores or charities for international, national, state, local, and favorite ones. In one embodiment, the system uses acceptance form, for all parties, after their reading the agreement online, with disclaimers, and tax laws or warnings, plus privacy issues and ethical concerns, to digitally sign or accept the agreement, so that the process moves on, for each stage, including, e.g. students, schools, charities, stores, and third parties, e.g. auction houses.

In one embodiment, the system uses an addition based on absolute value, or relative value or percentage or ratio, for added donation at the checkout, for added value. In one embodiment, the system uses a suggested percentage to donate based on size or revenue or profit or number of employees or stores or market cap of the company, or industry type, or average of industry, or class, or profit margins, or geography, or people, or users, or heuristic, or the like.

In one embodiment, the system invites the charities to sign up, or alternatively, they come and signup at our website, or gets suggested or recommended by users or members. In one embodiment, the system lets the user changes percentages of the contributions and divisions between charities or schools, based on time table, formula, listing, rules, if-then conditions, schedules, and the like, over time, or for future, and keep the data for reference, if needed. In one embodiment, the system uses all the data as marketing for other related purposes, as individual or aggregated for all or averages.

In one embodiment, the system uses a record of all usages from piggy bank to keep track of all distributions to proper charities and schools, for proper receipt generated automatically or upon request for IRS/tax purposes, e.g. 100 percent compliance with tax codes, or minimum value for a specific purpose, or maximum time remaining in piggy bank. That is, due to tax codes, for proper year, it has to be spent or released from the piggy bank. Otherwise (in case of no action by the user), the default is to release the fund before deadline for tax purposes, by Sparo, automatically before deadline, to a random or listed charities or schools. In one embodiment, the system does not let the fund stay in the accounts indefinitely, enforcing a known deadline or giving warning to user or forcing a distribution of a fund to charities or schools, if the user fails to act or respond on time, causing tax violations or legal problems, which can be avoided by this method, automatically, and also certified/sent, accordingly, for IRS or the CPA.

In one embodiment, the system subtracts school funds directly from merchant contribution. In one embodiment, the system uses our profit or income as the source of school funds, which has different tax consequences for the parties involved, as the donor for deductions. In one embodiment, the system uses multiple charities or school banks or funds or the like, to stagger over time, and grow together, as shown on display for all parties to see, e.g. using bar diagram or sliding ruler, growing in parallel, e.g. student account growing in value on display.

In one embodiment, the system has multiple consumers, and our web sites in the middle, connecting to multiple charities and schools, each without or with any filtering on the available choices, or each time can be chosen by the user, or each time using a predetermined list or preferences or rules, disbursing the funds e.g. based on FIFO (first in first out) rule or other methods, and keeping track of all division of funds and allocations, for tax purposes and reports to users or parties, for IRS or tax/government authorities.

In one embodiment, the system uses multiple versions of tuition banks, e.g. local, state, national, international, or favorite, for usage, e.g., per student and per schools. In one embodiment, the system uses the data for the first-time user or one-time user or un-signed user, if the user desires, to merge, add, or accumulate, the contributions or funds or scores or parameters from multiple accounts of the same user/party or one-time usage, into a single account, per user's request, so that the user can get credit for that session. Of course, the identity of the user is checked with PKI/encryption, keys, passwords, certificates, by a validation authority, and/or biometrics. In one embodiment, in case of lost signup information by any party, the system helps to recover password and other account parameters, if the user can prove the identity in other forms, e.g. by re-emailing a new password to the original email, using a unique ID for the user's account. In one embodiment, the system lets user log in or sign up and create a new account before or after the donation, and/or before or after purchase/transaction.

In one embodiment, the system shows how much in each account is accumulated, up to now, or in average, or monthly, or weekly. In one embodiment, the system distinguishes the user as e.g. environmentalist, based on history, to filter and get the related organizations searched or listed automatically. In one embodiment, the system uses the State Dept. filter for unwanted organizations or countries, to filter out. In one embodiment, the system rounds up numbers or values, or rounds down for dollar values, or truncates the numbers to nearest dollar, cent, 10 cents, 5 cents, or the like, for ease of use, for individual items or for totals. In one embodiment, the system uses tel. call or email to verify a university for the first time, or use a $3^{rd}$ party organization. In one embodiment, the system lets the user save parameters, or use pre-set values, or share with friends, or email or transfer the data. In one embodiment, the system lets the user uses preference degrees such as high or low, or use numbers such as 10, or percentage, or binary yes or no, for charities or parameters, or mixture of the above. In one embodiment, the system uses the local, relative to user location, currently or permanently, as options. In one embodiment, the system uses the list of search parameters as filters, on screen, by user.

In one embodiment, the system uses multiple items from merchant, e.g. one with deep discount, not eligible for any charity contributions, making it a separate account for tracking, as eligible and not-eligible items, as well as an account for returned items, for accountability and subtractions from total, especially against fraud against the system.

In one embodiment, the system uses a pop-up or regular window for menu for display for parties to choose the options or see the options. In one embodiment, the system uses this model:

1. Start with the index page
2. Click on "Shopping Bag" on top right
3. Click on Sparo Button
4. In the next popup, choose the store logo
5. Then click on SUBMIT DONATION
6. Click on "Checkout"
7. On the next popup, click either SIGN UP or SIGN IN
8. After "SIGNING UP/IN", the popup with the Sparo profile opens
9. E.g. $5+$1.78 (Total $6.78) is shown in "Total Donation till date XXXXX" on Profile page
10. Click FINISH to come back to Homepage In one embodiment, the system uses best or most popular charities on the top of the list, as promoted each time for display, for ranking. In one embodiment, the system uses an event drive for local or national charities with customized page based on API provided, for customized display, with announcements to people or members of groups or prior donors for the cause, if they did not opt-out for related or general announcements. In one embodiment, the funds are actually at the piggy bank. In one embodiment, the funds are shown in piggy bank as placeholders, but are actually at the merchant's possession, which, once selected, will be transferred directly to charities, as specified.

In one embodiment, the system uses API, with one example shown below. The eCommerce website customers apply the donation to their website. So, we have:

XML API

Create an XML API which at first verifies the Subscription by sending Subscription Key and Subscribers User Name and a Request Code.

Passing a Request to the Query API

Username: Customers Username for Authentication (Required)

Key: Key generated for the Subscription for Authentication (Required Varchar(100))

Transaction_id: Specify a transaction ID (or a comma-separated list of transaction IDs) to retrieve information only on specific transaction(s). (Not Required. Only Required if Status 'Cancelled' or 'Updated'.)

Charity_list: List of Charity IDs selected from the API

Status: New, Cancelled, Updated (Required)

Reference: Order ID, or Reference ID (Required Varchar (100))

Donation Amount: $Amount Donated (Required 0.00)

Order Amount: $Amount Total (Required 0.00)

Handling Errors

```
<?xml version="1.0"?>
<nm_response>
    <error_response>Invalid Username/Key</error_response>
</nm_response>
```

Retrieving a Response from the Query API

```
<?xml version="1.0" encoding="UTF-8"?>
<nm_response>
    <transaction>
        <transaction_id>10650893</transaction_id> <= For Existing Transactions and Updates.
        <status>New</status>
        <reference>1000341</reference>
        <charity_list>133,44,52</ charity_list >
        <order_amount>500.00</order_amount>
        <donation>50.00</donation>
        <donation_fee>5.00</donation_fee>
    </transaction>
<nm_response>
```

Retrieving a Response from the Query API for Charity Selection/Info

```
<?xml version="1.0" encoding="UTF-8"?>
<nm_response>
    <charity>
        <charity_id>144</charity_id>
        <charity_name>XYZ Inc </charity_name>
        <description>New</ description >
        <mission> XYZ Inc is a ..... publishing </mission>
        <programs> PUBLISH ...... </programs>
        <date_added>2013-02-15T13:05:00</dateadded>
        <image>http://www.Sparo.com/Aimages/XYZ.jpg</image>
    </charity>
<nm_response>
```

In one embodiment, we have Sparo.com High-level Website Overview, as shown below: (Note that Sparo refers to our web site.)

Frontend
The Website itself has multiple functions:
1. Login Access for Merchants
   a. Login for Merchants has reporting on Sales and Donations
   b. Billing and payment history
   c. Merchant Account Information
   d. API Documentation and Application Integration Documents
2. Login Access for Charities
   a. Login for Charities has reporting and donations
      i. Donation is grouped by Merchants
   b. Donation disbursement history & schedule
   c. Charity information page and account information
3. Login Access for Sparo Members
   a. Sparo Member account information
   b. Donations and donation history
   c. Sparo Program Subscriptions
   d. Merchant Selection and list of Sponsors
Backend
1. Website operations and administration system
   a. Admin access management and permission system
   b. Automatic notification
2. Charity Management
3. Merchant Management
4. Donation Management
5. Sparo Account Management
6. Full Accounting & Billing Management
API—Application Programming Interface
1. Raw API in XML format for full customization and integration
   a. Allow merchants to implement Sparo completely customizable only with basic data communication through XML with Sparo Backend.
2. Built-in API for oCommerce & Magento
   a. Custom add-ons for oCommerce & Magento based eCommerce platforms
3. Plug & Play JavaScript API Integration
   a. Allow basic JavaScript API integration for easy installation for small ecommerce websites.
In one embodiment, we have components of a project:
System Configuration & Setup
Magento Framework Setup & Configuration
Server Optimization
Shopping Cart & eCommerce
Sparo.com—Front-end:
Website
Website Wireframes
Website Homepage Wireframe
Merchant Portal:
Merchant Portal Login Wireframe
Forgot Password and Merchant ID Page
Forgot Password and Merchant ID Confirmation Page
Forgot Password Email Content
Sign Up Page
Sign Up Confirmation Page
Sign Up Confirmation Email Content
Homepage Wireframe
Account Information
Account Information Update Confirmation Email
Billing Information
Billing History
Order/Donations Browse Page
Order/Donation Detail Page
Order/Donation Cancellation/Returns/Addition Page
Order/Donation Cancellation/Returns/Addition Confirmation Page Order/Donation Cancellation/Returns/Addition Confirm Email
Order/Donation Modification Page
Order/Donation Modification Confirmation Page
Order/Donation Modification Confirmation Email
Invoice History
Invoice Detail
Invoice Payment Page
Invoice Credit Card Payment Page
Invoice Credit Card Payment Confirmation Page
Invoice Payment Confirmation Email
Invoice Bank Wire Payment Page (ACH)
Invoice Bank Wire Payment Confirmation Page (ACH)
Merchant Logout Page
Charity Portal:
Charity Portal Login Wireframe
Forgot Password/Charity ID Page
Forgot Password/Charity ID Confirmation Page
Forgot Password Email Content
Sign Up Page
Sign Up Confirmation Page
Authorization to set-up confirmation email
Sign-Up Rejection Email
Homepage Wireframe
Account Information
Account Information Update Confirmation Email
Payment Information
Payment Update Information
Donations Browse Page
Donation Detail Page
Disbursement History
Disbursement Detail
Disbursement Email
About Charity Page
Membership Page (Benefits, Packages)
Membership Upgrade/Downgrade Page
Membership Update Confirmation Email
Membership Credit Card Payment Page
Membership Credit Card Payment Confirmation Page
Membership Payment Confirmation Email
Charity Logout Page
Member Portal:
Member Portal Login Wireframe
Forgot Password Page
Forgot Password Confirmation Page
Forgot Password Email Content
Sign Up Page
Sign Up Confirmation Page
Homepage Wireframe
Account Information
Account Information Update Confirmation Email
Shopping on Sparo Merchant Sites directed from Sparo.com
Payment Information
Email confirmation for direct donation
Payment Update Information
Donations Browse Page
Donation Detail Page
Donate Page
Charity Search Page
Charity Selection Page
Credit Card Payment Page
Credit Card Payment Confirmation Page
Member Logout Page
Piggy Bank Homepage
Piggy Bank Deposit/Donation History
Piggy Bank Add Donation
Use Piggy Bank Money
Piggy Bank Donation Page/Charity Selection
Piggy Bank Donation Confirmation Page
Piggy Bank Donation Email Confirmation
Programs Homepage (Student Tuition Application)
   Program Search Page
   Program Selection & Detail page
   Program Sign up page
   Program Confirmation page
   Program Email Confirmation
   Program—Registered Page or Status
   Program "Winner" Page
   Program "Winner" Email Notification
   Program Winner Acceptance
   Tuition Electronic Forms
Sparo.com Backend:
Dashboard:
Chart & Table Coding
Design & Wireframe
Chart & Table Update Merchant
Chart & Table Update Charity
Chart & Table Update Member
User Management:
Content & Pages
Design
Reports
Piggy Bank
Piggy Bank Deposit & History
Account Management
Account Information Detail
Payment Information
Program Management (Student Tuition Program)
   Program Search Page
   Program New/Modify
   Program Automatic Member Selection
   Program Automatic Member Notification
   Program Selection Approval
   Program Selection History
User Group Management:
Member Conditions
Charity Conditions
Merchant Conditions
User Group Exceptions
User Group Notifications
Charity Management:
Charity Setup
Charity Account Modification
Charity Notifications
Merchant Orders & Donation Management (CRM)
Order/Donations Management
Order/Donation to Member Modifications
Order/Donation to Charity Modifications
Charity Disbursement Management
Charity Account Report & Consolidation
Charity Donation Modification & Adjustments
Merchant Invoicing & Consolidation
Newsletter Management
Subscription Management
Customer Subscriptions Management
Product & Catalog Management
Content Management System
Sparo—APIs:
Javascript Based API
   Member Sign In Modification
   Piggy Bank Selection Modification XML API
   Member Information Collection
Magento Addon
   Member Sign In Modification
   Piggy Bank Selection Modification
   Backend Function Modification
OsCommerce
   Member Sign In Modification
   Piggy Bank Selection Modification
   Backend Function Modifications
Analytics & Search Engine Optimization:
Analytics & Website Add-ons
Charity Website Modifications
Members Website Modifications
On-Page Search Engine Optimization
Prototype
Merchant API Interface
Security/Scalability Testing & Updates:
Front-End
Back-End
API
Testing
  Front-End
  Back-End
  API
Charity & Member Add-on In one embodiment, the invoice is billed every 30 days.
Given 30 Days to pay Invoice before incurring interest
Given 60 Days since last invoice billed to report returns, to be reflected as credits on the next invoice. However, merchants report returns as often as they like before this period (they can do it in bulk or report as they go).

In other words, revenue from total transactions in a given month will not be considered finalized and secured until 60 days after the given month.

In one embodiment, Sparo works as follows:
1. Online shoppers go to the check out cart
2. Sparo application prompts donations
3. From our list of enrolled charities, shoppers decide which charities will receive the donations
4. Retailers make the requested donations with no cost to shoppers or nonprofits
5. Shoppers repeat the above, as a loop, millions of times a year Here are some examples of the systems, methods, and apparatuses for our inventions:

Example 1

See FIG. 25a

A method of distribution of charity funding, with:
  a computer receiving an order for a merchandise;
  said computer getting a value for said merchandise from a price database;
  associating a donation value to said merchandise;
  assigning a forbidden charity list in a forbidden charity database;
  said forbidden charity database sending said forbidden charity list to said computer;
  said computer receiving a list of charities from a first charity database;
  said computer reviewing a first charity from said list of charities;
  if said first charity belongs to said forbidden charity list, then deleting said first charity from said list of charities to produce a modified charity list;
  receiving said value for said merchandise;
  receiving said donation value in to a first account;
  said computer selecting one or more second charities from said modified charity list;
  receiving a distribution preference list or rule from a distribution preference list or rule database;
  a charity allocation computing processor dividing said donation value from said first account between said one or more second charities according to said distribution preference list or rule;
  with option of:
    assigning a score for said one or more second charities.
    assigning a score for said list of charities.
    assigning a score based on geographical data.
    assigning a score based on charity overhead.
    assigning a score based on charity total salaries.
    assigning a score based on charity average salaries.
    assigning a score based on charity operating expenses.
    assigning a score based on charity cause.
    assigning a score based on people's vote.
    assigning a score based on consumers' feedback.
    using a score to modify said distribution preference list or rule.
    using a score to display charities.
    using a score to order said list of charities.
    receiving a score from a third party or government entity.
    certifying a score by a third party or government entity.
    authenticating a charity by a third party or government entity.
    authenticating a charity for tax purposes or rules.
    said donation value is based on a percentage or ratio.
    said donation value is expressed as a fixed dollar or currency value.

Example 2

See FIG. 25b

A method of distribution of charity funding for school scholarship, with:
  a computer receiving an order for a merchandise;
  said computer getting a value for said merchandise from a price database;
  associating a donation value to said merchandise;
  receiving a student request for a first scholarship from multiple scholarship funds for a school through a computer interface;
  receiving information about said student through said computer interface;
  receiving information about said school through said computer interface;
  authenticating said school directly through a school server or through a third party organization server;
  initiating a secure communication to said school server;
  authenticating said student through said school server;
  receiving status of said student from said school server;
  said computer determining eligibility of said student based on said status of said student and said authentication step for said student through said school server;
  said computer allocating a portion of said donation value to said multiple scholarship funds;
  if said computer determines that said student is eligible for said first scholarship, then
    (a) an accounting module allocating fund to said first scholarship in said multiple scholarship funds, and
    (b) if said first scholarship exceeds a first threshold value, then said accounting module allocating fund equal to a first accumulated value to said school's bank account, from said first scholarship, on behalf of said student;

said computer notifying said student and said school regarding outcome of said student request for said first scholarship;

with option of:

allocating funds based on said student's gender.

allocating funds based on said student's grades or grade point average.

allocating funds based on parents' income or financial need.

allocating funds based on major field of study.

allocating funds based on said school's name.

allocating funds based on geographical area.

allocating funds based on said school's ranking allocating funds based on said school's accreditation.

allocating funds based on said student's ethnicity.

allocating funds based on said student's total merit score or ranking in class.

using private-public key scheme to authenticate said school.

using a certification organization to authenticate said school.

using a certification organization to authenticate said student.

using a bad actor listing to authenticate said school.

using a bad actor listing to authenticate said student.

using a credit score to authenticate said student.

using a criminal record to authenticate said student.

preparing a tax certification for said donation value.

sending a tax certification for said donation value to tax authorities.

Example 3

See FIG. 25c

A method of distribution of charity funding, with:

a computer receiving an order for a merchandise;

said computer getting a value for said merchandise from a price database;

associating a donation value to said merchandise;

a processor module receiving an emergency event charity drive notice with a first goal amount and a first deadline time period;

said processor module receiving a current calendar date from a calendar module;

said processor module mapping said current calendar date to a specific event in said calendar module;

a monitor device displaying said emergency event charity drive and said specific event in a suggestion box for an optional charity list;

selecting one or more charities from said suggestion box;

adding said one or more charities to said optional charity list;

an accounting module receiving said donation value;

said accounting module communicating with a charity distribution rule database;

said accounting module allocating portions of said donation value between charities in said optional charity list, according to said charity distribution rule database;

with option for:

said emergency event charity drive notice is related to a natural disaster, flood, earth quake, or hurricane event.

said specific event is Earth's Day.

said specific event relates to environmental causes.

comparing against a forbidden list of charities.

comparing against a forbidden list of countries.

using a third party evaluator for charity evaluation, rating, or score.

using government agencies for charity evaluation, rating, or score.

using a template for introducing possible candidate charities.

said template is based on user's behavior or history.

said template is based on user's profile.

said template is based on user's political or social preferences.

said template is based on user's friends' preferences.

said template defines different classes of behavior.

said template defines different preferences.

said template is associated with a class of charities.

said template is associated with a group of charities with a common theme.

choosing said possible candidate charities.

choosing local charities.

filtering bad actors from said possible candidate charities.

Example 4

See FIG. 26

A method of distribution of charity funding, with:

a computer receiving an order for a merchandise;

said computer getting a value for said merchandise from a price database;

associating a first donation value to said merchandise;

a processor module receiving said first donation value;

associating said first donation value with a first preference list and a first forbidden list;

said processor module receiving a second donation value from a piggy bank;

associating said second donation value with a second preference list and a second forbidden list;

said processor module receiving a third donation value from a user interface;

associating said third donation value with a third preference list and a third forbidden list;

said processor module receiving an original list of charities;

an accounting module allocating fund combination of said first donation value, said second donation value, and said third donation value, among said original list of charities, with restrictions imposed by said first forbidden list, said second forbidden list, and said third forbidden list, and according to priorities described by said first preference list, said second preference list, and said third preference list;

with option for:

said first donation value is associated with a merchant.

said third donation value is associated with a consumer.

said piggy bank is associated with a consumer.

said first preference list has a higher priority than said second preference list and said third preference list.

said second preference list has a higher priority than said first preference list and said third preference list.

said third preference list has a higher priority than said second preference list and said first preference list.

said first preference list has a higher priority than said second preference list.

said second preference list has a higher priority than said first preference list.

said third preference list has a higher priority than said second preference list.

said first forbidden list is a subset of said second forbidden list.

said third forbidden list is a subset of said first forbidden list.

said first forbidden list is same as said second forbidden list.

said third forbidden list is same as said first forbidden list.

said first forbidden list is different from said second forbidden list.

said third forbidden list is different from said first forbidden list.

said first forbidden list overlaps said second forbidden list.

said third forbidden list overlaps said first forbidden list.

using a default forbidden list.

notifying all parties involved regarding outcome of said allocation step for said fund combination.

Here are general setups for our system, method, or apparatus, as examples:

A computer program or collection of programs comprising computer-executable instructions according to embodiments of the donation agent described herein can be stored and transported on machine-readable media such as magnetic tape, floppy disk, CD-ROM and fixed disk. The computer instructions can be retrieved from the machine-readable media using a suitable reading device into a memory and executed by a processor. The computer-executable instructions can be distributed across a plurality of media, such as on physically separate storage devices respectively associated with physically separate computer systems that can communicate via a network. The functionality disclosed hereinabove for performing the embodiments may find specific implementations in a variety of forms, which are considered to be within the abilities of a programmer of ordinary skill in the art after having reviewed the disclosure.

A suitable environment for implementing various aspects of the subject matter described herein includes a computer. The computer includes a processing unit, a system memory, a codec, and a system bus. The system bus couples system components including, but not limited to, the system memory to the processing unit. The processing unit can be any of various available processors. Dual microprocessors and other multiprocessor architectures can also be employed as the processing unit.

The system bus can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 664), and Small Computer Systems Interface (SCSI).

The system memory includes volatile memory and non-volatile memory. The basic input/output system (BIOS), containing the basic routines to transfer information between elements within the computer, such as during start-up, is stored in non-volatile memory. By way of illustration, and not limitation, non-volatile memory can include read only memory (ROM), programmable ROM (PROM), electrically programmable ROM (EPROM), electrically erasable programmable ROM (EEPROM), or flash memory. Volatile memory includes random access memory (RAM), which acts as external cache memory. According to present aspects, the volatile memory may store the write operation retry logic and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer may also include removable/non-removable, volatile/non-volatile computer storage media. It also includes, for example, a disk storage, which includes, but is not limited to, devices like a magnetic disk drive, solid state disk (SSD) floppy disk drive, tape drive, Jaz drive, Zip drive, LS-60 drive, flash memory card, or memory stick. In addition, disk storage can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage to the system bus, a removable or non-removable interface is typically used.

Note that the software that acts as an intermediary between users and the basic computer resources is positioned in the suitable operating environment. Such software includes an operating system, which can be stored on disk storage, acts to control and allocate resources of the computer. Applications take advantage of the management of resources by operating system through program modules, and program data, such as the boot/shutdown transaction table and the like, stored either in system memory or on disk storage. Note that the subject matter described herein can be implemented with various operating systems or combinations of operating systems.

A user enters commands or information into the computer through input device(s). Input devices include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit through the system bus via interface port(s). Interface port(s) include, for example, a serial port, a parallel port, a game port, and a universal serial bus (USB). Output device(s) use some of the same type of ports as input device(s). Thus, for example, a USB port may be used to provide input to computer, and to output information from computer to an output device. There are some output devices like monitors, speakers, and printers, among other output devices, which require special adapters. The output adapter includes, by way of illustration and not limitation, video and sound cards that provide a means of connection between the output device and the system bus. It should be noted that other devices and/or systems of devices provide both input and output capabilities such as remote computer(s).

Computer can operate in a networked environment using logical connections to one or more remote computers, such as remote computer(s). The remote computer(s) can be a personal computer, a server, a router, a network PC, a workstation, a microprocessor based appliance, a peer device, a smart phone, a tablet, or other network node, and typically includes many of the elements described relative to computer. Remote computer(s) is logically connected to computer through a network interface and then connected via communication connection(s). Network interface encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) refers to the hardware/software employed to connect the network interface to the system bus. The hardware/software necessary for connection to the network interface includes, for exemplary purposes only, internal and external technologies such as, modems including regular telephone grade modems, cable modems and DSL modems, ISDN adapters, and wired and wireless Ethernet cards, hubs, and routers.

The system, e.g., includes one or more client(s), which can include an application or a system that accesses a service on the server(s). The client(s) can be hardware and/or software (e.g., threads, processes, computing devices). The client(s) can house cookie(s), metadata and/or associated contextual information by employing the specification, for example.

The system also includes one or more server(s). The server(s) can also be hardware or hardware in combination with software (e.g., threads, processes, computing devices). The servers can house threads to perform, for example, interest point detection, distorting, merging, pruning, mixing, fingerprint generation, matching score generation, or fingerprint comparisons in accordance with the subject disclosure. One possible communication between a client and a server can be in the form of a data packet adapted to be transmitted between two or more computer processes where the data packet contains, for example, an audio sample. The data packet can include a cookie and/or associated contextual information, for example. The system includes a communication framework (e.g., a global communication network such as the Internet) that can be employed to facilitate communications between the client(s) and the server(s).

Communications can be facilitated via a wired (including optical fiber) and/or wireless technology. The client(s) are operatively connected to one or more client data store(s) that can be employed to store information local to the client(s) (e.g., cookie(s) and/or associated contextual information). Similarly, the server(s) are operatively connected to one or more server data store(s) that can be employed to store information local to the servers.

This may also be practiced in distributed computing environments where certain tasks are performed by remote processing devices that are linked through a communications network. In a distributed computing environment, program modules can be located in both local and remote memory storage devices.

The systems and processes described herein can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

Any variations of the above teaching are also intended to be covered by this patent application.

The invention claimed is:

1. A method of distribution of charity funding based on an emergency fundraising event or a scheduled holiday charity event, said method comprising:
receiving, by a computer, an order by a user for a merchandise from a merchant site;
obtaining, by said computer, a price for said merchandise from a price database;
associating, by said computer, a donation value to said ordered merchandise, wherein an authentication module runs on said computer;
receiving, by said computer, said donation value into a first account;
receiving, by said computer, information about said emergency fundraising event having a first funding goal amount and a first deadline date for said emergency fundraising event;
receiving, by said computer, information regarding said scheduled holiday charity event from a calendar module;
selecting, by a donation agent running on said computer, a first charity from a list of charities, associated with said emergency fundraising event or said scheduled holiday charity event;
performing, by said computer, cross-domain scripting for said merchant site, wherein a first domain corresponds to said selected first charity;
creating, by said computer, a file including script elements for said merchant site;
obtaining, by said computer, a source of said script elements from said merchant site and writing said source of said script elements into a second domain via web services and dynamic script tags;
dynamically creating, by said computer, a script tag and writing said script tag into said second domain, wherein said source of said script elements is executed by said authentication module;
referencing and comparing, by said authentication module, said script tag against a remote script source for verification purposes; and
upon verification by said authentication module, allocating, by said computer, a portion of said donation value from said first account to said first charity.

2. The method of distribution of charity funding based on said emergency fundraising event or said scheduled holiday charity event as recited in claim 1, wherein said emergency fundraising event is related to a natural disaster, flood, earthquake, or hurricane event.

3. The method of distribution of charity funding based on said emergency fundraising event or said scheduled holiday charity event as recited in claim 1, wherein said scheduled holiday charity event is Earth's Day.

4. The method of distribution of charity funding based on said emergency fundraising event or said scheduled holiday charity event as recited in claim 3, wherein said scheduled holiday charity event relates to environmental causes.

5. The method of distribution of charity funding based on said emergency fundraising event or said scheduled holiday charity event as recited in claim 1, said method further comprises:
comparing against a forbidden list of charities.

6. The method of distribution of charity funding based on said emergency fundraising event or said scheduled holiday charity event as recited in claim 1, said method further comprises:
comparing against a forbidden list of countries.

7. The method of distribution of charity funding based on said emergency fundraising event or said scheduled holiday charity event as recited in claim 1, said method further comprises:
using a third party evaluator for charity evaluation, rating, or score.

8. The method of distribution of charity funding based on said emergency fundraising event or said scheduled holiday charity event as recited in claim 1, said method further comprises:

using government agencies for charity evaluation, rating, or score.

9. The method of distribution of charity funding based on said emergency fundraising event or said scheduled holiday charity event as recited in claim 1, said method further comprises:

using a template for introducing possible candidate charities.

10. The method of distribution of charity funding based on said emergency fundraising event or said scheduled holiday charity event as recited in claim 9, wherein said template is based on user's behavior or history.

11. The method of distribution of charity funding based on said emergency fundraising event or said scheduled holiday charity event as recited in claim 9, wherein said template is based on user's profile.

12. The method of distribution of charity funding based on said emergency fundraising event or said scheduled holiday charity event as recited in claim 9, wherein said template is based on user's political or social preferences.

13. The method of distribution of charity funding based on said emergency fundraising event or said scheduled holiday charity event as recited in claim 9, wherein said template is based on user's friends' preferences.

14. The method of distribution of charity funding based on said emergency fundraising event or said scheduled holiday charity event as recited in claim 9, wherein said template defines different classes of behavior.

15. The method of distribution of charity funding based on said emergency fundraising event or said scheduled holiday charity event as recited in claim 9, wherein said template defines different preferences.

16. The method of distribution of charity funding based on said emergency fundraising event or said scheduled holiday charity event as recited in claim 9, wherein said template is associated with a class of charities.

17. The method of distribution of charity funding based on said emergency fundraising event or said scheduled holiday charity event as recited in claim 9, wherein said template is associated with a group of charities with a common theme.

18. The method of distribution of charity funding based on said emergency fundraising event or said scheduled holiday charity event as recited in claim 9, said method further comprises:

choosing local charities.

* * * * *